(12) United States Patent
Ogawa et al.

(10) Patent No.: US 8,819,613 B2
(45) Date of Patent: Aug. 26, 2014

(54) POWER SUPPLY CIRCUIT DESIGN SYSTEM AND POWER SUPPLY CIRCUIT DESIGN METHOD

(75) Inventors: Masashi Ogawa, Tokyo (JP); Hisashi Ishida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/879,284

(22) PCT Filed: Sep. 26, 2011

(86) PCT No.: PCT/JP2011/072701
§ 371 (c)(1),
(2), (4) Date: Apr. 12, 2013

(87) PCT Pub. No.: WO2012/049988
PCT Pub. Date: Apr. 19, 2012

(65) Prior Publication Data
US 2013/0212551 A1  Aug. 15, 2013

(30) Foreign Application Priority Data
Oct. 14, 2010  (JP) .................................. 2010-231404

(51) Int. Cl.
*G06F 17/50*    (2006.01)

(52) U.S. Cl.
USPC .......................................... 716/133; 716/134

(58) Field of Classification Search
USPC ................................................. 716/132–136
See application file for complete search history.

(56) References Cited

U.S. PATENT DOCUMENTS

| | | | |
|---|---|---|---|
| 6,823,502 B2 * | 11/2004 | Wingren et al. | 716/102 |
| 2010/0306722 A1 * | 12/2010 | LeHoty et al. | 716/5 |
| 2010/0325599 A1 * | 12/2010 | Perry et al. | 716/122 |

FOREIGN PATENT DOCUMENTS

| | | |
|---|---|---|
| JP | 2003-124335 A | 4/2003 |
| JP | 2004-086881 A | 3/2004 |
| JP | 2008-276612 A | 11/2008 |

* cited by examiner

*Primary Examiner* — Binh Tat
(74) *Attorney, Agent, or Firm* — Sughrue Mion, PLLC

(57) ABSTRACT

A power supply circuit design system according to an exemplary aspect of the invention includes: a power supply voltage fluctuation deriving means for deriving a power supply voltage fluctuation characteristic as a voltage fluctuation characteristic in a semiconductor integrated circuit on the basis of design information about a power supply circuit for connecting the semiconductor integrated circuit and other components mounted on a substrate; a determination reference database including a power supply voltage fluctuation condition as a condition for which the power supply voltage fluctuation characteristic is allowed in the power supply circuit, and a change indicator for at least one of a circuit structure and operation of the semiconductor integrated circuit; a power supply voltage fluctuation determination means for comparing the power supply voltage fluctuation characteristic and the power supply voltage fluctuation condition, and determining whether the power supply voltage fluctuation characteristic satisfies the power supply voltage fluctuation condition; and a circuit structure changing means for changing at least one of the structure and the operation of the semiconductor integrated circuit in accordance with the change indicator if the power supply voltage fluctuation characteristic does not satisfy the power supply voltage fluctuation condition, and outputting design information about the changed semiconductor integrated circuit to the power supply voltage fluctuation deriving means; wherein the change indicator does not entail a change in size of the semiconductor integrated circuit.

11 Claims, 40 Drawing Sheets

FIG. 14A
FIG. 14B
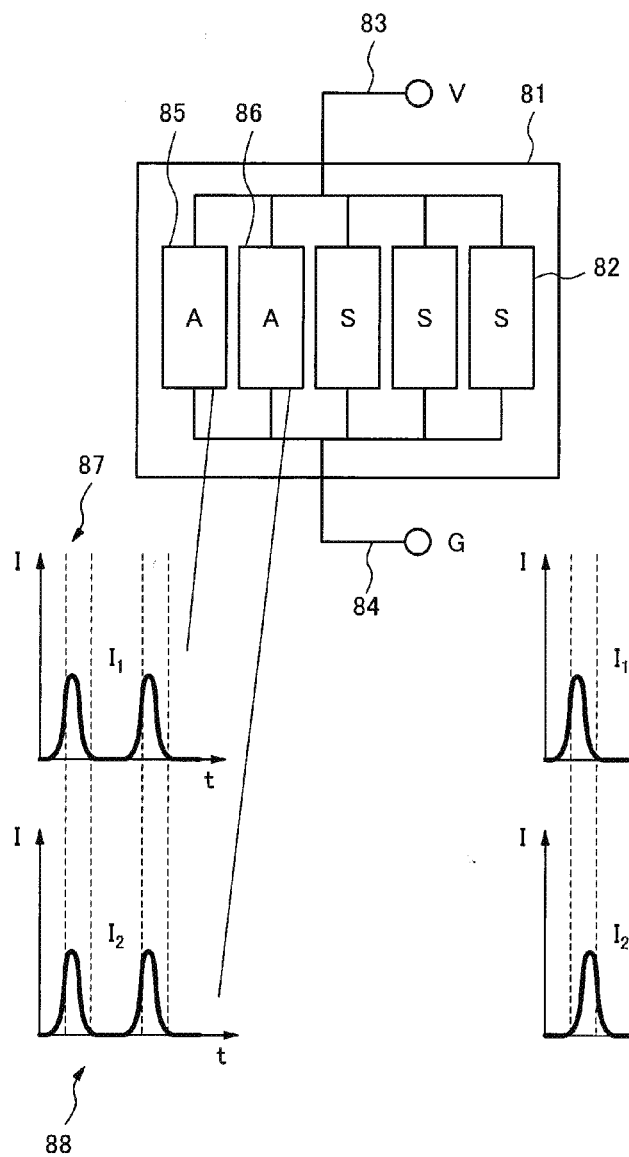
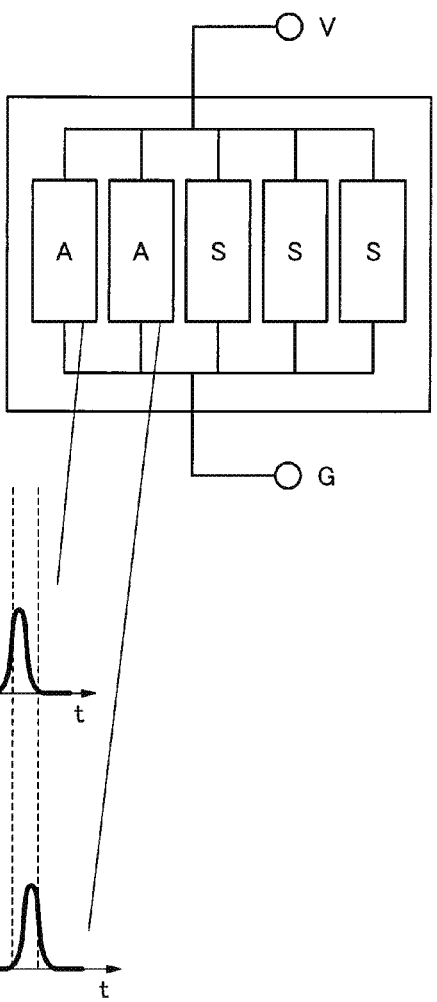

FIG. 26A
FIG. 26B
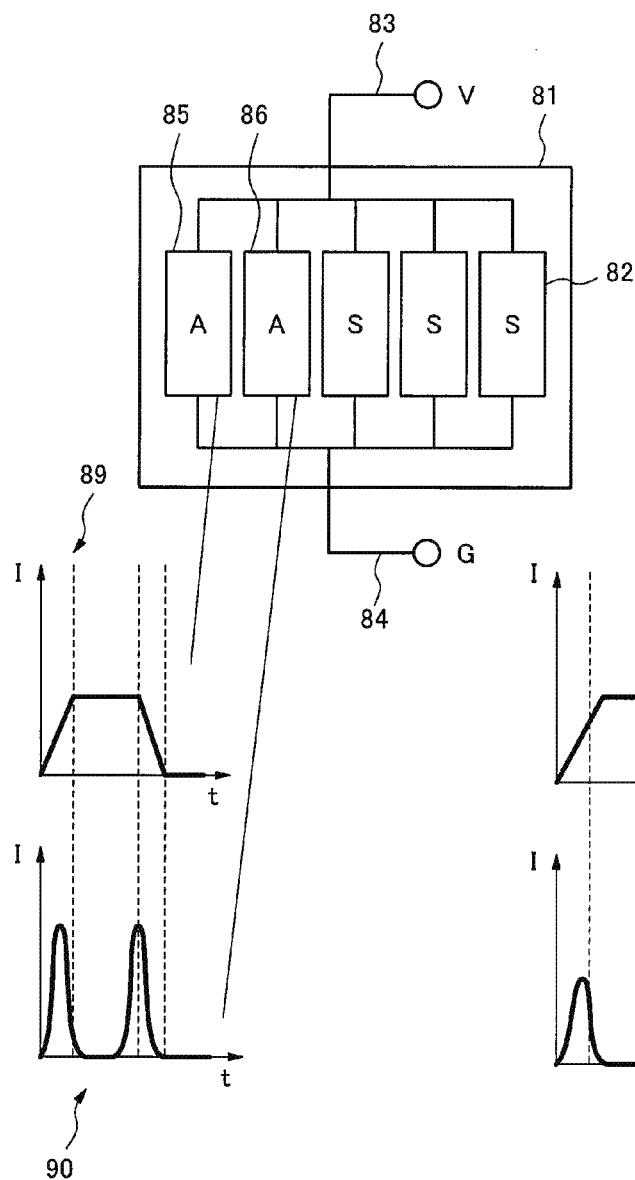
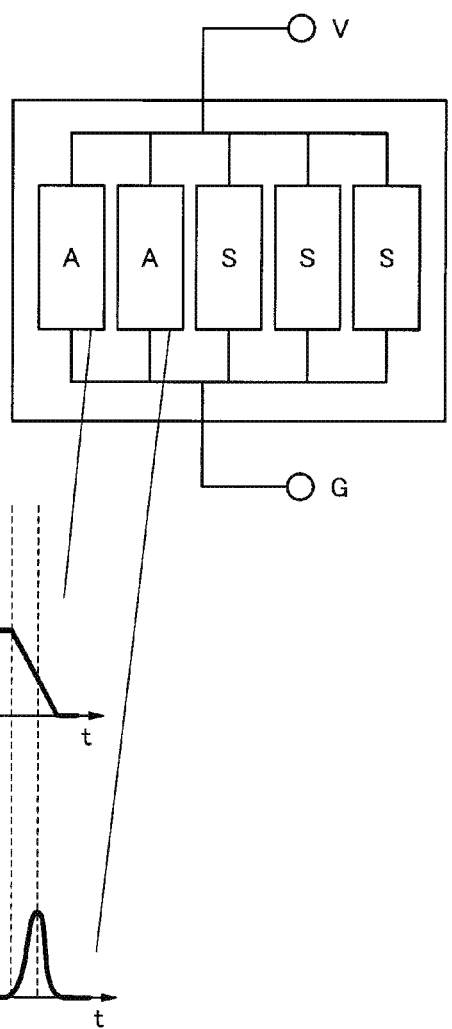

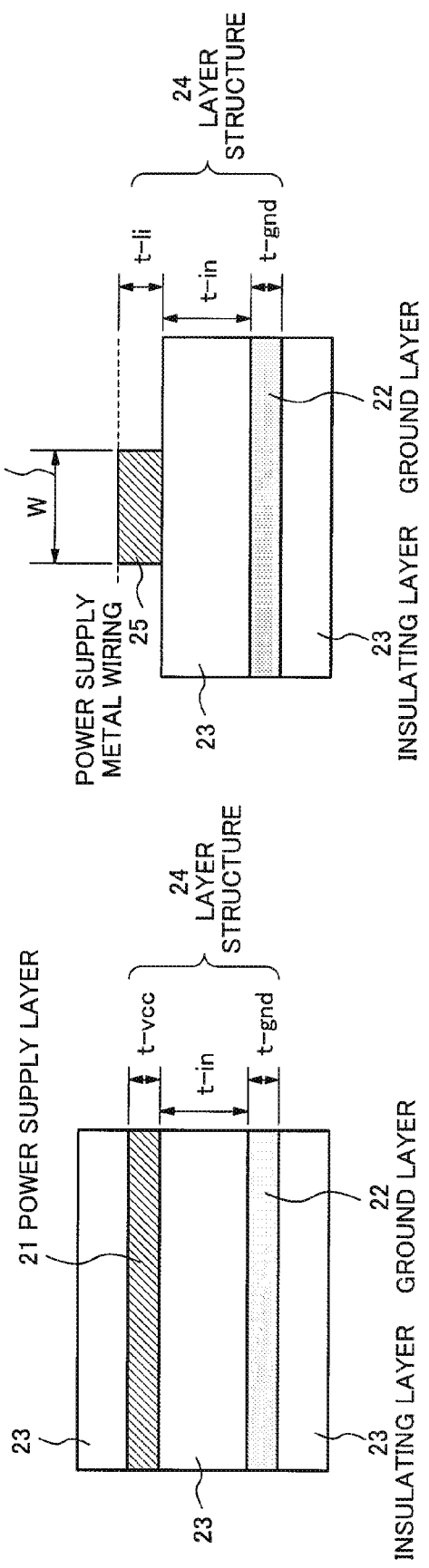

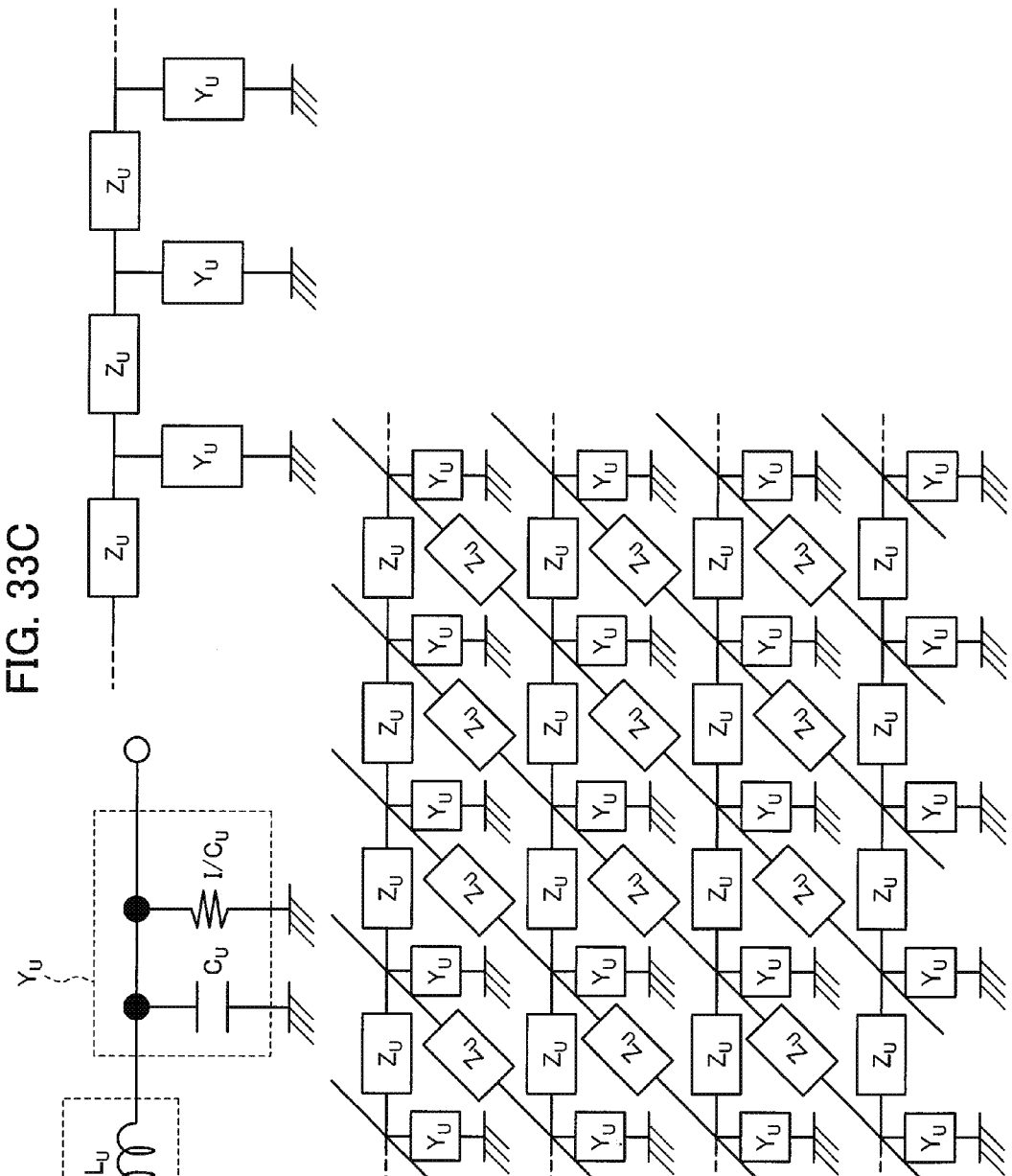

POWER SUPPLY CIRCUIT DESIGN SYSTEM AND POWER SUPPLY CIRCUIT DESIGN METHOD

CROSS REFERENCE TO RELATED APPLICATIONS

This application is a National Stage of International Application No. PCT/JP2011/072701 filed Sep. 26, 2011, claiming priority based on Japanese Patent Application No. 2010-231404, filed Oct. 14, 2010, the contents of all of which are incorporated herein by reference in their entirety.

TECHNICAL FIELD

The present invention relates to a power supply circuit design system and a power supply circuit design method which in a semiconductor integrated circuit (hereinafter, described as an "LSI") mounted on a printed circuit board (hereinafter, described as "PCB") with passive components such as capacitors, derives a structure of a power supply of the PCB including the LSI with the LSI operating stably taking into consideration noise characteristics such as voltage fluctuation.

BACKGROUND ART

In a PCB on which a LSI is mounted, there is a structural problem that a power supply voltage of the PCB fluctuates because an electric current produced by operation of the LSI flows into a power supply of the PCB, and the LSI does not operate normally by the voltage fluctuation. Therefore, in order to operate the LSI normally, trials to suppress the fluctuation of the power supply circuit voltage are performed such as reducing an electric current flowing into a power supply circuit (hereinafter, described as "power current") of the PCB including the LSI or reducing the impedance of the power supply circuit.

For example, the structure is described in the patent literature 1 which includes a circuit for detecting a voltage drop (fluctuation) and a regulating circuit for adding voltage in an LSI (block). The voltage drop detection circuit calculates the voltage drop amount arising in the LSI operating time and feeds its voltage drop amount back to a voltage regulating circuit. A semiconductor integrated circuit design device is described which supplies the stable voltage of power supply by including two above-mentioned circuits in an LSI and setting the voltage arising due to a voltage drop to the operating voltage of the regulating circuit.

The semiconductor integrated circuit design device is described in the patent literature 2 which includes a means for analyzing noise, a means for judging whether the noise level is within the predetermined range, and a means for adding a bypass condenser to the inside of the circuit block of LSI with the noise out of the predetermined range.

Its feature is that it includes a noise analyzing means for performing a noise analysis from the information in a database, a logical gate selection means for searching a logical gate with the noise generation exceeding the predetermined range if the amount of the noise exceeds the predetermined range, and a bypass condenser addition means for adding a bypass condenser for reducing power supply noise and substrate noise to the selected logical gate.

By those means, it is possible by using the information from a database to add a bypass condenser for reducing noise to the neighborhood of the logical gate circuit with a large amount of noise which can become a noise source, and suppress the noise efficiently.

Since it is possible by having set the predetermined range of the noise to find automatically a logical gate of which a bypass condenser should be added to the neighborhood, the LSI structure is provided which is designed to be stable for noise by a series of automatic flows.

PRIOR ART LITERATURE

Patent Literature

Patent Literature 1: Japanese Patent Application Laid-Open Publication No. 2003-124335
Patent Literature 2: Japanese Patent Application Laid-Open Publication No. 2004-086881

SUMMARY OF INVENTION

Problem to be Solved by the Invention

However, the technologies described in the patent literatures 1 and 2 need the spaces for disposing a countermeasure component in the LSI circuit block. That is to say, the patent literature 1 needs the space for integrating a voltage drop detection circuit and a voltage regulating circuit, and the patent literature 2 needs a space for disposing a bypass condenser, respectively.

Since the technologies described in the patent literatures 1 and 2 need to expand a chip size for building the extra spaces into the LSI from the beginning, there has been a problem in miniaturizing a device.

The object of the present invention is to provide a power supply circuit design system and a power supply circuit design method which solve the above-mentioned problem.

Means for Solving a Problem

A power supply circuit design system according to an exemplary aspect of the invention includes: a power supply voltage fluctuation deriving means for deriving a power supply voltage fluctuation characteristic as a voltage fluctuation characteristic in a semiconductor integrated circuit on the basis of design information about a power supply circuit for connecting the semiconductor integrated circuit and other components mounted on a substrate; a determination reference database including a power supply voltage fluctuation condition as a condition for which the power supply voltage fluctuation characteristic is allowed in the power supply circuit, and a change indicator for at least one of a circuit structure and operation of the semiconductor integrated circuit; a power supply voltage fluctuation determination means for comparing the power supply voltage fluctuation characteristic and the power supply voltage fluctuation condition, and determining whether the power supply voltage fluctuation characteristic satisfies the power supply voltage fluctuation condition; and a circuit structure changing means for changing at least one of the structure and the operation of the semiconductor integrated circuit in accordance with the change indicator if the power supply voltage fluctuation characteristic does not satisfy the power supply voltage fluctuation condition, and outputting design information about the changed semiconductor integrated circuit to the power supply voltage fluctuation deriving means; wherein the change indicator does not entail a change in size of the semiconductor integrated circuit.

Effect of the Invention

It is possible to design a power supply circuit stable for voltage fluctuation without expanding a chip size.

BRIEF DESCRIPTION OF THE DRAWINGS

FIG. 14A is a diagram showing a circuit structure of an LSI and a waveform of current flowing in each block before the change thereof.

FIG. 14B is a diagram showing a circuit structure of an LSI and a waveform of current flowing in each block after the change thereof.

FIG. 26A is a diagram showing a circuit structure of the LSI and a waveform of current flowing in each block before the change thereof.

FIG. 26B is a diagram showing a circuit structure of the LSI and a waveform of current flowing in each block after the change thereof.

FIG. 32A is a diagram showing a sectional structure of a substrate.

FIG. 32B is a diagram showing a sectional structure of a microstrip wiring.

FIG. 33A is a diagram showing the equivalent circuit model per a unit length of a power supply circuit generated by solver processing.

FIG. 33B is a diagram showing the equivalent circuit model structure when a power supply is a substrate structure.

FIG. 33C is a diagram showing the equivalent circuit model structure when a power supply is a wiring structure.

DESCRIPTION OF EMBODIMENTS

[The First Exemplary Embodiment]

A preferable embodiment for performing the present invention will be described using drawings below. Although technically preferable limitation is added to the exemplary embodiment described below in order to perform the present invention, the scope of the invention is not limited to the following embodiment.

Figure 1:
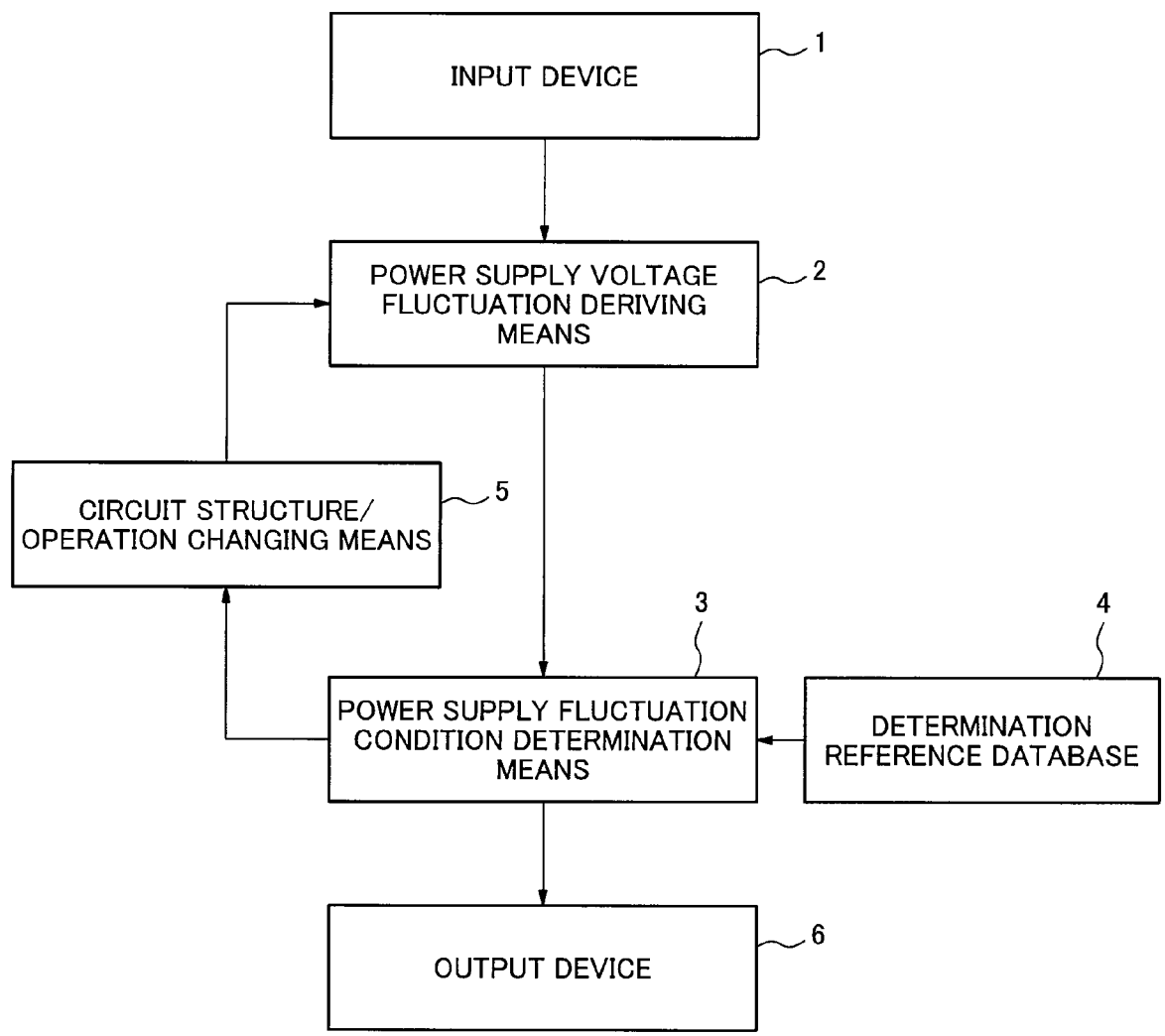
FIG. 1 is a diagram showing a system configuration of the first exemplary embodiment.

[Description of configuration] A system configuration of the first exemplary embodiment is shown in FIG. 1. The power supply circuit design system in the present exemplary embodiment includes an input device 1, a power supply voltage fluctuation deriving means 2, a power supply voltage fluctuation condition determination means 3, a determination reference database 4, a circuit structure/operation changing means 5, and an output device 6.

The input device 1 has a function to input design information of a circuit composing a PCB mounting an LSI and input information provided for a database into the power supply voltage fluctuation deriving means 2.

The power supply voltage fluctuation deriving means 2 has a function to derive the power supply voltage fluctuation characteristics, that is, the characteristics of the voltage fluctuation arising in a power supply on the PCB.

The power supply voltage fluctuation condition determination means 3 determines automatically whether a power supply circuit of PCB mounting the LSI is designed stably. Specifically, the power supply voltage fluctuation condition determination means 3 has the function to compare the power supply voltage fluctuation characteristics derived in the power supply voltage fluctuation deriving means 2 with the power supply voltage fluctuation conditions provided for the determination reference database 4, and to determine whether the power supply voltage fluctuation characteristics satisfy power supply voltage fluctuation conditions.

Although the time waveform characteristic of the voltage fluctuation between the power supply and the GND is one of those which are listed as the power supply voltage fluctuation characteristics, they are not limited to this. For example, it is also possible to be evaluated by a frequency characteristic or the like of the voltage fluctuation as the power supply voltage fluctuation characteristic, and the power supply voltage fluctuation deriving means 2 obtains any one characteristic of them.

The determination reference database 4 is provided with a power supply voltage fluctuation condition showing a limiting value in the power supply voltage fluctuation characteristics, and it may be provided with the power supply voltage fluctuation conditions of a plurality of power supply voltage fluctuation characteristics in advance.

If the power supply voltage fluctuation condition determination means 3 compares the power supply voltage fluctuation characteristic with the power supply voltage fluctuation condition and then determines that the condition is not satisfied, the circuit structure/operation changing means 5 performs the operation of changing at least one of the structure and the operation of the LSI in order to satisfy the power supply voltage fluctuation condition.

The change specifications of the circuit structure and the operation of the LSI which the circuit structure/operation changing means 5 performs are provided for the determination reference database 4 by the set with the power supply voltage fluctuation condition, and the change may be made based on a indicator if the power supply voltage characteristic does not satisfy the power supply voltage fluctuation condition. Hereinafter, "change in the circuit structure/operation" may be described as "change" for short. Although the circuit structure/operation changing means 5 performs a concrete change of the LSI as a change processing, the change does not entail a change in size of the LSI.

The power supply voltage fluctuation deriving means 2 derives a power supply voltage fluctuation characteristic of the PCB mounting the LSI whose structure or operation has been changed. And again, the power supply voltage fluctuation condition determination means 3 repeats the operation to determine automatically whether the power supply circuit of the PCB mounting the LSI whose structure or operation has been changed is designed stably.

The power supply voltage fluctuation condition determination means 3 has a function to output a result in the power supply voltage fluctuation condition determination means 3 to the output device 6 if it is determined that the power supply circuit of the PCB satisfies the power supply voltage fluctuation condition.

Figure 2:
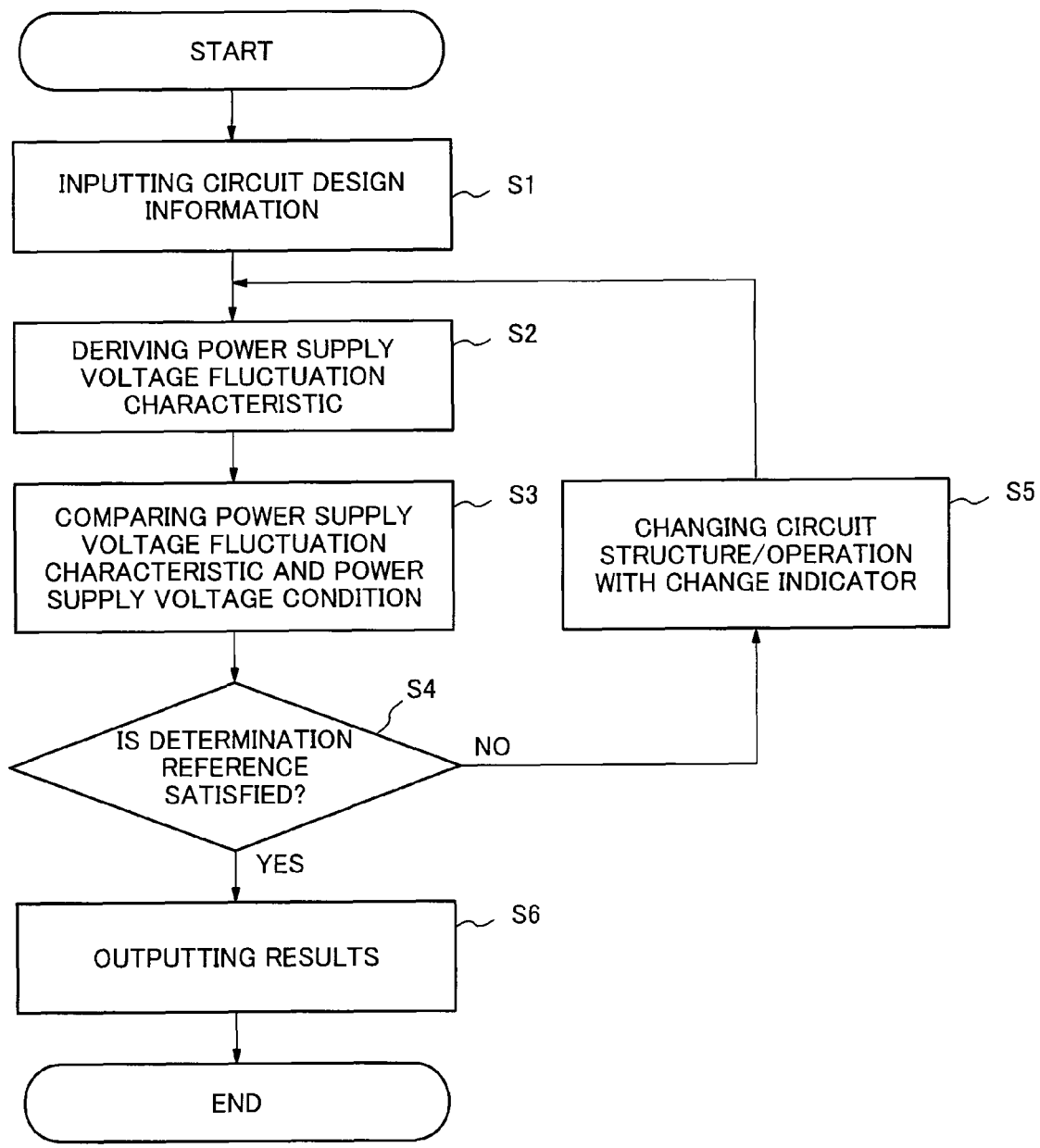
FIG. 2 is a diagram showing a flowchart of the first exemplary embodiment.

[Description of Operation] FIG. 2 is a flowchart showing the processing of the present exemplary embodiment of the present invention. Hereinafter, this processing will be described in detail.

Figure 3:
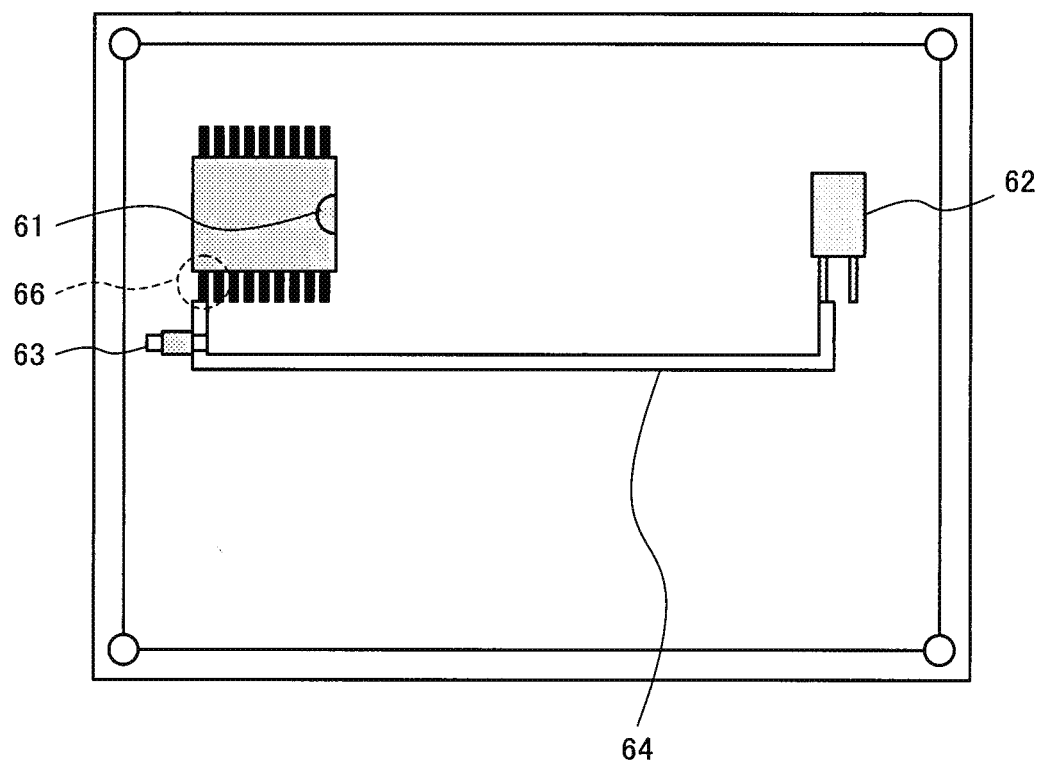
FIG. 3 is an example of a structure of a PCB mounting components.

In S1, the input device 1 inputs circuit design information. In the case of a PCB which composes a power supply circuit mounting an LSI 61, a direct-current power supply 62, and a passive component such as a chip capacitor 63 and the like as shown in FIG. 3, the input information is the information, which is necessary for deriving voltage fluctuation characteristics in the power supply circuit, such as its layout, an LSI to be mounted, and other components and the like. Next, the processing is proceeded to S2.

In S2, the power supply voltage fluctuation deriving means 2 performs the processing for deriving the power supply voltage fluctuation characteristic based on the circuit design information inputted from the input device 1. By the processing mentioned above, the power supply voltage fluctuation characteristic in the PCB is derived. Next, the processing is proceeded to S3.

In S3, the power supply voltage fluctuation condition determination means 3 performs the processing for comparing the derived power supply voltage fluctuation characteristic and the power supply voltage fluctuation condition provided for the determination reference database. Next, the processing is proceeded to S4.

In S4, the power supply voltage fluctuation condition determination means 3 performs the processing for comparing the power supply voltage fluctuation characteristic and the power supply voltage fluctuation condition provided for the determination reference database 4, and determines whether the power supply circuit of the PCB is designed stably. If it is determined that the determination reference is not satisfied, the processing is proceeded to S5.

In S5, the circuit structure/operation changing means 5 automatically extracts a change indicator provided for the determination reference database 4 in advance and automatically changes the circuit structures and the operation of the LSI and the PCB mounting the LSI as the change processing in accordance with the indicator. The data of the changed LSI and the PCB mounting it is automatically inputted, and the processing is proceeded to S2, and the operation of deriving the power supply voltage fluctuation characteristic anew is repeated using the LSI information changed again.

The circuit structure/operation changing means 5 performs the change processing of the LSI without entailing the change in size of the LSI, and also performs the processing for changing the PCB at the same time tailored to the change processing of the LSI.

In S4, the power supply voltage fluctuation characteristic derived by the power supply voltage fluctuation condition determination means 3 and the power supply voltage fluctuation condition are compared, and the processing is proceeded to S6 if the power supply voltage fluctuation condition is satisfied.

In S6, the results from a series of processing are outputted to the output device 6.

[Description of Effect] Next, an effect in the present exemplary embodiment will be described. By the above-mentioned configurations, it becomes possible to determine easily whether the power supply circuit of the PCB is designed stably to the voltage fluctuation by preparing power supply voltage fluctuation conditions and the structure/operation change indicator of the LSI. And it is possible to design easily the power supply circuit of the PCB mounting an LSI so that it may become stable to the voltage fluctuation.

Since the change processing of the circuit structure/operation of the LSI in S5 is the change in the circuit structure/operation without changing the size of the LSI, an extra space is not required in changing the structure/operation of the LSI. Therefore, it is possible to design the power supply circuit of the PCB mounting the LSI stably to the voltage fluctuation without expanding the chip size of the densely-mounted LSI and the mounting area.

[The Second Exemplary Embodiment] Next, the second exemplary embodiment will be described in detail with reference to drawings.

Figure 4:
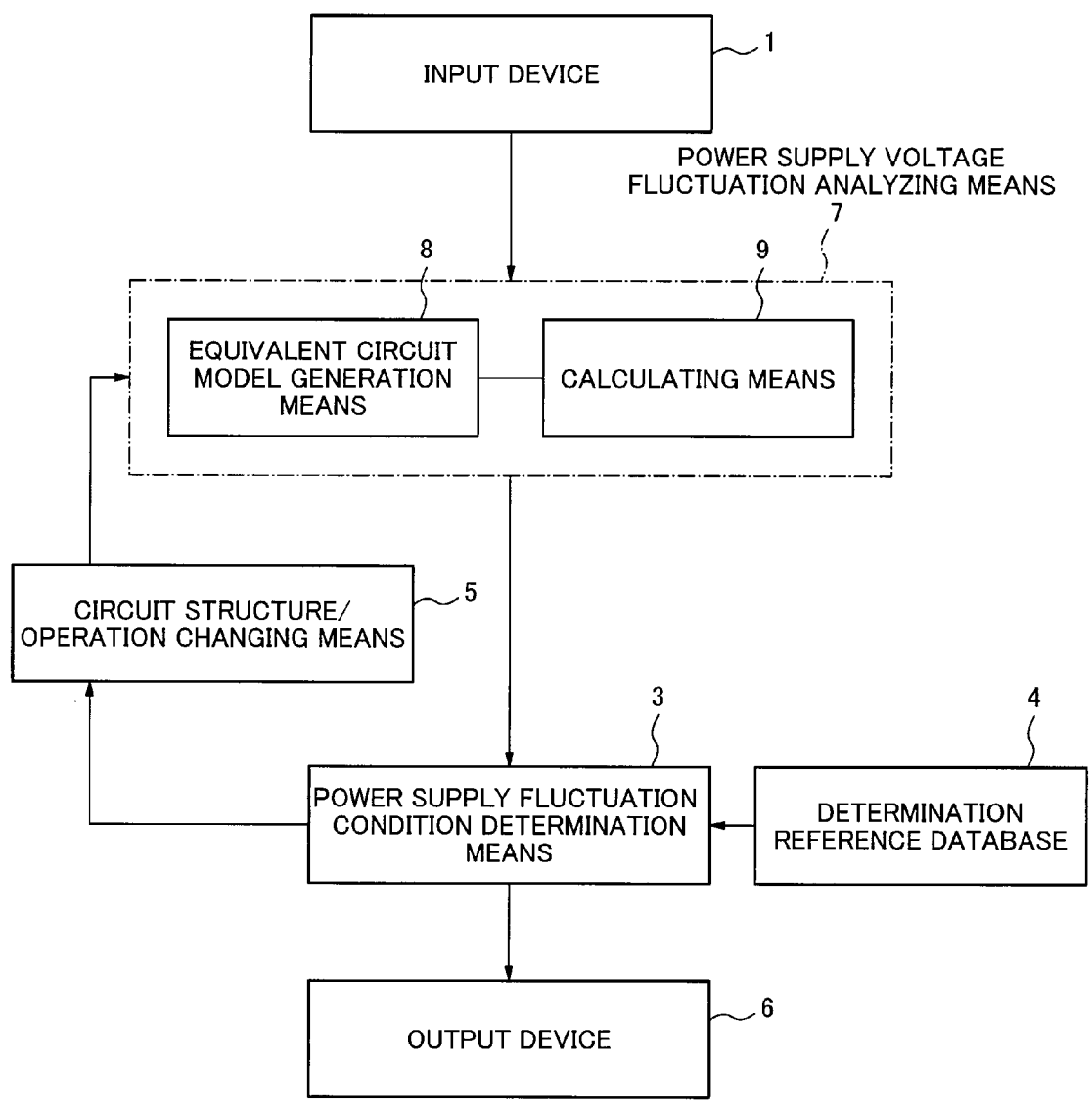
FIG. 4 is a diagram showing a system configuration of the second exemplary embodiment.

[Description of Configuration] As shown in FIG. 4, a power supply circuit design system of the present exemplary embodiment includes a power supply voltage fluctuation analyzing means 7 as the power supply voltage fluctuation deriving means 2.

The power supply voltage fluctuation analyzing means 7 in the present exemplary embodiment corresponds to the power supply voltage fluctuation deriving means 2 in the first exemplary embodiment.

As shown in FIG. 4, the power supply voltage fluctuation analyzing means 7 includes an equivalent circuit model generation means 8 for generating an equivalent circuit model of a power supply circuit of a PCB from design information on a circuit inputted from the input device 1 and a calculating means 9 for deriving a power supply voltage fluctuation characteristic using the generated equivalent circuit model. The equivalent circuit model generation means 8 includes a board equivalent circuit model preparing means and an LSI equivalent circuit model preparing means.

The board equivalent circuit model preparing means prepares an equivalent circuit model of a printed circuit board (hereinafter, also described as "board equivalent circuit model") based on the design information for a board such as a layout and a sectional structure of the PCB and components to be mounted and on a component database.

The board equivalent circuit model preparing means may include a field solver which can make an equivalent circuit model for a blanket layer and a wiring on a board by inputting information such as a sectional structure, materials, and a layout of the board.

Figure 34B:
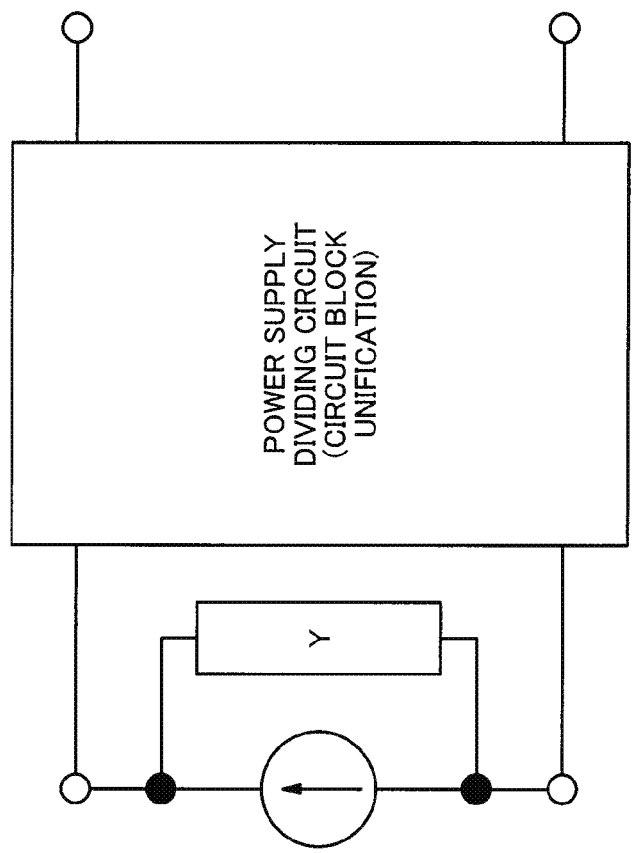
FIG. 34B is a diagram showing an equivalent circuit model structure of an LSI.
Figure 34A:
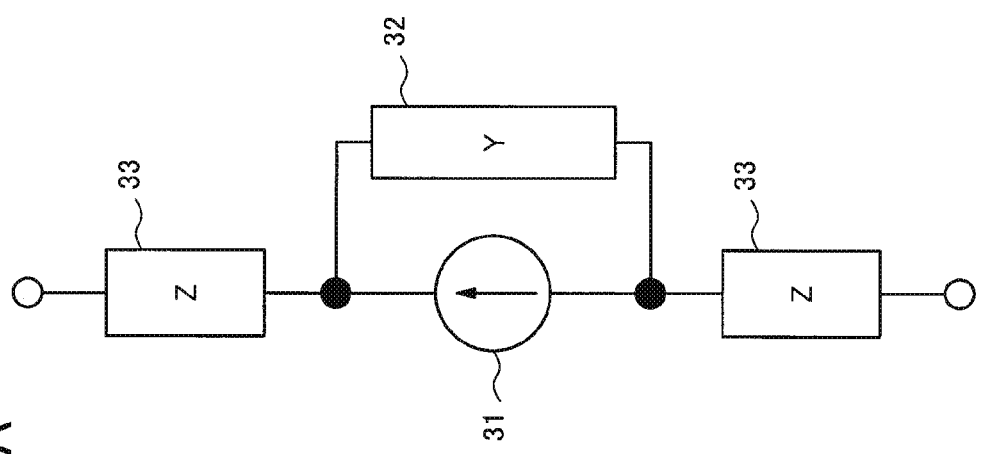
FIG. 34A is a diagram showing an equivalent circuit model structure of an LSI.

On the other hand, the LSI equivalent circuit model preparing means makes an equivalent circuit model of an LSI described in FIG. 34A or FIG. 34B from the design information such as whole circuit connection information, layout information, and design information for the LSI, and a database for components composing the inside of the LSI.

The calculating means 9 may include a circuit analysis engine as represented by SPICE and an electromagnetic field analysis engine, and an analysis of power supply voltage fluctuation characteristic to be required is performed.

Figure 5:
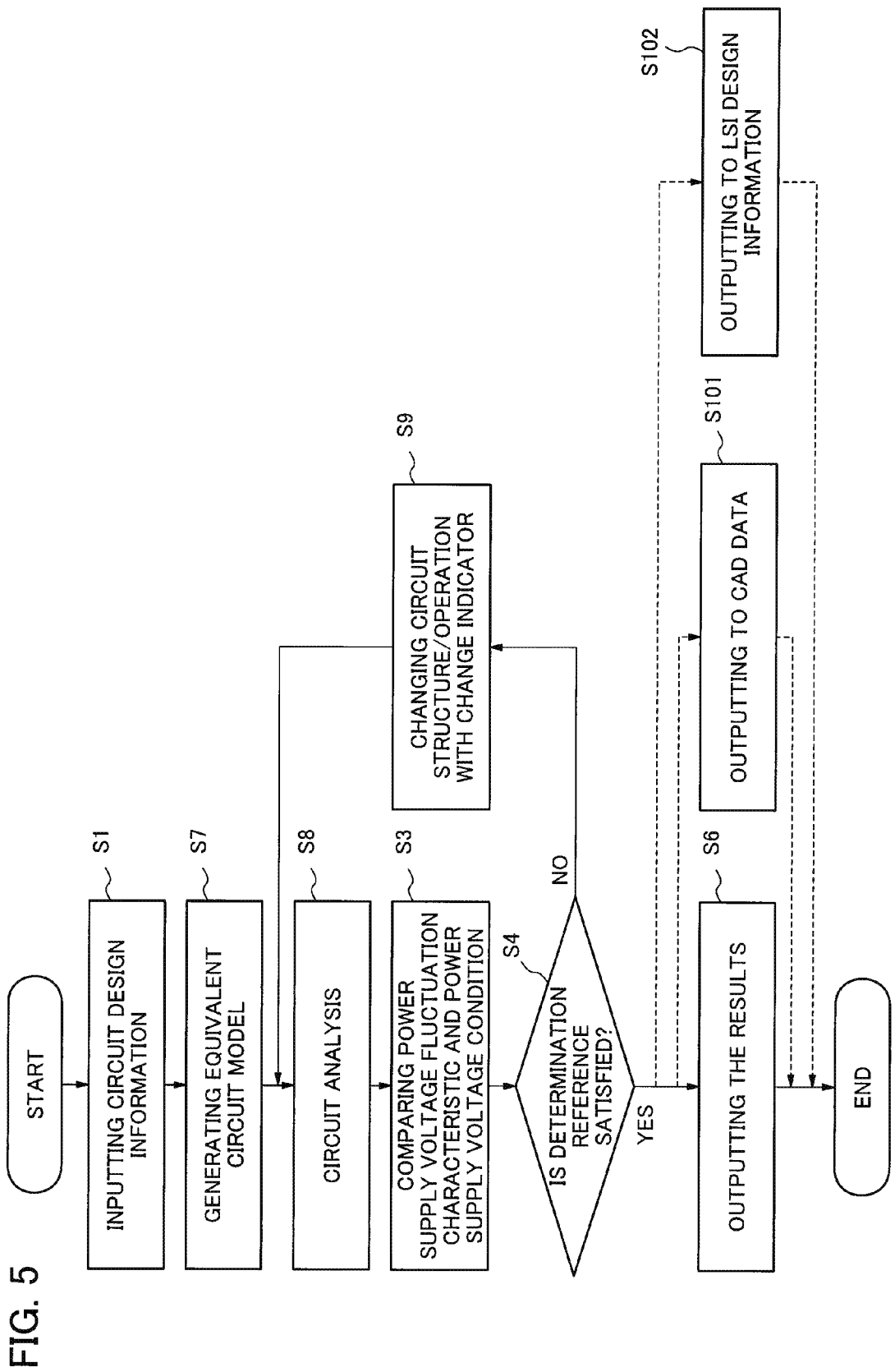
FIG. 5 is a diagram showing a flowchart of the 2nd, 3rd, 4th, 5th, 6th, 7th, and 8th exemplary embodiment.

[Description of Operation] Next, the operation in the present exemplary embodiment will be described. FIG. 5 is a flowchart showing the processing in the present exemplary embodiment.

The flowchart in the present exemplary embodiment has a configuration which includes a step S7 for performing equivalent circuit model generation processing and a step S8 for performing circuit analysis processing instead of the step S2 for performing the power supply voltage fluctuation derivation processing in the flowchart of the first exemplary embodiment. Hereinafter, the operation in the present exemplary embodiment will be described in detail.

In S1, the input device 1 performs the processing for inputting the circuit design information. In a case of the PCB as shown in FIG. 3 which composes the power supply circuit on which the LSI and other components are mounted, the information inputted here is that necessary for deriving voltage fluctuation characteristics in the power supply circuit such as the layout, the LSI to be mounted, and other components. Next, the processing is advanced to S7.

In S7, the equivalent circuit model generation means 8 generates, as the equivalent circuit model generation processing, an equivalent circuit model which represents the whole power supply system of PCB mounting the LSI (hereinafter, "power supply system equivalent circuit model") based on the circuit design information inputted from the input device 1. Next, the processing is advanced to S8.

Figure 6:
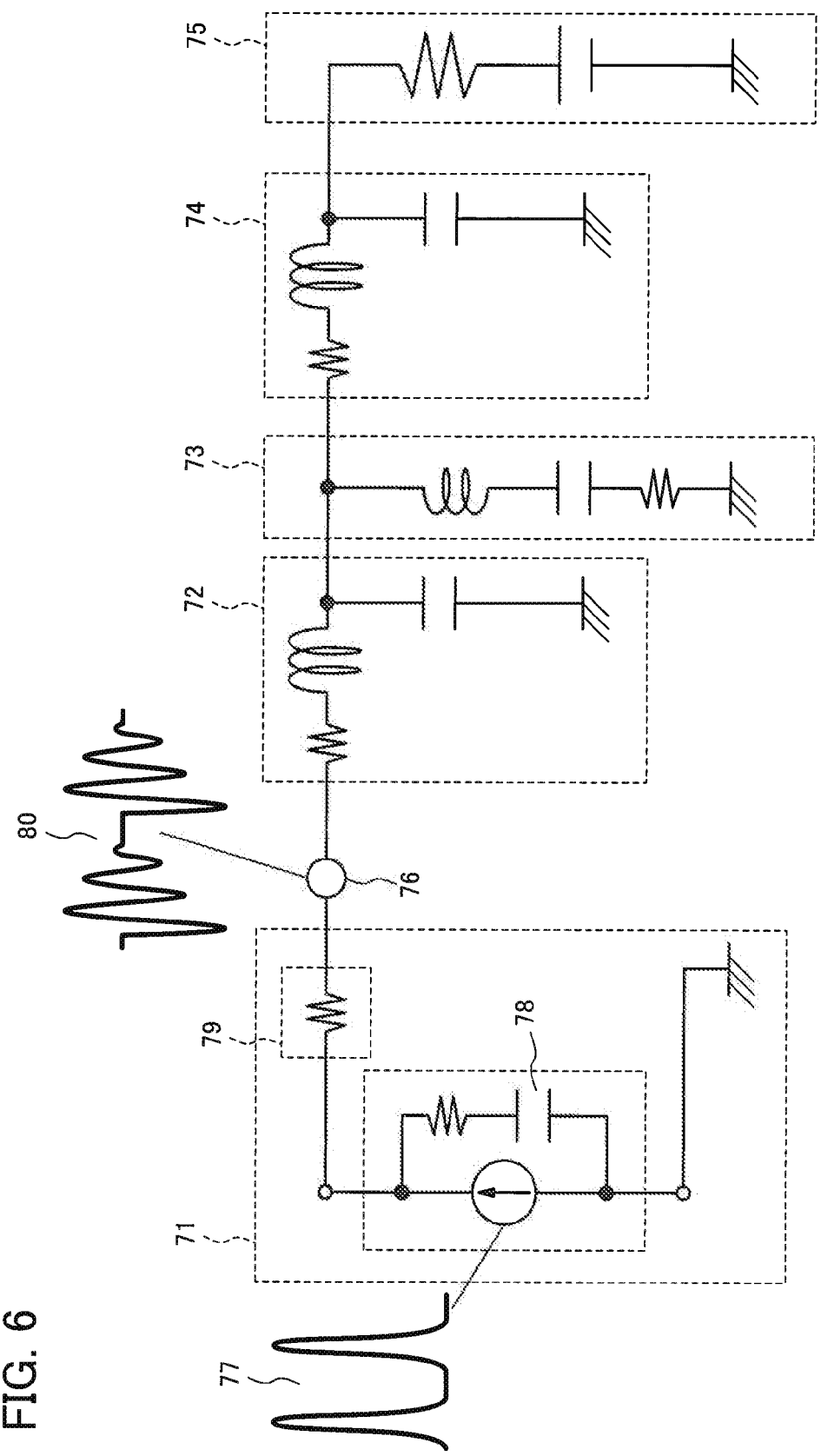
FIG. 6 is an example of an equivalent circuit model for a PCB.
Figure 7:
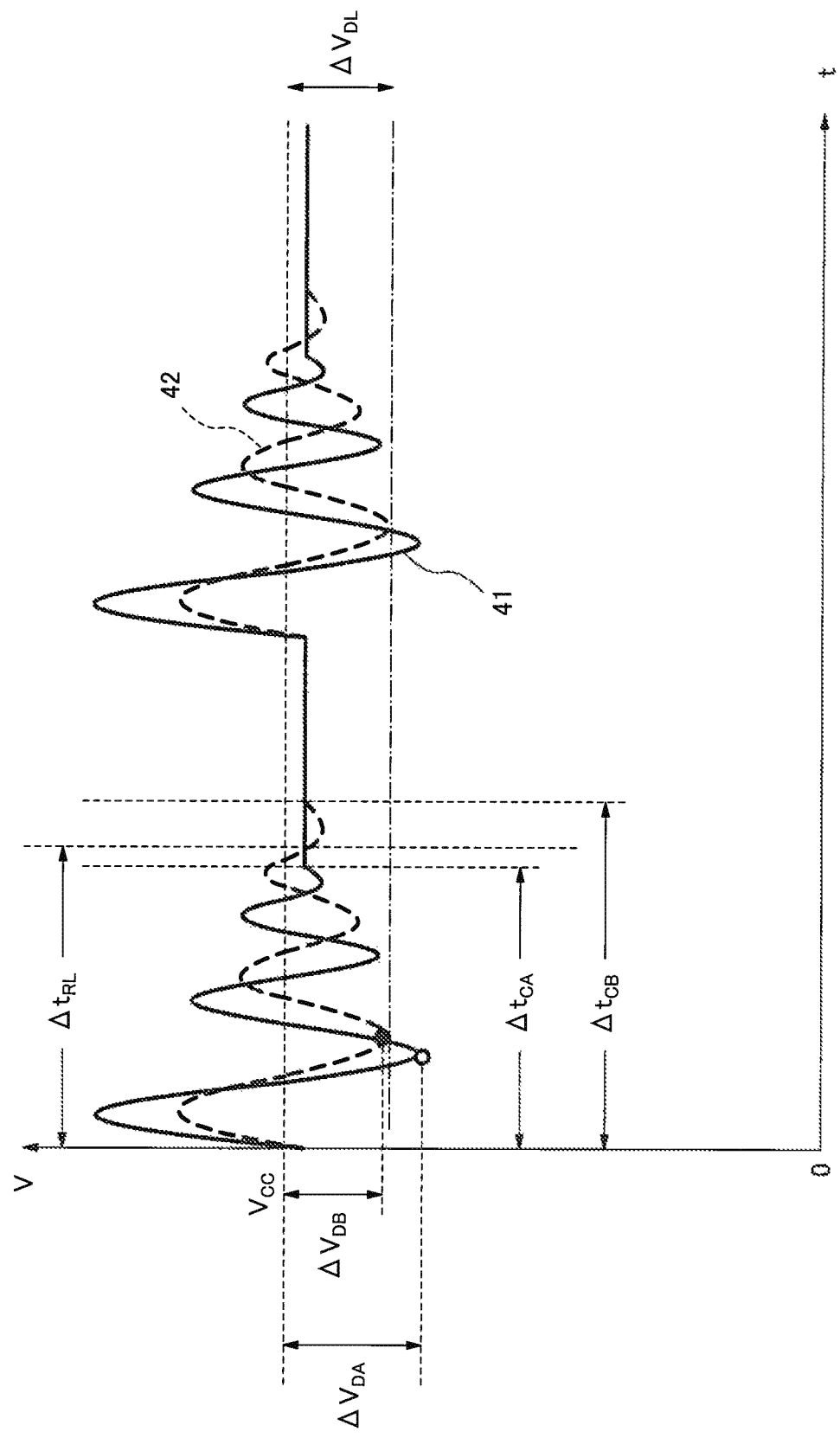
FIG. 7 is an example of a voltage fluctuation characteristic as a power supply voltage fluctuation characteristic.

In S8, the calculating means 9 performs the characteristic analysis of the circuit using the power supply system equivalent circuit model for the PCB as exemplified in FIG. 6 as circuit analysis processing. And the calculating means 9 derives the power supply voltage fluctuation characteristic as shown in FIG. 7. Next, the processing is advanced to S3.

In S3, the power supply voltage fluctuation condition determination means 3 automatically determines whether the derived voltage fluctuation characteristic satisfies the power supply voltage fluctuation condition read from the determination reference database 4.

The power supply voltage fluctuation condition determination means 3 determines whether the following two conditions are satisfied as shown in FIG. 7. The first condition is that a value dropping from a direct-current voltage $V_{CC}$ in the power supply voltage fluctuation condition is within $\Delta V_{DL}$.

The second condition is that a return time is within $\Delta t_{RL}$ which is a time interval from the time at a switching operation of LSI starting (ex .t=0) to the time in a voltage fluctuation converging (for example, a time interval from the time at a switching operation starting to the time in a width of a voltage fluctuation reaching within 1%).

In S3, the power supply voltage fluctuation condition determination means 3 analyzes the characteristic 41 of a power supply voltage waveform A in an observation point (76 in FIG. 6, for example) in the LSI shown in FIG. 7, for example. The return time $\Delta t_{CA}$ of the power supply voltage waveform A is shorter than $\Delta t_{RL}$, and the condition of $t_{CA} < \Delta t_{RL}$ is satisfied. However, the voltage drop value $\Delta V_{DA}$ is larger than $\Delta V_{DL}$, and the condition of $\Delta V_{DA} < \Delta V_{DL}$ is not satisfied. Therefore, it is analyzed that the power supply voltage waveform A does not satisfy the determination reference, and it is determined that the LSI does not operate stably.

On the other hand, the characteristic 42 of a power supply voltage waveform B is analyzed in another observation point of the LSI shown in FIG. 7. The voltage drop value $\Delta V_{DB}$ of the power supply voltage waveform B is smaller than $\Delta V_{DL}$, and the condition of $\Delta V_{DB} < \Delta V_{DL}$ is satisfied. However, the return time $t_{CB}$ is longer than $\Delta t_{RL}$, and the condition of $t_{CB} < \Delta t_{RL}$ is not satisfied. It is determined that the LSI does not operate stably even in this case.

Although both the voltage drop value and the return time are considered as the power supply voltage fluctuation conditions, it may be considered that only a voltage drop value is required as the condition. In that case, in the characteristic 42 of the power supply voltage waveform B at an observation point of the LSI, since the voltage drop value $\Delta V_{DB}$ satisfies the condition of $\Delta V_{DB} < \Delta V_{DL}$, it is determined that the LSI operates stably.

In FIG. 6, the voltage fluctuation is monitored at the point shown as the power supply voltage characteristic in the power supply circuit model for the PCB as shown in FIG. 3 (in this case, it is a point connecting a power supply dividing circuit to a package of the LSI, that is, 66 in FIGS. 3 and 76 in FIG. 6). However, it is also possible to set the power supply voltage fluctuation condition in the voltage value at another monitoring point (a voltage between a power supply and a ground at an edge of a power supply plane, for example).

In this way, the power supply voltage fluctuation condition determination means 3 executes the power supply voltage fluctuation characteristic comparison processing (S3) by performing the circuit analysis processing (S8) for the power supply system equivalent circuit model of the PCB as shown in FIG. 3. Next, the processing is advanced to S4.

In S4, the power supply voltage fluctuation condition determination means 3 performs the determination processing for determining whether the determination reference is satisfied. If the power supply voltage fluctuation characteristic does not satisfy the determination reference in the determination process, the power supply voltage fluctuation condition determination means 3 advances the processing to S9.

In S9, the circuit structure/operation changing means 5 changes the LSI concretely. This change of the LSI does not entail a change in size of the LSI.

The processing for changing the LSI concretely includes a circuit operation ratio change processing for changing an operation ratio of a circuit block in the LSI, a circuit operation timing processing for changing an operation timing of a plurality of circuit blocks in the LSI, and a power supply wiring structure change processing for changing the structures of a power supply wiring and a package, for example. The above-mentioned processing will be described in detail after the third exemplary embodiment. However, the change processing of the LSI is not limited to those, and the processes for changing other concrete circuit structure may be performed, which are described in sixth and seventh exemplary embodiments.

Variations of the change processing of the concrete circuit structure and operation to be chosen increase depending on the above-mentioned selection processing of the change method in S9. However, the flowchart is not limited to that of FIG. 5.

The circuit structure/operation change processing in S9 is automatically performed by the circuit structure and the operation change indicators prepared in the determination reference database 4 basically, and the change processing of the circuit structure and the operation is performed according to the results of the processing.

The changed circuit structure is inputted into the equivalent circuit model formation processing (S7) again, and a series of processes of the circuit analysis processing (S8), the power supply voltage fluctuation characteristic comparison processing (S3), and the determination process (S4) are executed once again.

A series of those processes described above are repeated until the power supply voltage fluctuation characteristic satisfies the determination reference in the determination process of S4. In a case that the determination reference is not satisfied and the circuit structure operation change processing is performed even once in S9, various change processes are performed in order until the determination reference is satisfied in S4, and the change indicators are prepared in the determination reference database. As a result, the change processing (S9) is performed automatically until the determination reference is satisfied in the determination process of S4, and the structure of the PCB with a stable power supply can be obtained.

If it is determined that the power supply voltage fluctuation characteristic satisfies the determination reference in the determination process S4 after a series of processes in the above-mentioned exemplary embodiment are performed, the determination results are output to the output device 6. At the same time, it may be output to a CAD data (S101) and the LSI design information (S102).

[Description of Effect] Next, the effect in the present exemplary embodiment will be described. By the above-mentioned configuration in the present exemplary embodiment, it becomes possible to determine easily whether the power supply circuit of the PCB is designed stably to the voltage fluctuation by preparing the power supply voltage fluctuation condition and the structure change indicator for the LSI. And it is possible to design stably and easily the power supply circuit of the PCB mounting the LSI to the voltage fluctuation.

By analyzing using the equivalent circuit model which reproduces the characteristics of the LSI and the PCB, it becomes possible to determine easily in a realistic time period whether the power supply circuit is designed stably to the voltage fluctuation. It is also possible to derive the power supply voltage fluctuation characteristic by absolute quantity, and it becomes possible to perform quantitative evaluation and measures.

Since the change processing of the LSI in S9 is the change in the operation state of the circuit block in the LSI and the change in the power supply structure, or the like, an extra space is not required in the LSI when changing. Therefore, it becomes possible to design the power supply circuit of the PCB mounting the LSI stably to the voltage fluctuation without causing the expansion of the chip size and the mounting area even in the densely-mounted LSI.

[The Third Exemplary Embodiment] Next, the third exemplary embodiment will be described.

Figure 8:
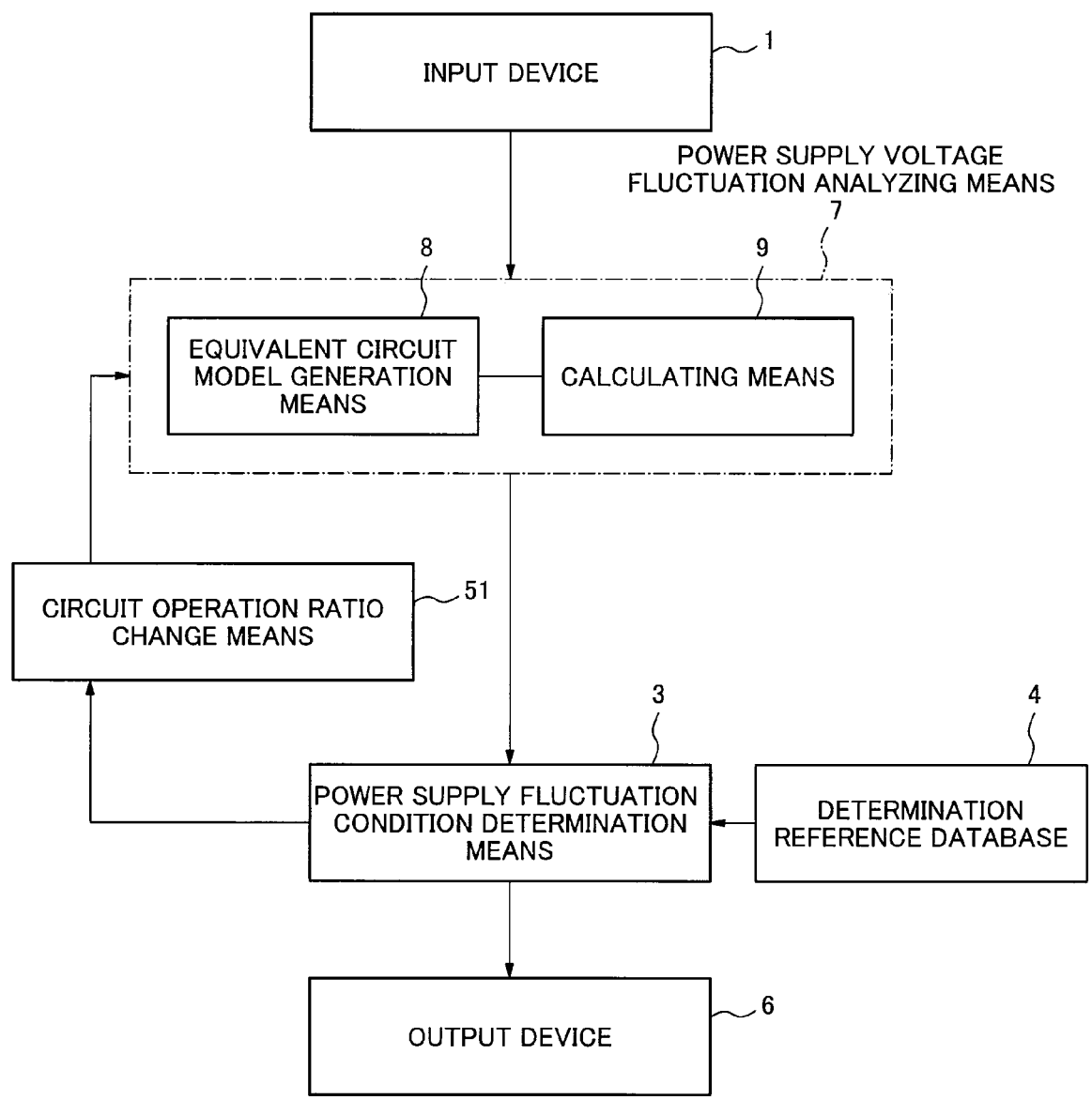
FIG. 8 is a diagram showing a system configuration of the third exemplary embodiment.

[Description of Configuration] As shown in FIG. 8, the present exemplary embodiment differs from the second exemplary embodiment in that a circuit operation ratio change means 51 is included as the circuit structure/operation changing means 5. Other structures and connecting relations are the same as those of the second exemplary embodiment.

The circuit operation ratio change means 51 has a function to change an operation ratio of a circuit block inside an LSI based on a change indicator prepared in the determination reference database 4.

[Description of Operation] Next, the operation in the present exemplary embodiment will be described.

Figure 9:
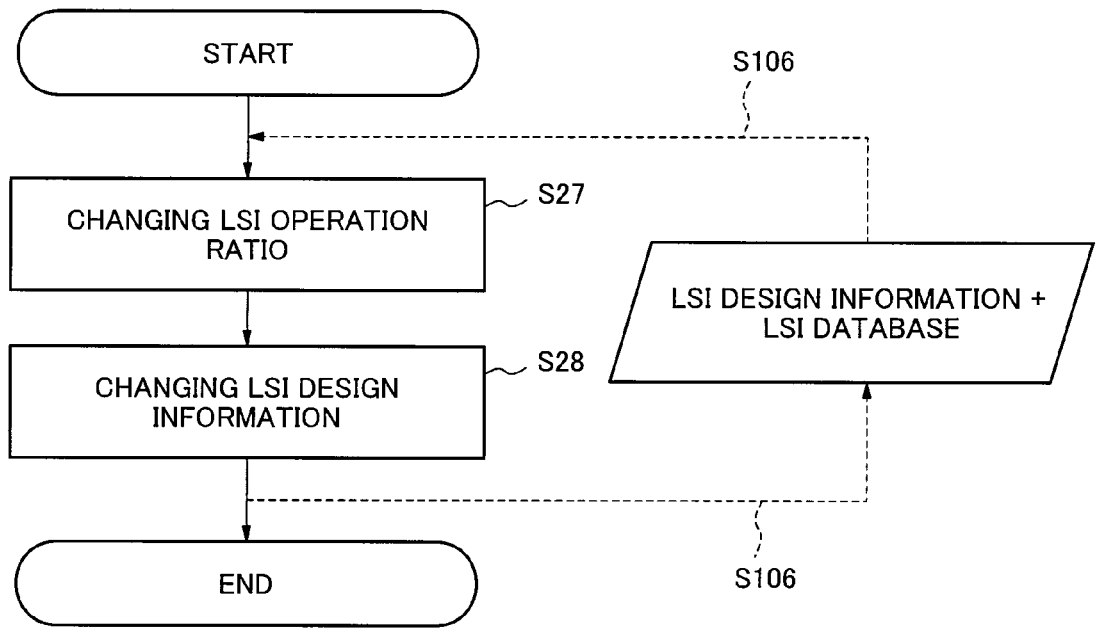
FIG. 9 is a diagram showing a flowchart for change processing of a circuit operation ratio.

FIG. 9 is a flowchart for circuit operation ratio change processing (S10) showing an example of concrete change processing of an LSI in the circuit structure/operation change processing in S9 (shown in FIG. 5).

In S4, the power supply voltage fluctuation condition determination means 3 performs the processing for comparing the power supply voltage fluctuation characteristic and the power supply voltage fluctuation condition provided for the determination reference database 4, and the processing is advanced to S27 if it is determined that the determination reference is not satisfied.

In S27, the circuit operation ratio change means 51 changes an operation ratio of a circuit block inside the LSI as an LSI operation ratio change processing according to the change indicator prepared in the determination reference database 4. Next, the processing is advanced to S28.

In S28, the circuit operation ratio change means 51 performs the change of the circuit operation by changing circuit blocks between an active circuit block and a static circuit block, and by selecting automatically information about a related power distribution circuit and a package.

Figure 10A:
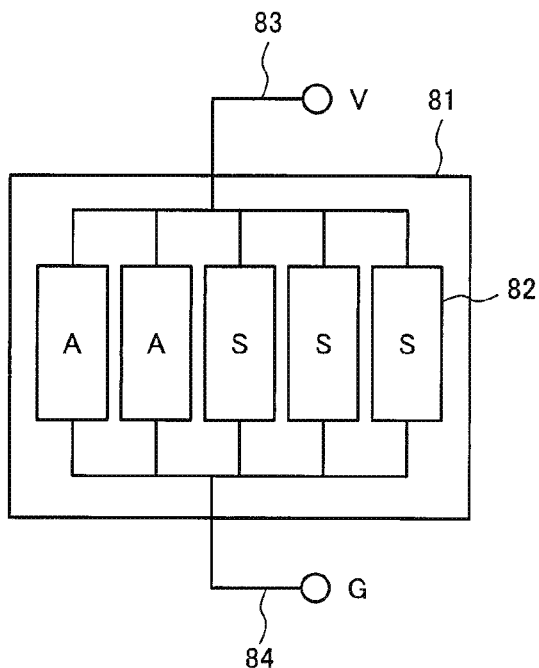
FIG. 10A is a diagram showing a circuit structure of an LSI before the change.
Figure 10B:
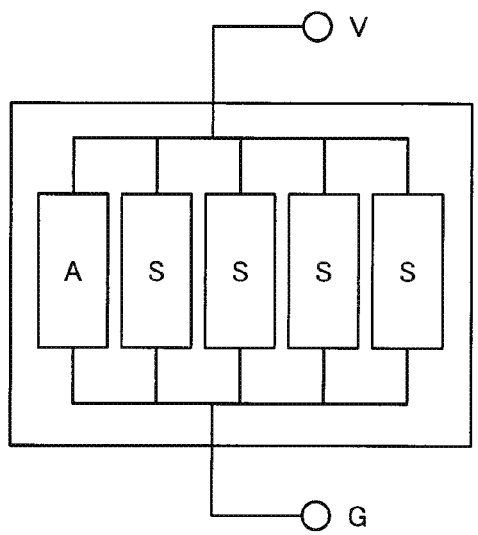
FIG. 10B is a diagram showing a circuit structure of an LSI after the change.

FIGS. 10A and 10B show examples of the concrete processing in changing the operation ratio of the circuit block in the LSI. There exist in the LSI 81 a plurality of circuit blocks 82 connected to a power supply terminal 83 and a ground terminal 84. Here, in FIG. 10A which shows the circuit structure before change, forty percent of the circuit blocks is operating (Active), and the remaining sixty percent is in the state of non-operation (Static).

The above-mentioned "operating" means a switching operation (repeat of ON-OFF states by a constant period). "An active circuit block" means a circuit block which always performs switching operation (synchronizing with the clock of a circuit). "A static circuit block" means a circuit block which performs switching operation in a longer cycle than a clock period or operates at random.

There also is, in the LSI, a circuit block which does not perform switching operation due to no inputted signal in spite of being connected between a power supply and a ground (GND). Accordingly, the "static circuit blocks" also includes the circuit block not performing the above-mentioned switching operation.

If it is determined that the determination reference is not satisfied in S4, the circuit structure/operation changing means 5 makes the operation ratio of the circuit block changed from forty percent to twenty percent according to the change indicator prepared in the determination reference database 4, as shown in FIG. 10B.

Although the example changed from forty percent to twenty percent is shown here as an example of changing the operation ratio of the circuit block, it is not limited to this, but it is also available if it can decrease an operation ratio. Further, there can be inside the LSI a circuit block which performs extra operation compared with a requested operation. In above-mentioned case, according to the present exemplary embodiment, the operation ratio of the circuit block is changed which mainly performs the extra operation in order to suppress the influence on the LSI operation.

Figure 11A:
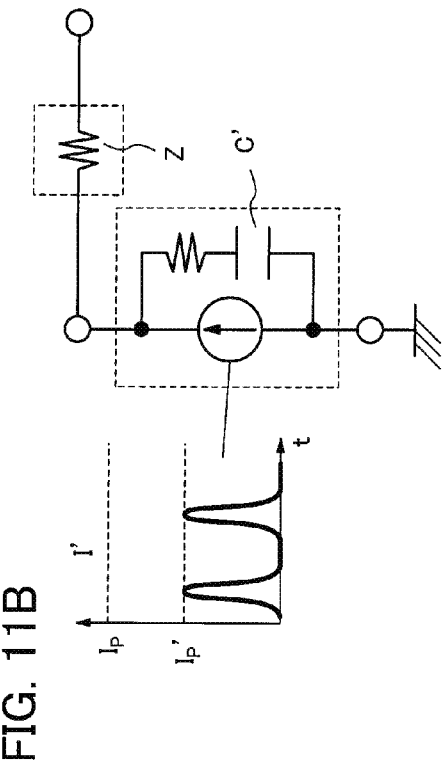
FIG. 11A is a diagram showing an equivalent circuit model of the LSI and a power supply voltage fluctuation waveform before the change in the circuit operation.
Figure 11B:
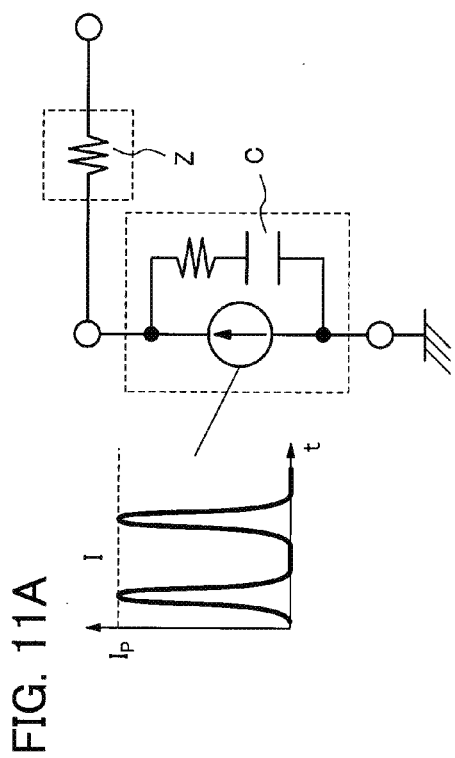
FIG. 11B is a diagram showing an equivalent circuit model of the LSI and a power supply voltage fluctuation waveform after the change in the circuit operation.
Figure 11C:
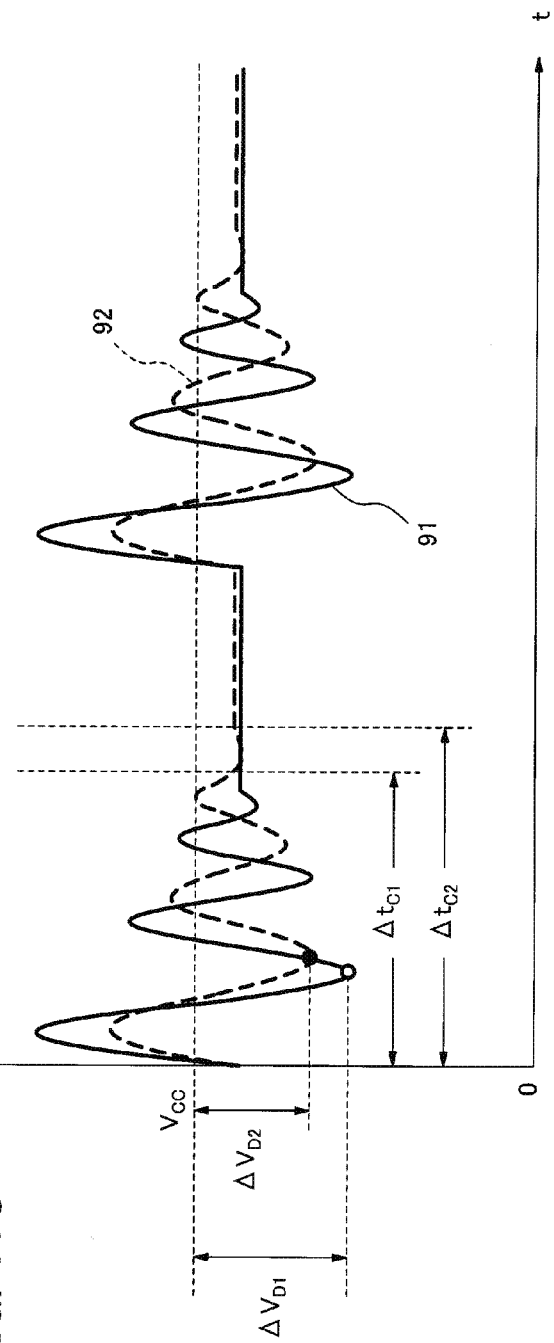
FIG. 11C is a diagram showing power supply voltage waveforms before and after the change in the circuit operation.

[Description of Effect] Next, the effect in the present exemplary embodiment will be described. FIGS. 11A, 11B, and 11C show equivalent circuit models of the LSI and power supply voltage fluctuation waveforms. FIG. 11A shows the equivalent circuit model of the LSI and a power supply voltage fluctuation waveform before the change in the circuit operation. On the other hand, FIG. 11B shows the equivalent circuit model of the LSI and the power supply voltage fluctuation waveform after change in the circuit operation.

By the above-mentioned change of the circuit structure, the power supply current waveform I becomes I', and the respective peak values become IP>IP', and an electric current flowing in a power supply terminal of the LSI becomes smaller. Since equivalent capacitance C inside the LSI becomes C' and C<C', the impedance of the power supply circuit of the LSI becomes smaller.

The reason will be described here why the equivalent capacitance inside the LSI is changed from C to C'. A circuit block is connected between a power supply and a ground basically, and a transistor which composes a circuit block has a capacitive component. Since a circuit block in the non-operation circuit block hardly operates (its on-off state does not change), it can be regarded as a mostly stable capacitance (a capacitor) which does not fluctuate even if time passes. Accordingly, if the ratio of the non-operation circuit block increases, it is possible to assume that the ratio of the capacitance between the power supply and the ground increases.

By the change of the circuit operation in the LSI, a power supply voltage waveform 91 before the change of the circuit operation is changed into a power supply voltage waveform 92 after the change of the circuit operation as shown in FIG. 11C, and ΔVD1 decreases to ΔVD2. As a result, it becomes ΔVD1>ΔVD2, and the characteristic is changed toward the direction where the determination reference is satisfied. Since the relation of C<C' is realized, ΔtC2 which represents the return time of the voltage fluctuation may become larger than ΔtC1. Therefore, it is necessary to pay attention to that the return time does not exceed the determination reference.

However, although the power supply voltage fluctuation becomes smaller if the operation ratio of the circuit block becomes smaller, a minimum number of the operative circuit block is required for performing a basic operation in the LSI. If the operation ratio is made smaller than that, the LSI may not operate any more.

Accordingly, if a change indicator with a restriction that can be changed (such as "to decrease an operation ratio so that the operation ratio may be equal to twenty percent or more" in this example) is prepared as the change indicator prepared in the determination reference database 4, and the processing is performed which changes the ratio of the circuit block in the LSI according to the change indicator, the circuit operation change processing (S10) can be performed with removing a danger that the LSI does not operate.

The change processing of the circuit structure of the LSI in the present exemplary embodiment is to change the operation ratio of the circuit block in the LSI, and an extra space is not required in the LSI when changing. Therefore, it becomes possible to design the power supply circuit of the PCB mounting the LSI stably to the voltage fluctuation without causing the expansion of the chip size and the mounting area even in the densely-mounted LSI.

[The Fourth Exemplary Embodiment] Next, the fourth exemplary embodiment will be described.

Figure 12:
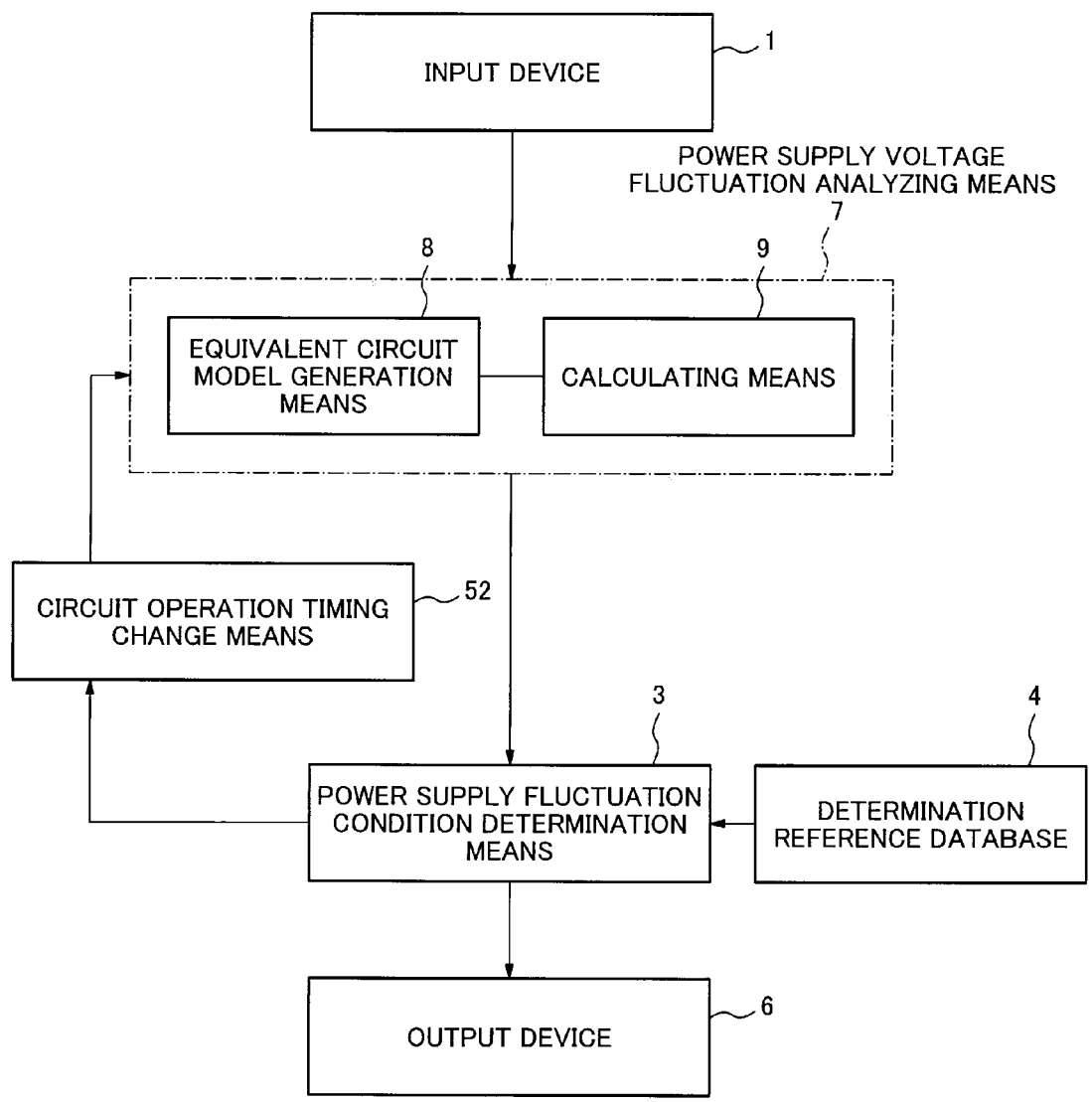
FIG. 12 is a diagram showing a system configuration of the fourth exemplary embodiment.

[Description of Configuration] As shown in FIG. 12, the present exemplary embodiment differs from the second exemplary embodiment in the point that a circuit operation timing change means 52 is provided as the circuit structure/operation changing means 5. Other structures and connecting relations are the same as those of the first exemplary embodiment.

The circuit operation timing change means 52 has a function to change operation timing of a circuit block inside the LSI based on the change indicator prepared in the determination reference database 4.

[Description of Operation] Next, the operation in the present exemplary embodiment will be described.

Figure 13:
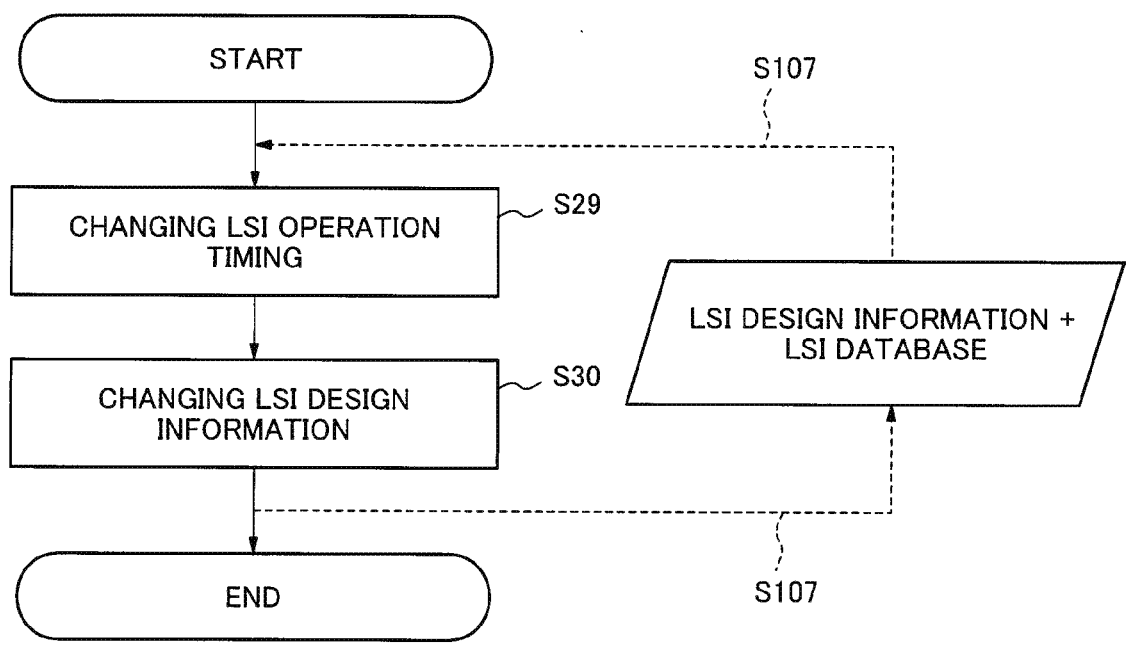
FIG. 13 is a diagram showing a flowchart of change processing for circuit operation timing.

FIG. 13 is a flowchart of circuit operation timing change processing (S11) showing an example of concrete change processing of circuit operation of the LSI in the circuit structure/operation change processing of S9 (shown in FIG. 5).

In S4, the power supply voltage fluctuation condition determination means 3 performs the processing for comparing a power supply voltage fluctuation characteristic and the power supply voltage fluctuation condition provided in the determination reference database 4, and the processing is advanced to S29 if it is determined that the determination reference is not satisfied.

In S29, the circuit operation timing change means 52 performs LSI operation timing change processing in which the operation timing of a circuit block inside the LSI is changed according to the change indicator prepared in the determination reference database 4. Next, the processing is advanced to S30.

In S30, the circuit operation timing change means 52 changes the operation timing in the LSI as the change processing of the LSI circuit operation. That is, the change of the operation timing of each circuit block in the LSI is performed by selecting automatically information on a power supply dividing circuit and a package relating thereto.

FIGS. 14A and 14B are examples of concrete change processing when changing the operation timing of a circuit block in the LSI. A circuit block 82 is provided inside the LSI 81, and it is connected to a power supply terminal 83 and a ground terminal 84.

FIG. 14A shows a case before change, and forty percent of circuit blocks is operating (Active) and the remaining sixty percent is in the state of non-operation (Static). The power supply current of the first circuit block 85 and the second circuit block 86, which are operating, are represented by I1 and I2, respectively, and I1 and I2 are operating at the same timing.

In S4, if it is determined that the determination reference is not satisfied, the operation timing of the first circuit block 85 and the second circuit block 86, which are operating, is changed such that flowing timing of I1 and I2 is different as described in FIG. 14B according to the change indicator prepared in the determination reference database 4 in S29.

Figure 15A:
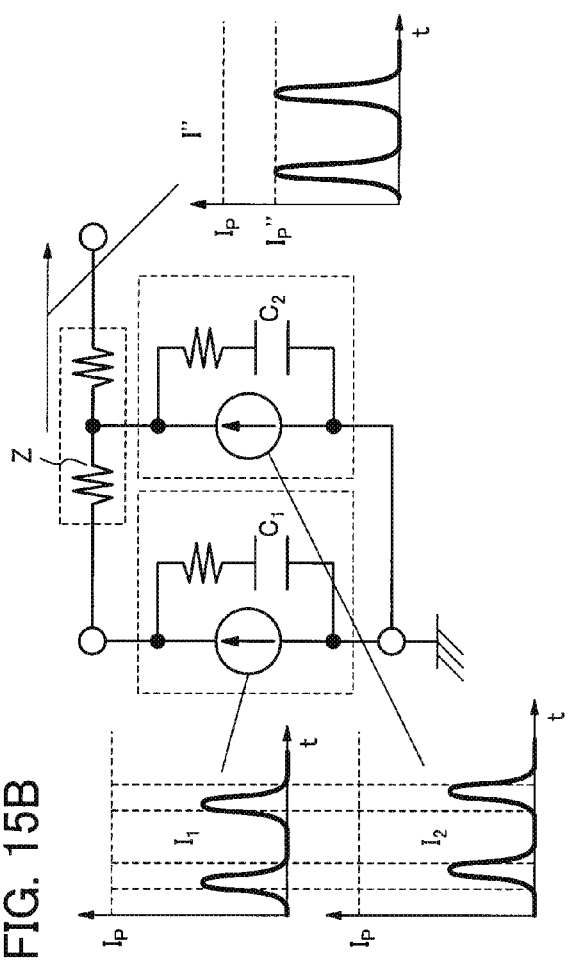
FIG. 15A is a diagram showing an equivalent circuit model and a waveform of a power supply voltage fluctuation of the LSI before the change in the circuit operation.
Figure 15B:
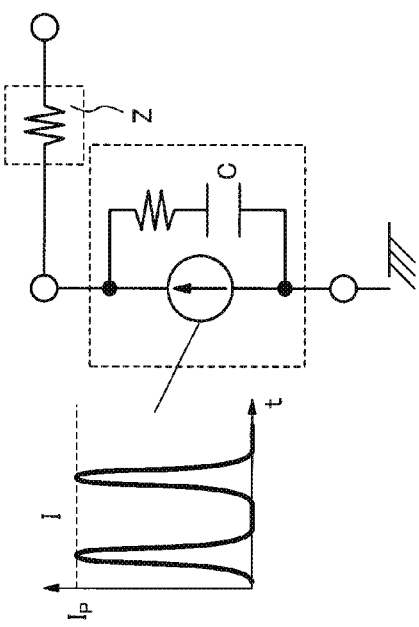
FIG. 15B is a diagram showing an equivalent circuit model and a waveform of a power supply voltage fluctuation of the LSI after the change in the circuit operation.
Figure 15C:
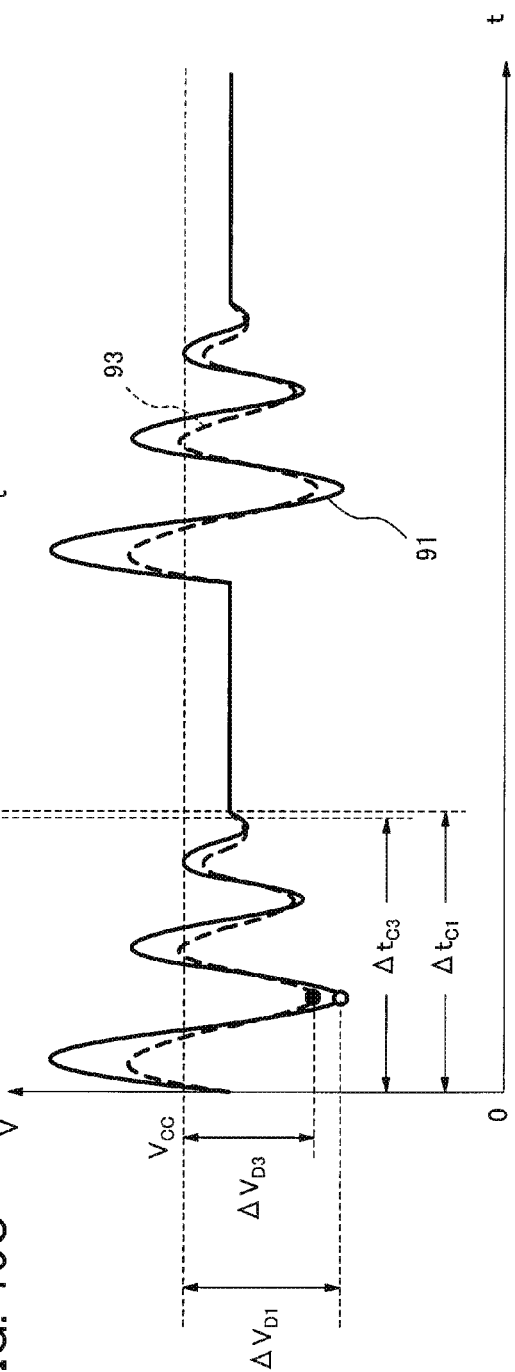
FIG. 15C is a diagram showing power supply voltage waveforms before and after the change in the circuit operation.

[Description of Effect] Next, the effect in the present exemplary embodiment will be described. The equivalent circuit model and a power supply voltage fluctuation waveform of the LSI are shown in FIGS. 15A, 15B, and 15C. The equivalent circuit model and the power supply voltage fluctuation waveform of the LSI before the change in the circuit operation are shown in FIG. 15A. On the other hand, the equivalent circuit model and the power supply voltage fluctuation waveform of the LSI after the change in the circuit operation are shown in FIG. 15B.

At that time, the power supply current waveform I" in FIG. 15B becomes the sum of the current waveform I1 and I2 in respective circuit block. The amount of current flowing (the charge amount) does not change in the power supply current waveform I before the change in the circuit operation and the current waveform I" after the change in the circuit operation. However, since timing is different in I1 and I2 as for the power supply current waveform I", a peak value IP" of the power supply current waveform I" becomes smaller than IP (IP>IP"). As a result, the peak value of the electric current flowing into a power supply terminal of the LSI also becomes smaller, and high-frequency component of the electric current is also suppressed.

Equivalent capacitance C" inside the LSI in FIG. 15B becomes the sum of equivalent capacitance $C_1$ and $C_2$ in the respective circuit block, which is represented by C=C" (C=$C_1$+$C_2$).

By this circuit operation change in the LSI, a power supply voltage waveform 91 before the change in the circuit operation is changed into a power supply voltage waveform 93 after the change in the circuit operation as shown in FIG. 15C, and $\Delta V_{D1}$ decreases to $\Delta V_{D3}$. As a result, $\Delta V_{D1}$ becomes greater than $\Delta V_{D3}$, that is, $\Delta V_{D1}>\Delta V_{D3}$, and the characteristic is changed toward the direction in which the determination reference is satisfied. Although a relation of C=C" is realized and there is no change in the impedance of the power supply circuit basically, a return time of the voltage fluctuation generally becomes $\Delta t_{C1}>\Delta t_{c3}$ because the peak value of the current waveform becomes smaller and high-frequency component is also suppressed.

However, although the peak value of the power supply current waveform also becomes smaller and the power supply voltage fluctuation becomes smaller if the difference in operation timing of a circuit block becomes larger, a difference (delay) needs to be set for the range of the allowable value that does not cause an erroneous operation of the LSI because there exists the tolerance for LSI to perform normal operation in the difference (delay) in timing for each circuit block in the LSI.

Accordingly, the determination reference database 4 is provided with a change indicator with a restriction that can be changed. That is, the change indicator is the indicator that a difference in operation timing of circuit blocks is no more than the allowable value by which it is confirmed that LSI performs normal operation (for example, "the maximum value of the difference in timing between the circuit blocks which are operating (Active) is no more than one-tenth of the cycle of the operation signal") and the operation timing of the circuit blocks can be made as large as possible. If the processing for changing the operation timing of circuit blocks in the LSI is performed according to the change indicator (in this example, "the difference in timing between the circuit blocks which are operating (Active) is shifted so that it will become no more than one-tenth of the cycle of the operation signal"), the circuit operation timing change processing (S11) can be performed with removing the risk for the LSI to malfunction The change processing of the LSI in the present exemplary embodiment is to change the operation state of the circuit block in the LSI and does not require an extra space in the LSI in changing. Therefore, it is possible to design the power supply circuit of the PCB mounting the LSI stably to the voltage fluctuation without expanding the chip size and the mounting area of the densely-mounted LSI.

[The Fifth Exemplary Embodiment] Next, the fifth exemplary embodiment will be described.

Figure 16:
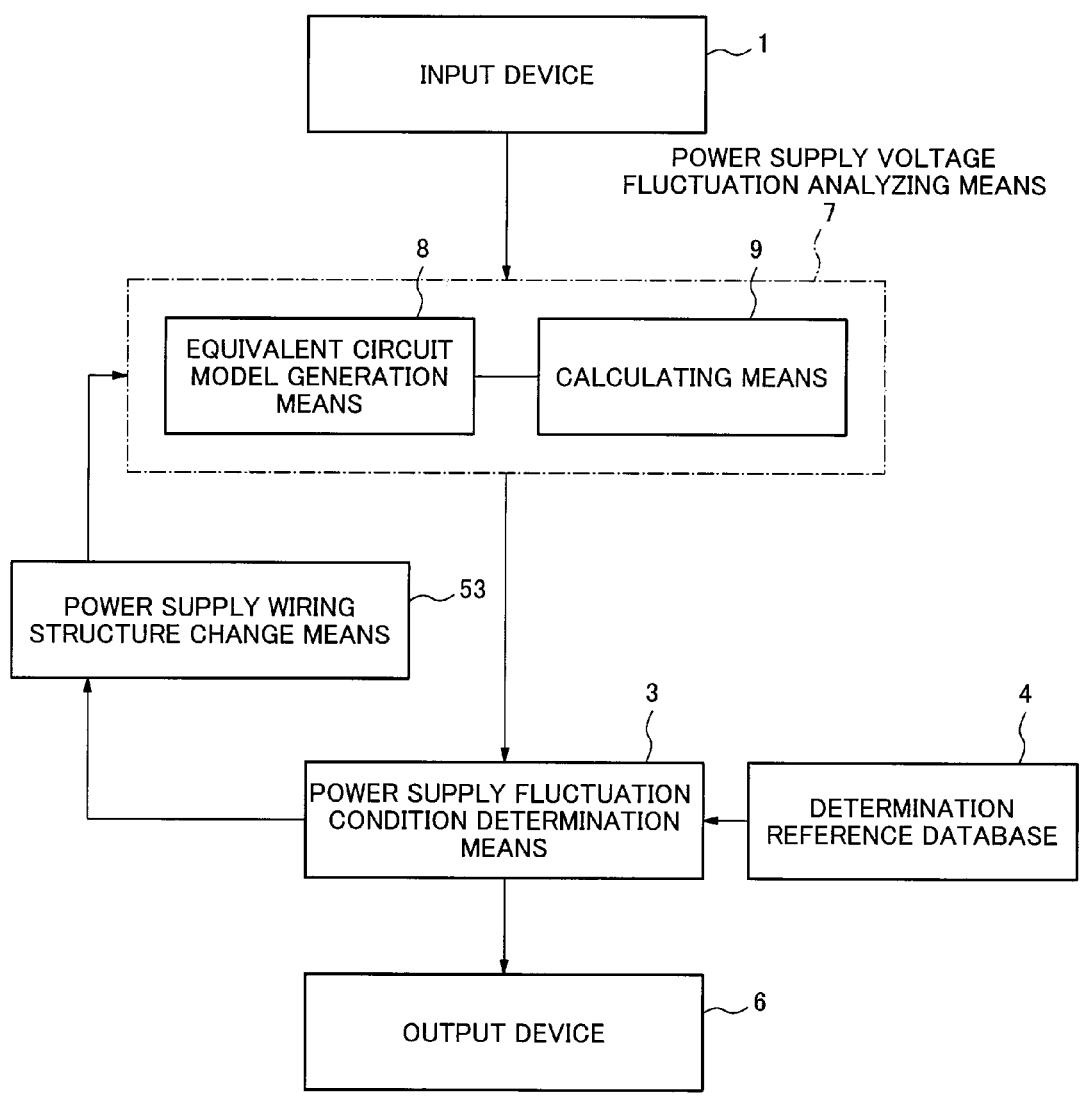
FIG. 16 is a diagram showing a system configuration of the fifth exemplary embodiment.

[Description of Configuration] As shown in FIG. 16, the present exemplary embodiment differs from the second exemplary embodiment in a point that a power supply wiring structure change means 53 is provided as the circuit structure/operation changing means 5. Other structures and connecting relations are the same as those of the first exemplary embodiment.

The power supply wiring structure change means 53 has a function to change a power supply wiring structure inside the LSI based on the change indicator prepared in the determination reference database 4.

[Description of Operation] Next, the operation in the present exemplary embodiment will be described.

Figure 17:
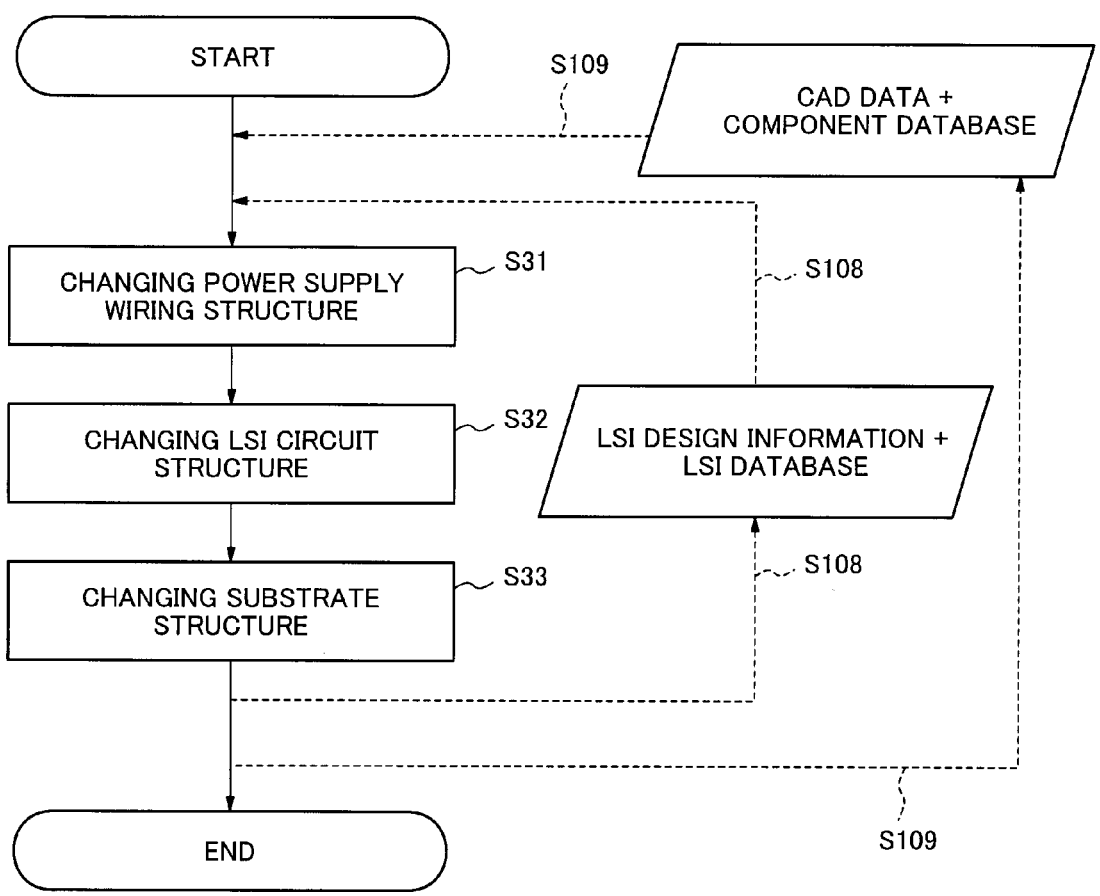
FIG. 17 is a diagram showing a flowchart of change processing of a power supply wiring structure.

FIG. 17 is a flowchart of power supply wiring structure change processing (S12) showing an example of concrete change processing of the circuit structure of the LSI in the circuit structure change processing in S9 (shown in FIG. 5).

In S4, the power supply voltage fluctuation condition determination means 3 performs the processing for comparing a power supply voltage fluctuation characteristic and the power supply voltage fluctuation condition prepared in the determination reference database 4, and if it is determined that the determination reference is not satisfied, the processing is advanced to S31.

In S31, the power supply wiring structure change means 53 changes the power supply wiring structure inside the LSI according to the change indicator prepared in the determination reference database 4 as the power supply wiring structure change processing. Next, the processing is advanced to S32.

In S32, the power supply wiring structure change means 53 changes the power supply wiring inside the LSI as the LSI circuit structure change processing. That is, the change in the circuit structure is performed by automatically selecting the change in the structure of the circuit block in the LSI and the power supply dividing circuit related thereto, the information about the power supply dividing circuits for a whole body in the LSI related thereto and in the packages. And input information on the circuit structure of the power supply system in the changed LSI inside and the package is derived. Next, the processing is advanced to S33.

In S33, the power supply wiring structure change means 53 changes a substrate structure corresponding to the change in the power supply circuit structure of the LSI as the substrate structure change processing, and derives the structure information.

Figure 18A:
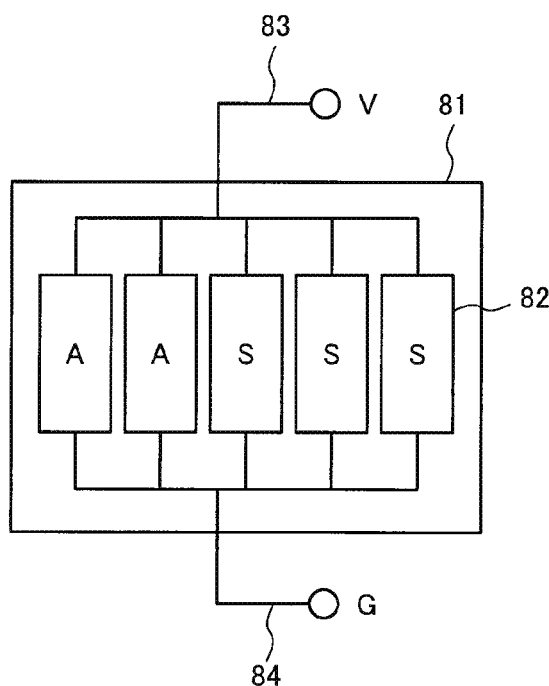
FIG. 18A is a diagram showing a circuit structure of an LSI before the change thereof
Figure 18B:
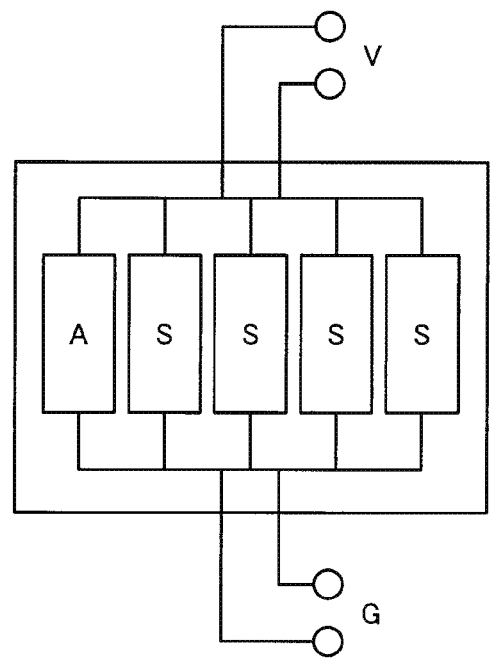
FIG. 18B is a diagram. showing a circuit structure of an LSI after the change thereof.

FIGS. 18A and 18B are examples of change processing for a concrete circuit structure in a case of changing the power supply wiring structure in the LSI. There exists in the LSI 81 a circuit block 82 connected to a power supply terminal 83 and a ground terminal 84. In FIG. 18A, each of the power supply terminal 83 and the ground terminal 84 is composed of one terminal.

In S4, if the power supply voltage fluctuation condition determination means 3 determines that the determination reference is not satisfied, the power supply wiring structure change means 53 makes each wiring of the power supply terminal 83 and the ground terminal 84 use two terminals as shown in FIG. 18B according to the change indicator prepared in the determination reference database.

The number of terminals is basically determined depending on the kind of the LSI in a package part which connects the LSI to the substrate. Terminals are distributed to three kinds of a power supply, a ground, and a signal. In the present exemplary embodiment shown in FIG. 18, the number of terminals in a whole body of the LSI is not increased, but the ratio of the power supply terminal and the ground terminal to the total terminals is increased. Therefore, even if the terminals for the power supply and the ground are increased, the size of the LSI does not become larger.

Figure 19A:
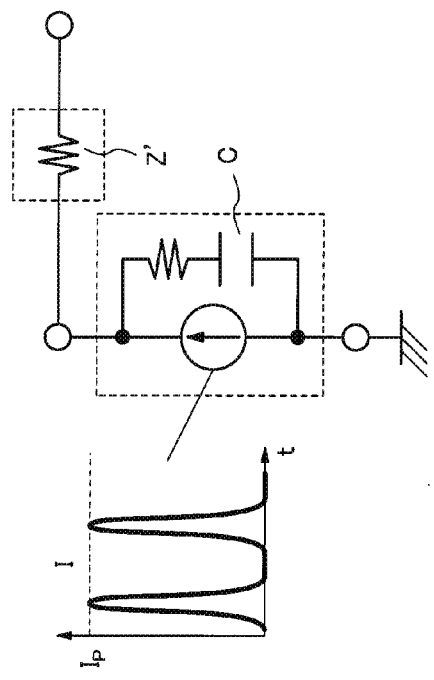
FIG. 19A is a diagram showing an equivalent circuit model and a power supply voltage fluctuation waveform of the LSI before the change in the circuit structure.
Figure 19B:
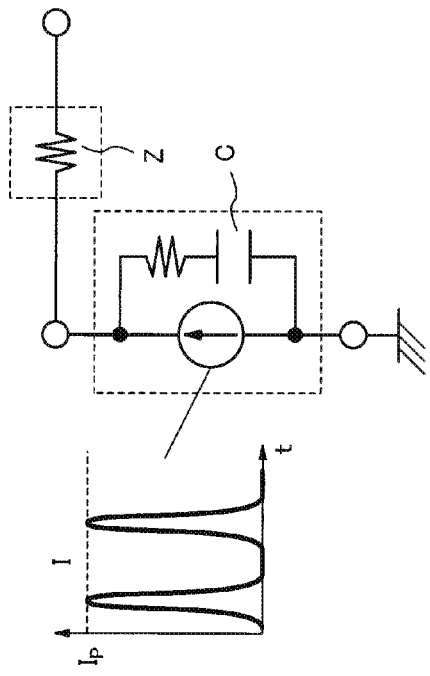
FIG. 19B is a diagram showing an equivalent circuit model and a power supply voltage fluctuation waveform of the LSI after the change in the circuit structure.
Figure 19C:
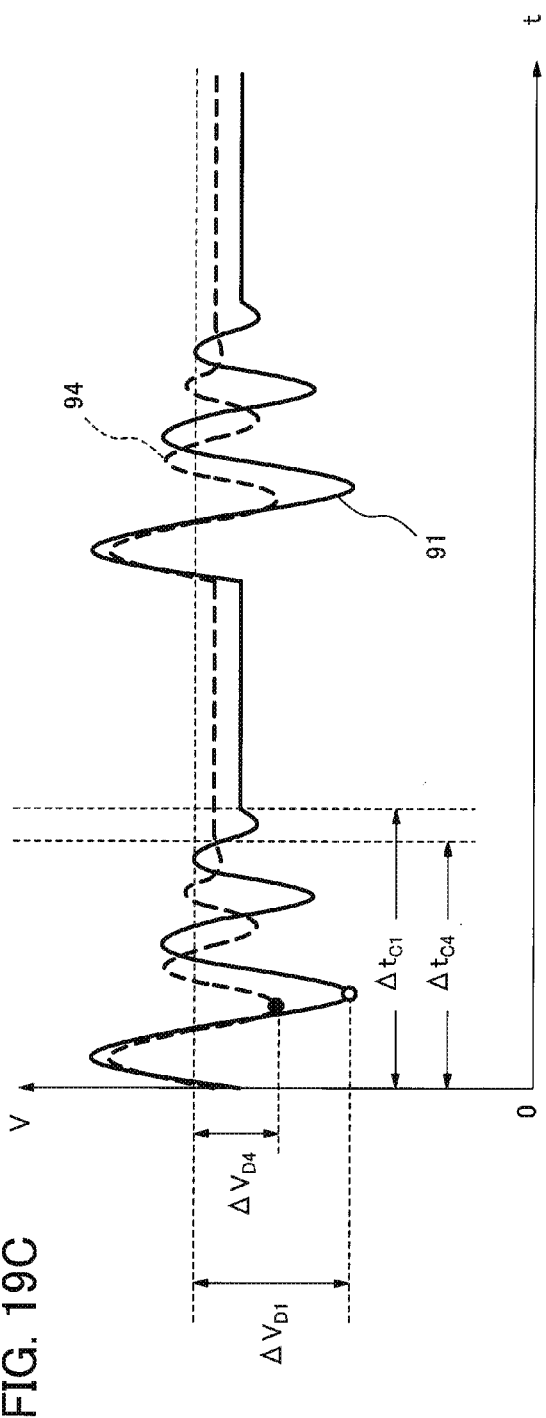
FIG. 19C is a diagram showing power supply voltage waveforms before and after the change in the circuit structure.

[Description of Effect] Next, the effect in the present exemplary embodiment will be described. The equivalent circuit models of the LSI and the power supply voltage fluctuation waveforms are shown in FIGS. 19A, 19B, and 19C. The equivalent circuit model of the LSI and the power supply voltage fluctuation waveform before the change in the circuit structure are shown in the FIG. 19A. On the other hand, the equivalent circuit model of the LSI and the power supply voltage fluctuation waveform after the change in the circuit structure are shown in FIG. 19B. The impedance Z of the power supply wiring including the power supply dividing circuit and the package in the LSI decreases to Z' (Z>Z'). As a result, the impedance of the power supply circuit becomes smaller.

By this circuit structure change of the LSI, the power supply voltage waveform 91 before the circuit structure change is changed into a power supply voltage waveform 94 after the circuit structure change as shown in FIG. 19C, and $\Delta V_{D1}$ decreases and becomes $\Delta V_{D4}$ ($\Delta V_{D1} > \Delta V_{D4}$). As a result, it is possible to change the characteristic toward the direction in which the determination reference is satisfied. The reason why the relation of Z>Z' holds is that a power supply dividing circuit and an inductance component have become smaller, and a return time of the voltage fluctuation generally becomes $\Delta t_{C1} > \Delta t_{C4}$.

However, although a power supply voltage fluctuation becomes smaller if the impedance of the power supply dividing circuit is decreased by increasing power supply terminals, the number of terminals in the LSI is limited. Since the number of terminals available for a power supply and a ground among total terminals is restricted due to the number of the required signal terminals, it is not possible to increase the number of terminals for the power supply and the ground in the LSI beyond the restricted number.

Accordingly, the change indicator with a restriction which can be changed (in this example, "the number of the power supply terminals and the ground terminals is enlarged so that the sum total of the power supply terminals and the ground terminals may become equal to or less than four terminals") is prepared as the change indicator prepared in the determination reference database 4. If the processing for changing the power supply terminals and the ground terminals of the LSI is performed according to the change indicator, the power supply wiring structure change means 53 can perform the power supply wiring structure change processing (S12) taking the restriction on the terminals of the LSI into consideration.

The processing for changing the circuit structure of the LSI in the present exemplary embodiment is to change the terminals connected to the circuit blocks in the LSI and does not require an extra space in the LSI when changing. Therefore, it becomes possible to design the power supply circuit of the PCB mounting the LSI stably to the voltage fluctuation without expanding the chip size and the mounting area of the densely-mounted LSI.

[The Sixth Exemplary Embodiment] Next, the sixth exemplary embodiment will be described.

Figure 20:
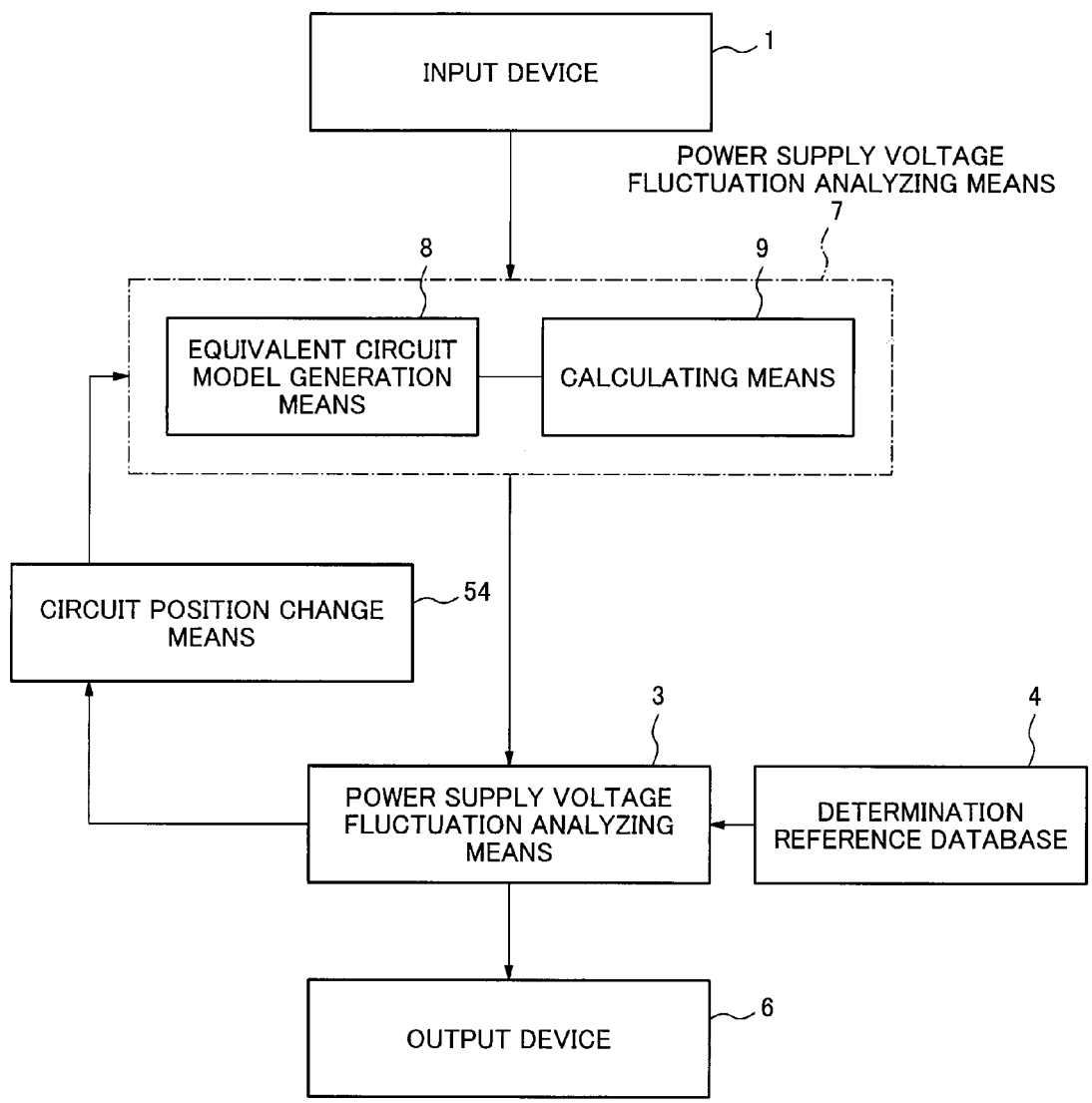
FIG. 20 is a diagram showing a system configuration of the sixth exemplary embodiment.

[Description of Configuration] As shown in FIG. 20, the present exemplary embodiment differs from the second exemplary embodiment in a point that a circuit position change means 54 is provided as the circuit structure/operation changing means 5. The other structures and connecting relations are the same as those of the second exemplary embodiment.

The circuit position change means 54 has a function to change a circuit position inside the LSI based on the change indicator prepared in the determination reference database 4.

[Description of Operation] Next, the operation in the present exemplary embodiment will be described.

Figure 21:
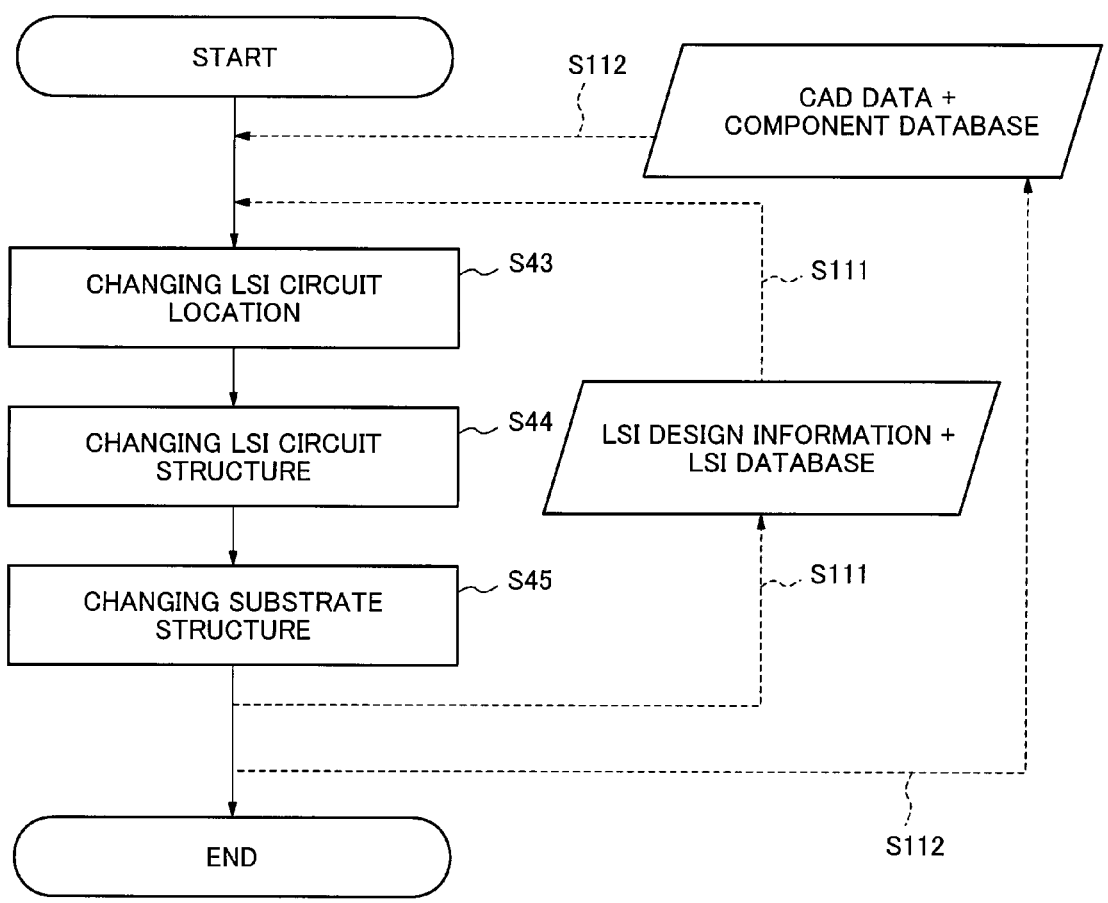
FIG. 21 is a diagram showing a flowchart of circuit repositioning processing.

FIG. 21 is a flowchart for the circuit repositioning processing (S13) showing an example of concrete change processing of the LSI in the circuit structure change processing in S9 (shown in FIG. 5).

In S4, the power supply voltage fluctuation condition determination means 3 performs the processing for comparing the power supply voltage fluctuation characteristic and the power supply voltage fluctuation condition prepared in the determination reference database 4, and if it is determined that the determination reference is not satisfied, the processing is advanced to S43.

In S43, the circuit position change means 54 changes a position of the circuit block inside the LSI according to the change indicator prepared in the determination reference database 4 as the LSI circuit location change processing. Next, the processing is advanced to S44.

In S44, the circuit position change means 54 changes the circuit position inside the LSI as the LSI circuit structural change processing. That is, the change in the circuit structure is performed by automatically selecting the change in arrangement of the circuit block in the LSI and information about the power supply dividing circuit relating thereto and the package. And the input information on the circuit structure of the power supply system inside the changed LSI and in the package is derived. Next, the processing is advanced to S45.

In S45, the circuit position change means 54 changes the substrate structure corresponding to the change in the power supply circuit structure of the LSI as the change processing, and derives the structure information.

Figure 22A:
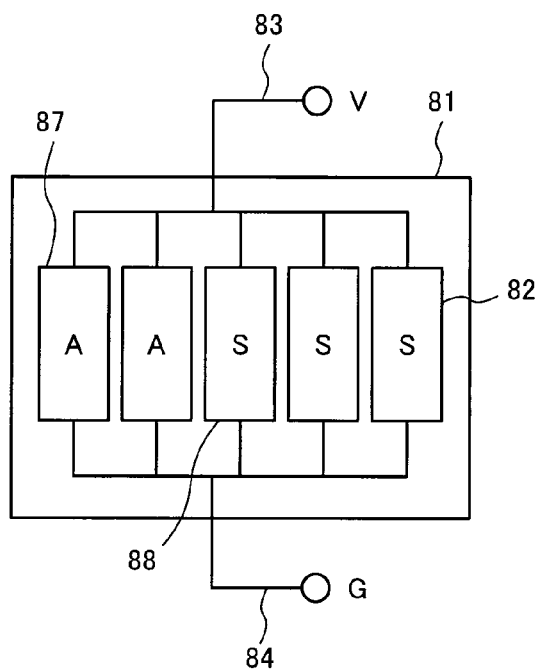
FIG. 22A is a diagram showing a circuit structure of an LSI before the change thereof
Figure 22B:
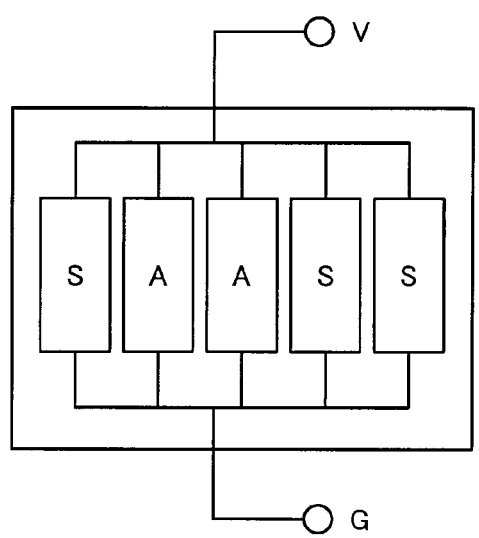
FIG. 22B is a diagram showing a circuit structure of the LSI after the change thereof.

FIGS. 22A and 22B are examples of the processing for changing the concrete circuit structure in a case of changing the position of the circuit block in the LSI. There exists a circuit block 82 connected to a power supply terminal 83 and a ground terminal 84 in the LSI 81.

In a case shown in FIG. 22A, a circuit block 88 near the power supply terminal 83 and the ground terminal 84 is in the state of non-operation (Static), and a circuit block 87 far from the power supply terminal 83 and the ground terminal 84 is in the state of operating (Active). In this case, if an active circuit block is located far from the power supply terminal 83 and the ground terminal 84, the impedance of a power supply dividing circuit tends to become larger.

Accordingly, in the present exemplary embodiment, if it is determined that the determination reference is not satisfied in the determination processing of S4, the circuit position is changed according to the change indicator prepared in the determination reference database 4. As shown in FIG. 22B, the change in the circuit position mentioned above is to change the state of the circuit block 88 near the power supply terminal 83 and the ground terminal 84 into the state of operation (Active), and to change the state of the circuit block 87 far from the power supply terminal 83 and the ground terminal 84 into the state of non-operation (Static).

Figure 23A:
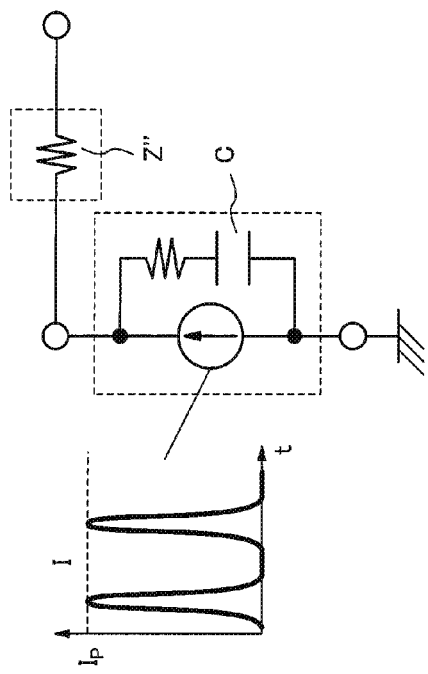
FIG. 23A is a diagram showing an equivalent circuit model and a power supply voltage fluctuation waveform of the LSI before the change in the circuit structure.
Figure 23B:
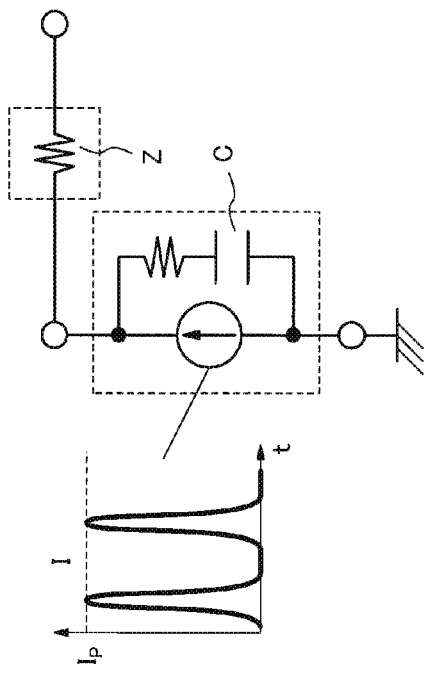
FIG. 23B is a diagram showing an equivalent circuit model and a power supply voltage fluctuation waveform of the LSI after the change in the circuit structure.
Figure 23C:
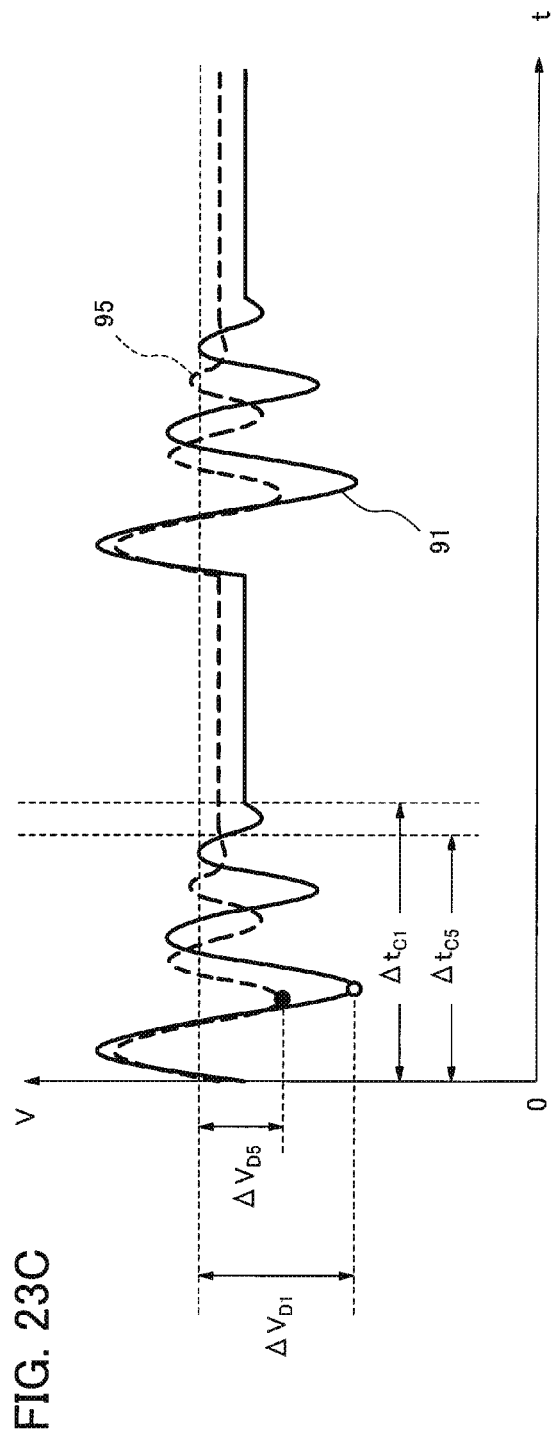
FIG. 23C is a diagram showing power supply voltage waveforms before and after the change in the circuit structure.

[Description of Effect] Next, the effect in the present exemplary embodiment will be described. Equivalent circuit models and power supply voltage fluctuation waveforms of the LSI are shown in FIGS. 23A, 23B, and 23C. An equivalent circuit model and a power supply voltage fluctuation waveform of the LSI before the change are shown in FIG. 23A. On the other hand, an equivalent circuit model and a power supply voltage fluctuation waveform of the LSI after the change are shown in FIG. 23B.

If the circuit block to make operate (Active) is moved into the position near the power supply terminal 83 and the ground terminal 84 as shown in FIG. 23B, the impedance Z of the power supply wiring including the power distribution circuit in the LSI and the package decreases and becomes Z" (Z>Z"). As a result, the impedance of the power supply circuit becomes smaller.

By this operation change in the LSI, a power supply voltage waveform 91 before the change is changed into a power supply voltage waveform 95 after the change in the circuit structure as shown in FIG. 23C. And $\Delta V_{D1}$ decreases and becomes $\Delta V_{D5}$ ($\Delta V_{D1} > \Delta V_{D5}$), and the characteristic can be changed toward the direction in which the determination reference is satisfied. The reason why the relation of Z>Z' holds is that the inductance component of the power supply dividing circuit has become smaller, and a return time of the voltage fluctuation generally becomes $\Delta t_{C1} > \Delta t_{C5}$.

However, although a power supply voltage fluctuation becomes smaller by moving an active circuit block into the vicinity of a power supply terminal and a ground terminal if the impedance of the power supply dividing circuit is made smaller, there is a possibility that a problem other than a power supply system arises such as increasing in length of signal wiring. The position of a circuit block in the LSI cannot be changed beyond the restriction which causes the above-mentioned problem (for example, "the length of a signal wiring is not increased equal to or more than 0.5 mm").

Accordingly, a change indicator with a restriction that can be changed (in this example, "the position of a circuit block to be operated is changed so that the length of a signal wiring can not be increased equal to or more than 0.5 mm") is prepared as the change indicator prepared in the determination reference database 4. If the change processing is performed based on the change indicator, it is possible to perform the circuit position change processing (S13) taking into consideration the restriction other than the power supply system (for example, "the length of a signal wiring").

The change processing of the LSI in the present exemplary embodiment is to change the position of the circuit blocks in the LSI and an extra space in the LSI is not required when changing. Therefore, it becomes possible to design the power supply circuit of the PCB mounting the LSI stably to the voltage fluctuation without expanding the chip size and the mounting area of the densely-mounted LSI.

[The Seventh Exemplary Embodiment] Next, the seventh exemplary embodiment will be described.

Figure 24:
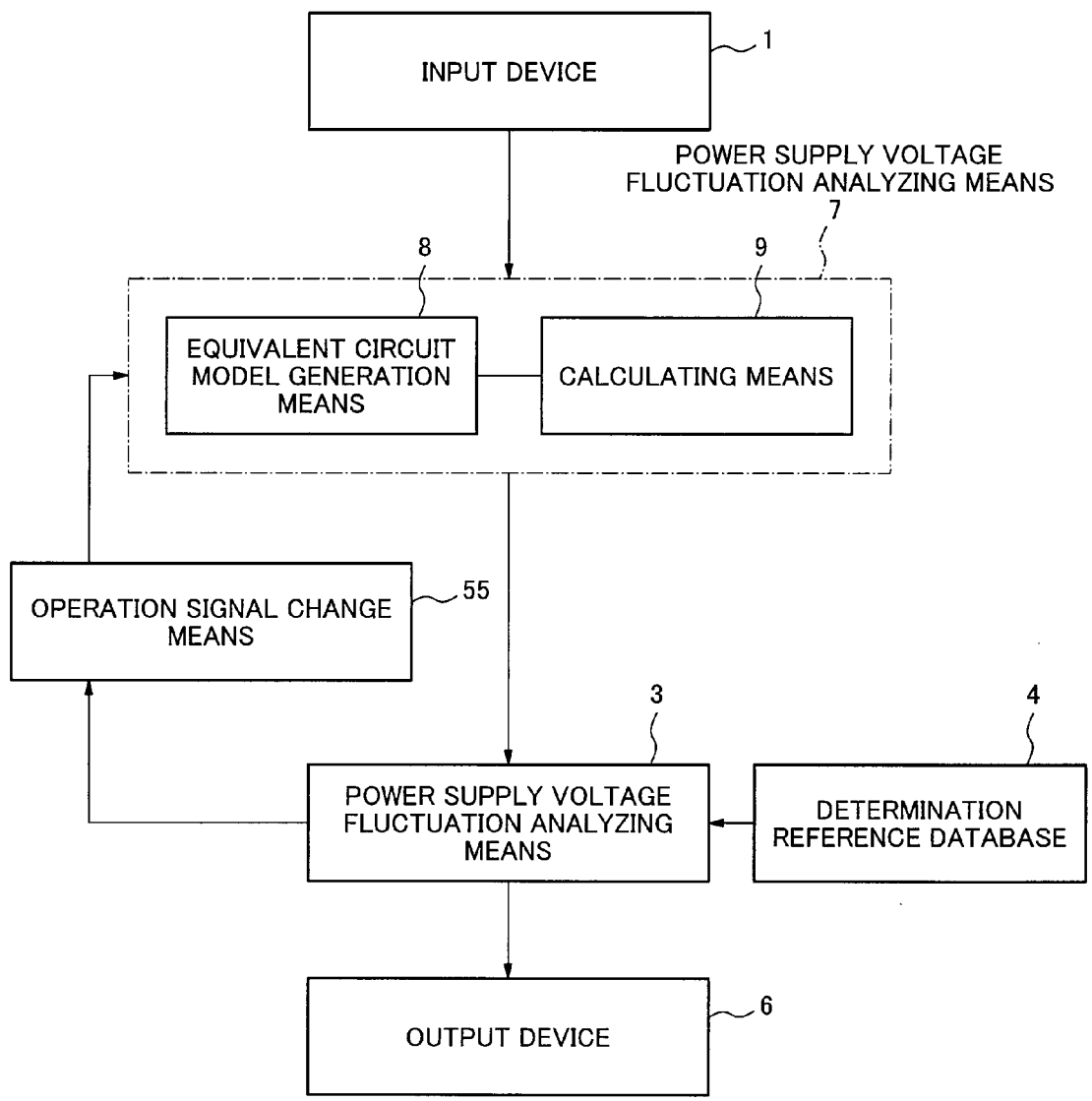
FIG. 24 is a diagram showing a system configuration of the seventh exemplary embodiment.

[Description of Configuration] As shown in FIG. 24, the present exemplary embodiment differs from the second exemplary embodiment in a point that an operation signal change means 55 is provided as the circuit structure/operation changing means 5. The other structures and connecting relations are the same as those of the second exemplary embodiment.

The operation signal change means 55 has a function to change the operation signal inside the LSI based on the change indicator prepared in the determination reference database 4.

[Description of Operation] Next, the operation in the present exemplary embodiment will be described.

Figure 25:
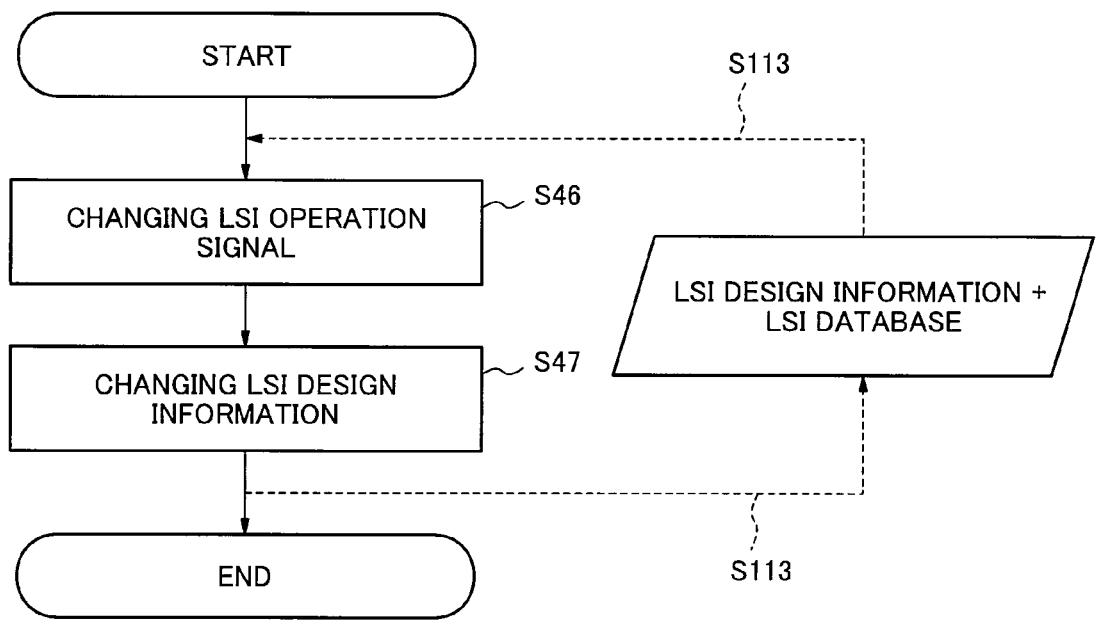
FIG. 25 is a diagram showing a flowchart of change processing of an operation signal.

FIG. 25 is a flowchart of operation signal change processing (S14) showing an example of concrete change processing of the LSI in the circuit operation change processing in S9 (shown in FIG. 5).

In S4, the power supply voltage fluctuation condition determination means 3 performs the processing for comparing the power supply voltage fluctuation characteristic and the power supply voltage fluctuation condition prepared in the determination reference database 4, and if it is determined that the determination reference is not satisfied, the processing is advanced to S46.

In S46, the operation signal change means 55 changes an operation signal waveform of an operating circuit block in the LSI as the LSI operation signal change processing according to the change indicator prepared in the determination reference database 4. Next, the processing is advanced to S47.

In S47, the operation signal change means 55 changes an operation signal in the LSI as the change processing for LSI circuit operation. That is, the change of the operation signal waveform of the circuit block in the LSI is performed by selecting automatically information on a circuit block in the LSI, a power supply dividing circuit relating thereto, and on a package.

FIGS. 26A and 26B are examples of the change processing of concrete circuit operations in a case of changing the operation signal of the circuit block in the LSI. There exists a circuit block 82 connected to a power supply terminal 83 and a ground terminal 84 in the LSI 81. In FIG. 26A showing a case before the change in the circuit structure, an operating first circuit block 85 and an operating second circuit block 86 perform the operation of making a current waveform 90 flow into a power supply terminal according to an operation signal 89.

Accordingly, in the present exemplary embodiment, if it is determined that the determination reference is not satisfied in the determination processing of S4, the operation signal is changed according to the change indicator prepared in the determination reference database 4. The operation signal 89 is changed into the power supply current waveform 90 by lengthening a rise time and a fall time of the operation signal 89 in the first circuit block 85 and the second circuit block 86 as shown in FIG. 26B.

Figure 27A:
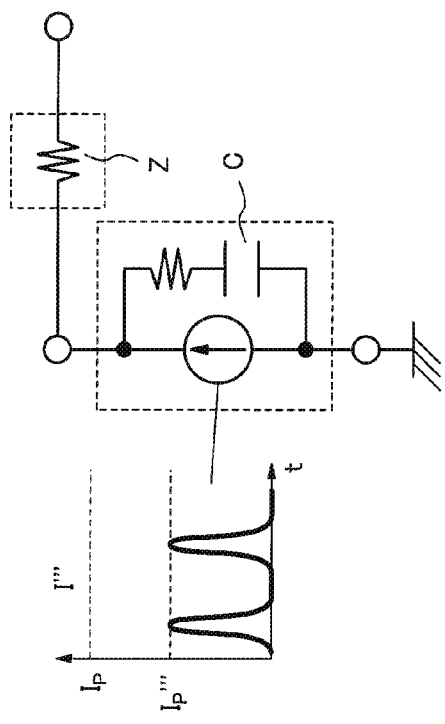
FIG. 27A is a diagram showing an equivalent circuit model and a power supply voltage fluctuation waveform of the LSI before a change in a circuit operation.
Figure 27B:
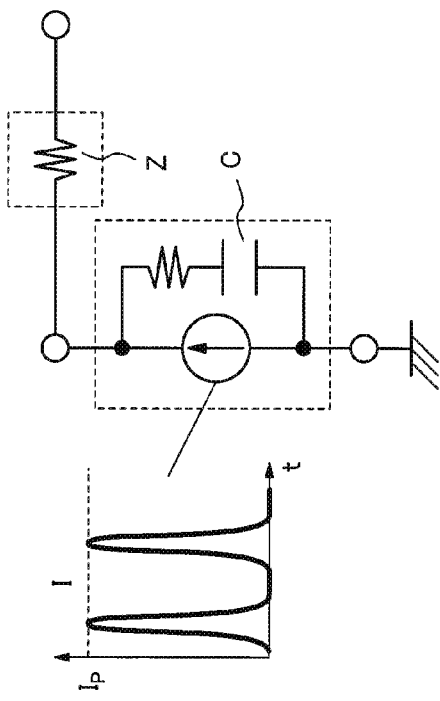
FIG. 27B is a diagram showing an equivalent circuit model and a power supply voltage fluctuation waveform of the LSI after the change in the circuit operation.
Figure 27C:
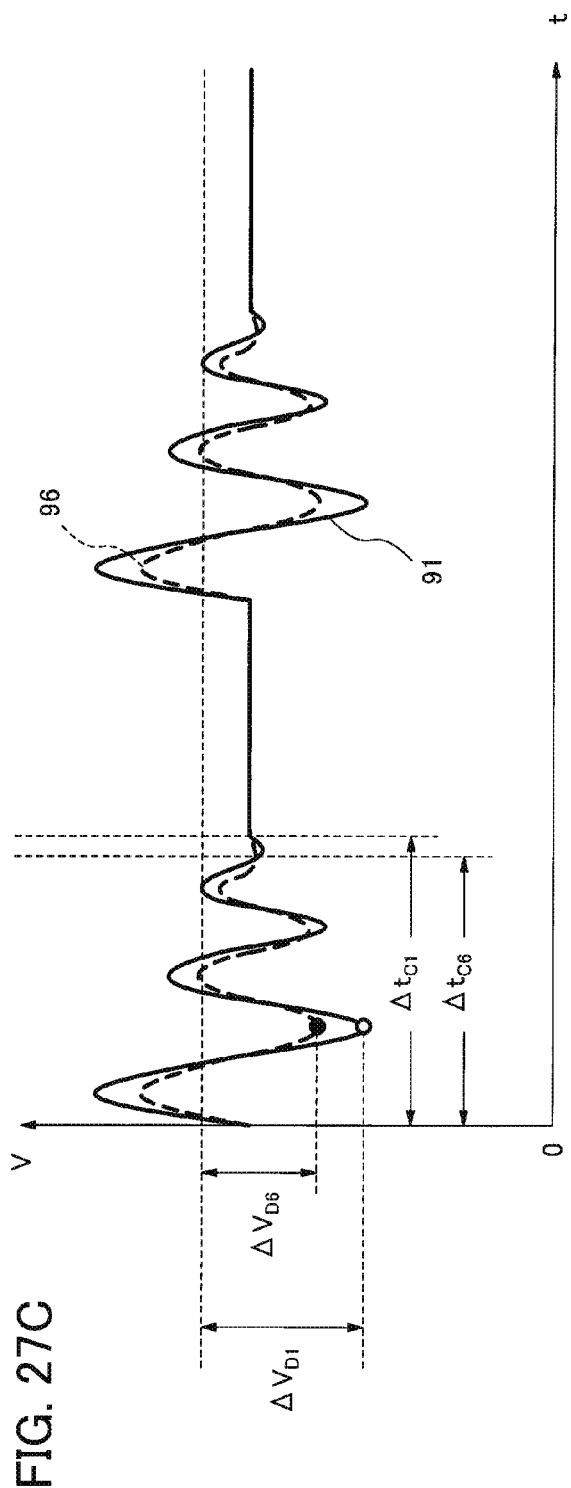
FIG. 27C is a diagram showing power supply voltage waveforms before and after the change in the circuit operation.

[Description of Effect] Next, the effect in the present exemplary embodiment will be described. Equivalent circuit models and power supply voltage fluctuation waveforms of the LSI are shown in FIGS. 27A, 27B, and 27C. An equivalent circuit model and a power supply voltage fluctuation waveform of the LSI before the change are shown in FIG. 27A. On the other hand, an equivalent circuit model and a power supply voltage fluctuation waveform of the LSI after the change are shown in FIG. 27B.

At that time, although the amount of current (the amount of charge) in the power supply current waveform I''' in FIG. 27B does not change compared with the power supply current waveform I before the change, a peak value becomes smaller, that is, $I_p > I_p'''$ because the rise time and the fall time become longer. As a result, the peak value of the electric current flowing into the power supply terminal in the LSI becomes smaller, and high-frequency component of the electric current is also suppressed.

By this change of the operation signal in the LSI, a power supply voltage waveform 91 before the change is changed into a power supply voltage waveform 96 after the circuit operation change as shown in FIG. 27C, and $\Delta V_{D1}$ decreases to $\Delta V_{D6}$ ($\Delta V_{D1} > \Delta V_{D6}$), and it is possible to change the characteristic toward the direction in which the determination reference is satisfied. Although there is no change in the impedance of the power supply circuit basically by this change, a return time of the voltage fluctuation $\Delta t_{C_1}$ shortens and becomes $\Delta t_{C_6}$. ($\Delta t_{C_1} > \Delta t_{C_6}$) because the peak value of the current waveform becomes smaller and high-frequency component is also suppressed.

However, although the peak value of the power supply current waveform also becomes smaller and a power supply voltage fluctuation becomes smaller if the rise time and the fall time of the operation signal in the circuit block become larger, signal delay in each circuit block in the LSI becomes larger, so there exists an allowable value of the signal delay for the LSI to operate normally. Therefore, there is a possibility that LSI may malfunction if the rise time and fall time of the operation signal for a circuit block in the LSI are made longer beyond the allowable value (for example, "a rise time and fall time of an operation signal of a circuit block are no more than one-fourth of the cycle of the operation signal").

Accordingly, a change indicator with restriction capable of change (in this example, "a rise time and fall time of an operation signal of the circuit block are set to be no more than one-fourth of the cycle of the operation signal, and the rise time and fall time of the operation signal of the circuit block are made larger") is prepared as the change indicator prepared in the determination reference database 4. If the operation signal of the circuit block of the LSI is changed according to the change indicator, the operation signal change processing (S14) is performed with removing the dangerousness that the LSI malfunctions.

The change processing of the operation signal of the LSI in S14 is to change the rise time and the fall time of the operation signal of the circuit block in the LSI and does not require an extra space in the LSI in changing. Therefore, it becomes possible to design the power supply circuit of the PCB mounting the LSI stably to the voltage fluctuation without expanding the chip size and the mounting area of the densely-mounted LSI.

[The Eighth Exemplary Embodiment] Next, the eighth exemplary embodiment of the present invention will be described in detail with reference to drawings.

Figure 28:
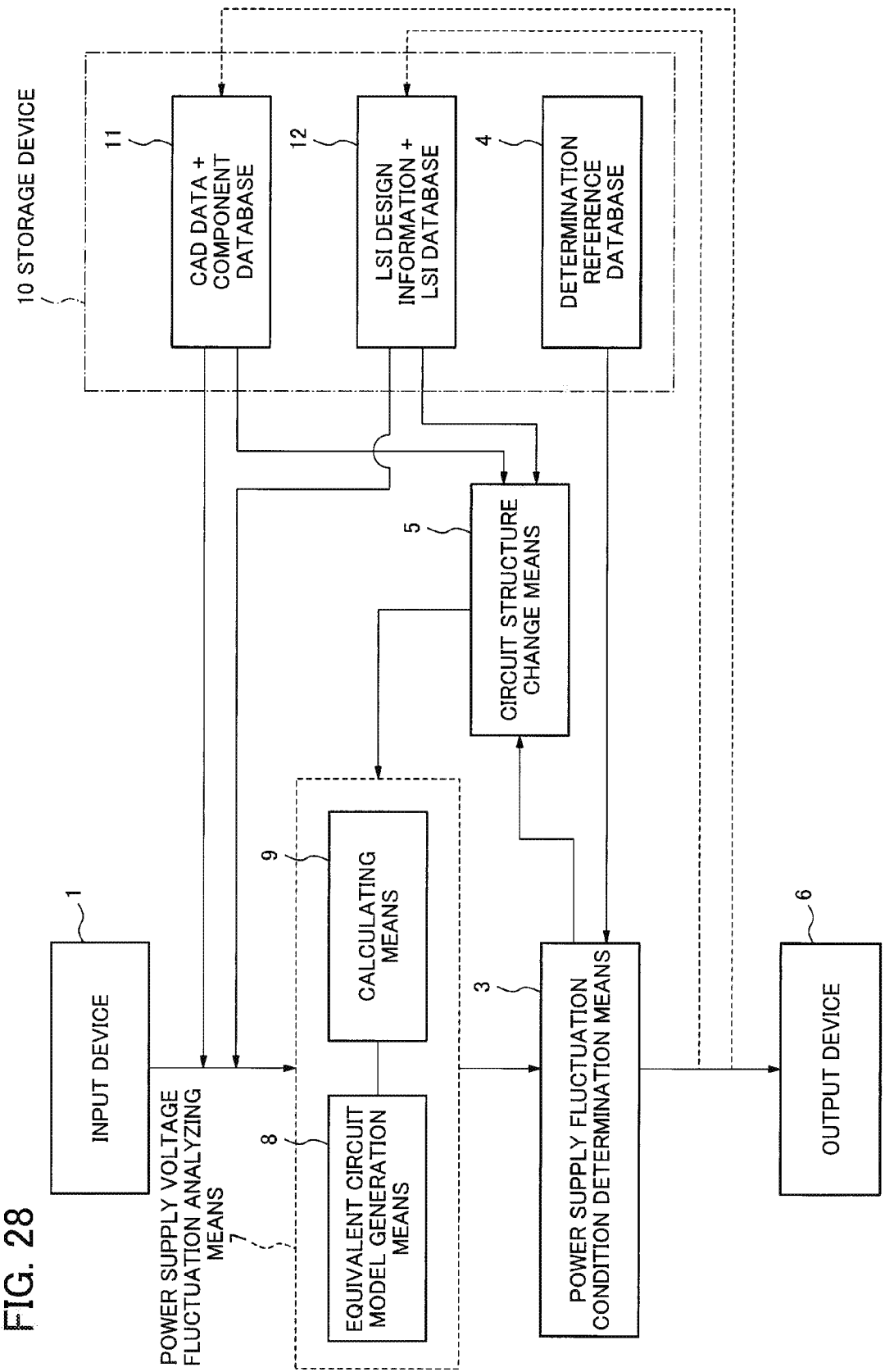
FIG. 28 is a diagram showing a system configuration of the eighth exemplary embodiment.

[Description of Configuration] As shown in FIG. 28, the present exemplary embodiment differs from the second exemplary embodiment in a point that a storage device 10 is provided which stores each piece of input information and a database. The other structures and connecting relations are the same as those of the second exemplary embodiment.

An LSI database 12, a CAD data and component database 11, and the determination reference database 4 are included in the storage device 10.

The LSI database 12 includes whole circuit connection information on the LSI, layout information, design information such as operation information on the LSI, and a database of components composing the LSI.

A CAD data and component database 11 includes a layout and a sectional structure of a PCB, a CAD data which contains the design information on a substrate such as the information on components to be mounted, and a component database.

[Description of Action and Effect] In the present exemplary embodiment, it is possible to extract automatically from the storage device 10 the design information on a circuit to generate a board equivalent circuit model in the flowchart of FIG. 5. That is, instead of the input device 1 inputting the design information on the circuit, it is possible to extract required data automatically as necessary from the CAD data, the component database 11, and the LSI database 12 which are included in the storage device 10.

The CAD data and the component database 11 include the information such as line width, a route designation of a wiring route by XY two axes coordinate, and the wiring full length. It further includes the information such as the component name and the model number of a connection destination. Accordingly, it is possible to search an equivalent circuit model of the component in the CAD data and the component database 11 by the component name of the connection destination, and to select the model. The above-mentioned operation corresponds to S103 and S104 in FIG. 30.

And it is possible to extract required data regarding the LSI from design information of a plurality of LSIs, the LSI database 12, and a plurality of determination reference databases 4 which are included in the storage device 10 in connection with the inputted CAD data and the component database 11. The above-mentioned operation corresponds to S105 in FIG. 31.

The name of the LSI connected to a power supply circuit and data of a package or the like are extracted from the LSI database 12 automatically. And an LSI database in which required information on the whole circuit design information, a package, and a power supply dividing circuit of the LSI is included and information on a power supply voltage fluctuation condition in the power supply circuit are automatically selected and inputted from the LSI database 12.

In the above-mentioned case, it is not necessary to use the input device 1 and it may be used only to input an action for starting an input.

It is possible to output the results which the power supply voltage fluctuation condition determination means 3 obtains in S4 into the CAD data and component database 11. This processing corresponds to S101 in FIG. 5, and the processing for outputting the results of the change processing of substrate structure performed by the power supply wiring structure change processing (S12) corresponds to S109 in FIG. 17.

Specifically, in the CAD data and component database 11, the information of "stable as it was" or "changed circuit structure because of not stable" is written in addition to the information on the power supply wiring of the substrate in the power supply circuit and the connected measure components of the PCB displayed on CAD.

By the above-mentioned configuration, in a case that a CAD data is displayed, for example, if the configuration is employed in which a portion composing a power supply circuit is observed and then the information thereof is outputted, it is possible for a user to determine easily whether the power supply circuit is stable originally to the voltage fluctuation or it has become a stable structure by changing the circuit structure.

It is possible to output the results obtained by the power supply voltage fluctuation condition determination means 3 in FIG. 28 into the LSI design information+LSI database 12 in the storage device 10. The above-mentioned processing corresponds to S102 in FIG. 5, and the processing for outputting the results of the change processing for the structure and the operation of the semiconductor integrated circuit by the power supply wiring structure change processing (S12) corresponds to S108 in FIG. 17.

In the circuit operation change processing of S9, it is possible to output the information on the circuit structure change processing of the LSI into the LSI database 12. Specifically, the information of "stable as it was" or "changed circuit structure because of not stable" is written in addition to the information on an LSI and a package linked with the CAD data. By the information rewritten in this way, it is possible for a designer side to also obtain a concrete indicator of which measures should be performed for an LSI including a package.

[The Ninth Exemplary Embodiment] Next, the ninth exemplary embodiment will be described.

In the present exemplary embodiment, the operation of the equivalent circuit model formation processing (FIG. 5) in S1 and S7 will be described in detail. The other structures and connecting relations are the same as those of the second exemplary embodiment. Hereinafter, in the present exemplary embodiment, the equivalent circuit model formation processing in S1 and S7 (FIG. 5) will be described using S13 to S17 described in FIG. 29.

[Description of Operation] In S13, the input device 1, as substrate information input processing, inputs a layout and a sectional structure of a PCB, the design information on a substrate such as the information on a component to be mounted, and a component database. Next, the processing is advanced to S14.

In S14, the equivalent circuit model generation means 8, as board equivalent circuit model generation processing, generates a board equivalent circuit model including passive components to be mounted except for an LSI. Next, the processing is advanced to S15.

In S15, the input device 1, as LSI information input processing, inputs the whole circuit connection information and layout information on an LSI, the design information such as the operation information on an LSI, a database of a component composing the inside of the LSI, and the information on a capacitive cell to be added. Next, the processing is advanced to S16.

In S16, the equivalent circuit model generation means 8 performs the LSI equivalent circuit model formation processing and generates an LSI equivalent circuit model which estimates from the inputted information the characteristics of the power supply system of the LSI such as an electric current flowing into a power supply of the LSI, an equivalent admittance, and the impedance of the LSI power supply wiring. Next, the processing is advanced to S17.

Figure 35B:
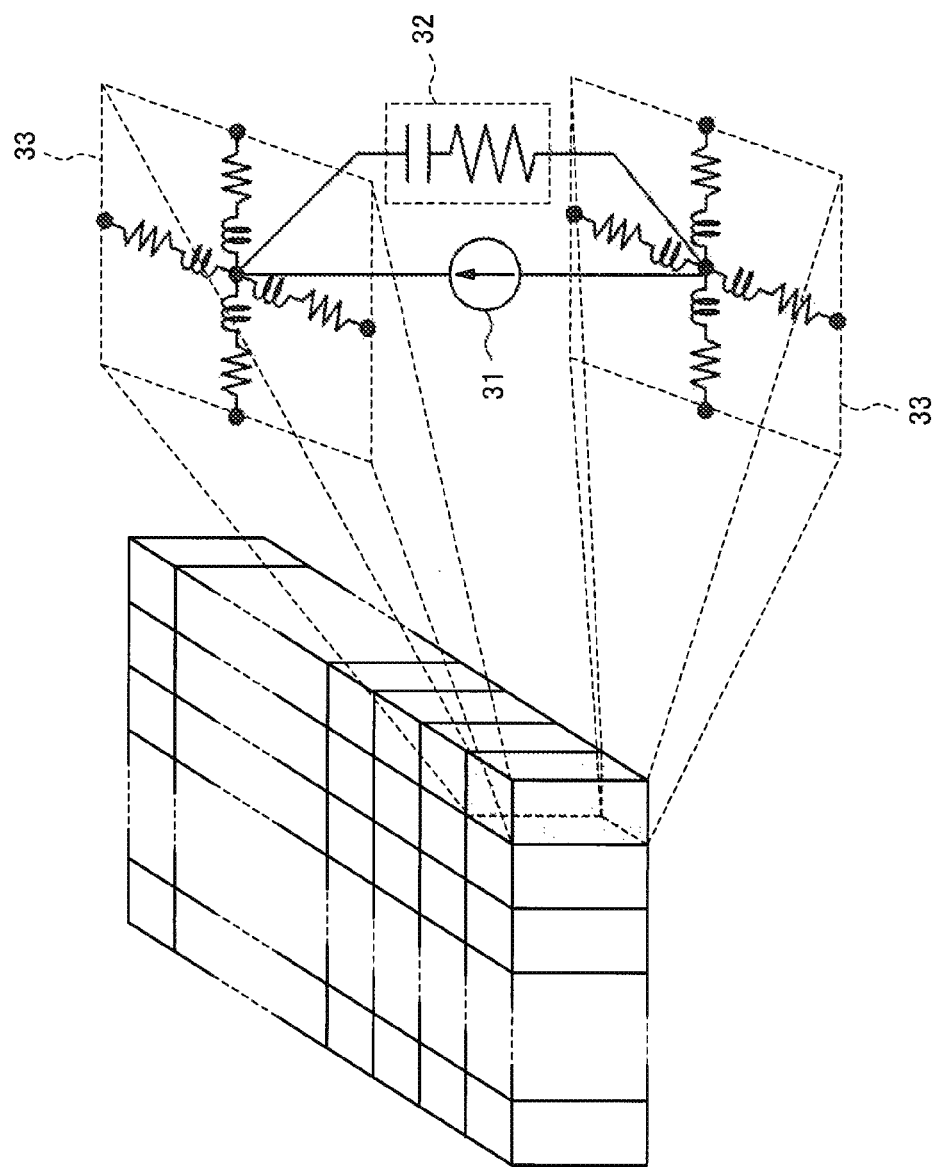
FIG. 35B is a diagram which expressed with a model formed by combining plural models formed by dividing the inside of the LSI.
Figure 35A:
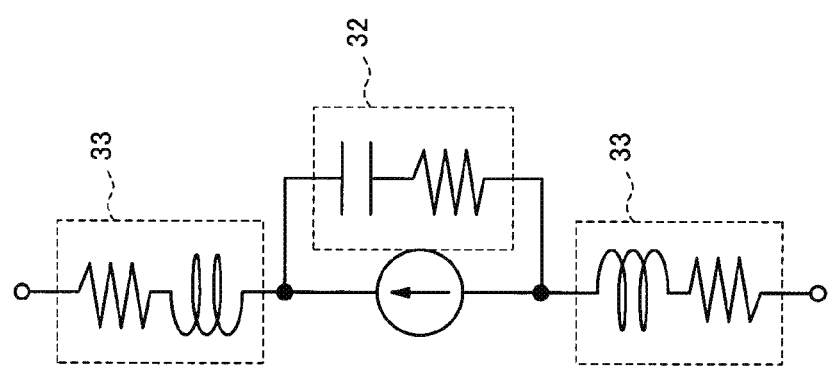
FIG. 35A is a diagram which expressed the whole LSI by the equivalent circuit model.

At that time, the following two models are considered as LSI equivalent circuit models, one of which is a model of a simple structure as shown in FIG. 35A, another one of which is a model that the inside of the LSI is divided taking into account the position information and the frequency range to be analyzed as shown in FIG. 35B, and it is supposed that the selection of the structure is also described in the database.

In S17, the equivalent circuit model generation means 8, as power supply system equivalent circuit model generation processing, combines the LSI equivalent circuit model with the generated board equivalent circuit model, and generates a power supply system equivalent circuit model.

Here, it is possible to reverse the order of the processing for generating the board equivalent circuit model (S13→S14) and the processing for generating the LSI equivalent circuit model (S15→S16). It is also possible to select the following order, that is, the substrate information input processing (S13) and the LSI information input processing (S15) are performed in advance, and then the board equivalent circuit model generation processing (S14) and the LSI equivalent circuit model generation processing (S16) are performed.

Figure 30:
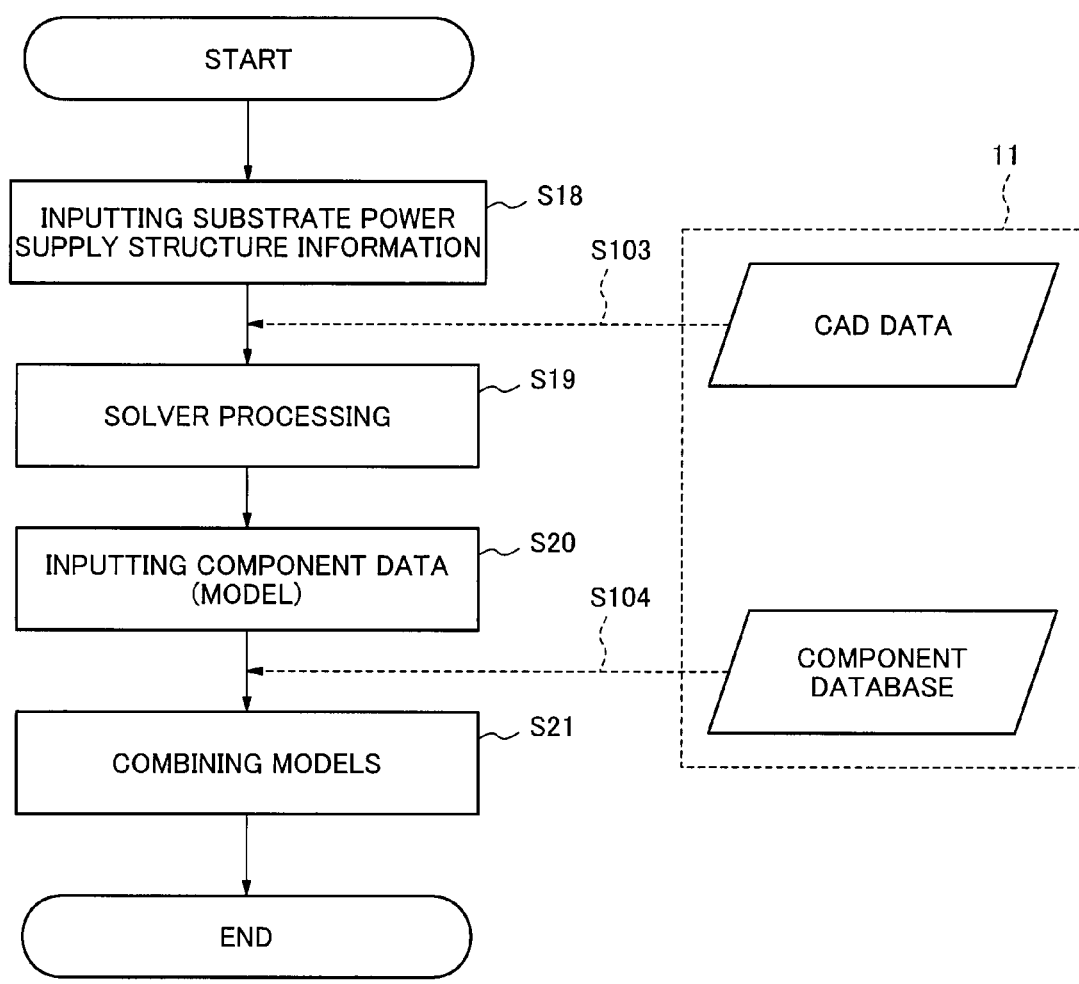
FIG. 30 is a diagram showing a flowchart of creation processing for a board equivalent circuit model in the creation processing of the equivalent circuit model.

FIG. 30 is a flowchart showing the concrete processing of the board equivalent circuit model generation processing in the steps from S13 to S14 in a case that a means for generating a board equivalent circuit model in the equivalent circuit model generation means 8 includes a field solver.

In S18, the input device 1, as the structure input processing of a substrate power supply system, inputs the structure information on a power supply system of a substrate in a printed wiring board. The concrete inputted information is the layout information and the layer structure of the substrate power supply wiring 64 taking for example a PCB which composes the power supply system circuit mounting an LSI and other components as shown in FIG. 3. Next, the processing is advanced to S19.

If a substrate has a blanket structure as shown in FIG. 32A, the structure information includes numerical values regarding structures and material characteristics such as a layer structure 24 and a size of a power supply layer 21, a ground layer 22, and an insulating layer 23 in the substrate, and each electric conductivity (σ), specific inductive capacity (∈r), dielectric dissipation factor (tan δ) and the like.

On the other hand, if a microstrip wiring structure is constituted as shown in FIG. 32B, the structure information includes numerical values regarding a dimension of each part such as the layer structure 24, the line width 26, and the line length, and each material characteristic. It is possible to extract the layer structure and the size in each part from the information provided for a design CAD system of a printed circuit board. Although FIGS. 32A and 32B show a structure (a sectional view) of a wiring pattern, it is also possible to perform the processing for inputting a material name such as copper, for example, instead of the material constant and then changing it into the conductivity by means of the inner database. In this way, a parameter for each part required to obtain an electrical equivalent circuit of a power supply circuit of the substrate and a database of a component are inputted.

Next, in S19, the equivalent circuit model generation means 8, as solver processing, generates an equivalent circuit model of a substrate power supply system. This processing is performed by a field solver prepared in the equivalent circuit model generation means 8. The processing performed here is to generate an equivalent circuit model expressed with the concentrated constant per unit length or distributed constant represented by resistance, inductance, capacitance, and conductance, to use a circuit simulator such as SPICE, on a basis of parameters such as a physical size of a wiring pattern, a material constant, and a layer structure in a printed circuit board. Next, the processing is advanced to S20.

As this field solver, it may be supposed that an electromagnetic field analysis engine is prepared which a PEEC (Partial Element Equivalent Circuit) method and a FEM (Finite Element Method) or the like are applied to. An example of equivalent circuit model of a power supply circuit per unit length obtained by performing this processing is shown in FIG. 33A.

This model is defined by the concentrated constant, and each value of resistance, inductance, capacitance, and conductance per unit length of a wiring is represented by $R_U$, $L_U$, $C_U$, and $G_U$, respectively. $R_U$ and $L_U$ represent the impedance $Z_U$ per unit length in the model, and $C_U$ and $1/G_U$ represent the admittance $Y_U$ per unit length in the model.

If a power supply circuit has a blanket structure as shown in FIG. 32A, the blanket structure is represented by combining that model per unit length as shown in FIG. 33B. On the other hand, if a power supply circuit has the wiring structure as shown in FIG. 32B, the wiring structure is represented by combining that model per unit length like a rudder as shown in FIG. 33C.

Although the equivalent circuit model of the power supply circuit of the substrate is generated by connecting the model per unit length described above by the dimension, it may be represented by distributed parameter description instead of the concentrated constant description.

Next, in S20, the input device 1, as component data input processing, inputs a database for components other than the mounted LSI. FIG. 3 shows the PCB on which the LSI 61 is connected to the direct-current power supply 62 by the power supply wiring 64 and the chip capacitor 63 of the measure component is connected to the power supply wiring 64. The concrete information to be inputted is a database for the direct-current power supply 62 and the chip capacitor 63, and an equivalent circuit model of each component is inputted into the database. Next, the processing is advanced to S21.

Next, in S21, the equivalent circuit model generation means 8, as model connection processing, combines the equivalent circuit model of each component with the equivalent circuit model of a substrate alone in the substrate power supply generated by the solver processing in S19 in accordance with the layout of a real PCB. In this way, the board equivalent circuit model in the PCB is generated.

As the order of the processing, it is acceptable to perform the component data input processing (S20) in first and then to perform the input processing for the structure information on the substrate power supply system (S18) and the solver processing (S19), and it is also acceptable to perform the input processing (S18) and the component data input processing for the structure information on the substrate power supply system (S20) simultaneously in first and then to perform the solver processing (S19).

Figure 29:
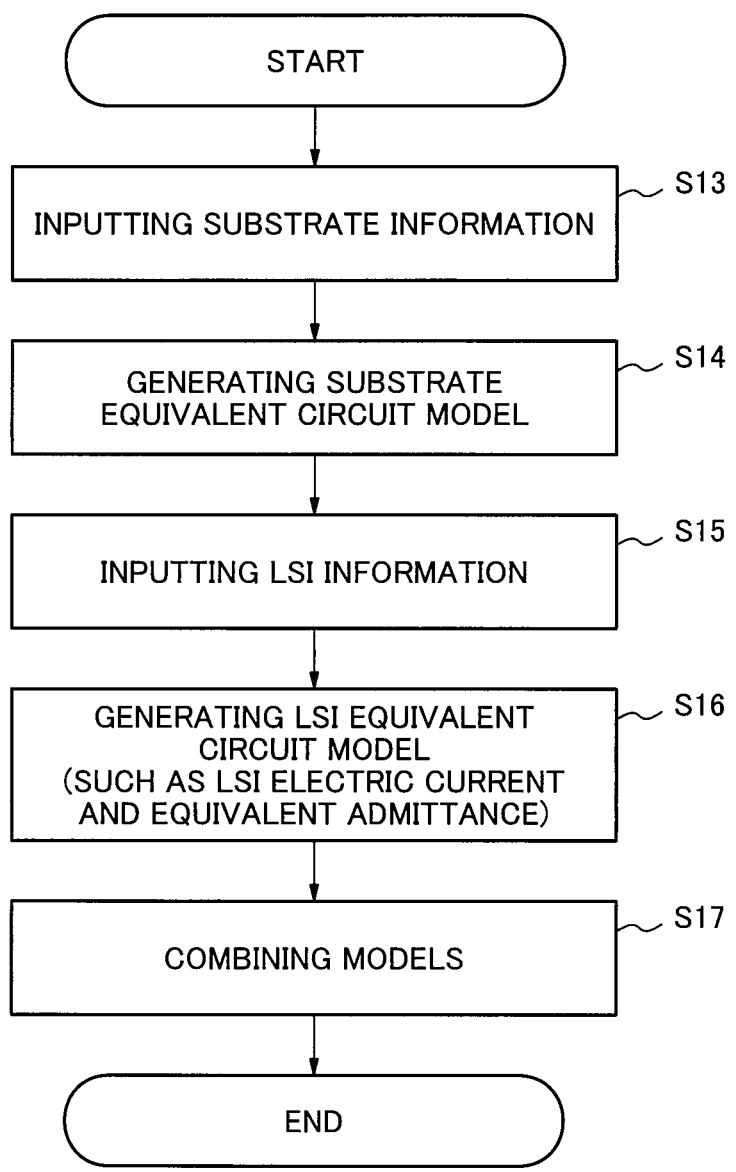
FIG. 29 is a diagram showing a flowchart of creation processing for an equivalent circuit model.
Figure 31:
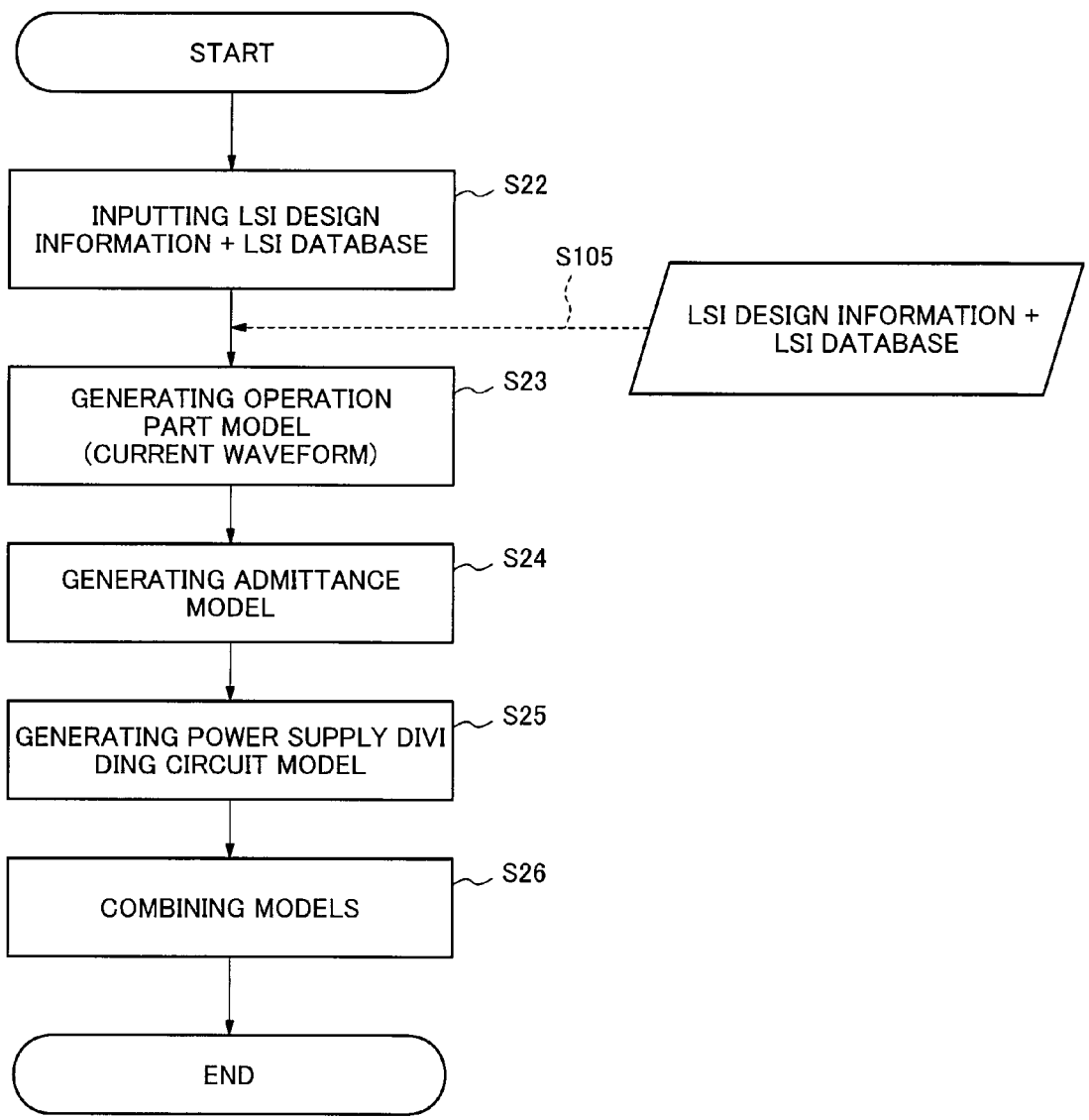
FIG. 31 is a diagram showing a flowchart of creation processing for an LSI equivalent circuit model in the creation processing of the equivalent circuit model.

FIG. 31 is a flowchart showing concrete processing for generating the LSI equivalent circuit model (S15⇒ S16) in FIG. 29.

In S22, the input device 1, as the LSI information input processing, inputs the whole circuit connection information and the layout information on the LSI, the design information such as operation information and the database for the components composing the inside of the LSI. Next, the processing is advanced to S23.

In S23, the equivalent circuit model generation means 8, as the operation part model generation processing, generates a model 31 for an operation part of the LSI which is described by the LSI design information so as to make flow equivalently an electric current flowing into the power supply terminal. Next, the processing is advanced to S24.

Although it is possible to describe the model 31 for the operation part of the LSI generated above by a current source as shown in FIGS. 34A and 34B, it is acceptable to describe it by a transistor to make an equivalent electric current flow.

Figure 36A:
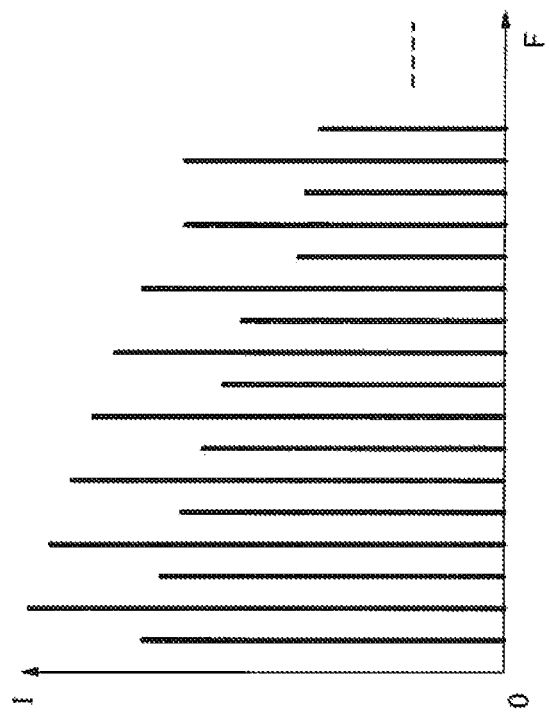
FIG. 36A is a diagram showing a time waveform of a power supply current flowing in an operation part model of the LSI.
Figure 36B:
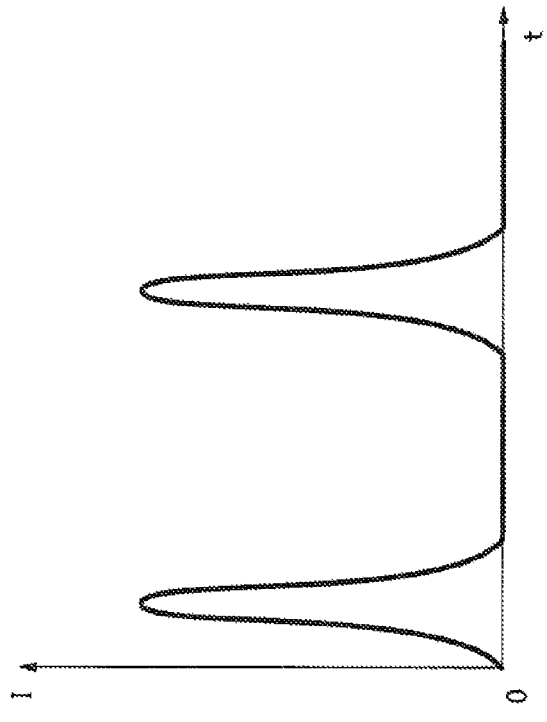
FIG. 36B is a diagram showing a frequency characteristic of the power supply current.

FIG. 36A shows an example of a waveform of the power supply current which flows equivalently in the model 31 for the operation part of the LSI or the model which is described by a transistor. Although this waveform shows a current waveform changing in time, it is acceptable to convert it into a waveform showing a frequency characteristic as shown in FIG. 36B, if needed.

These waveform conversions can be easily performed by the Fourier transformation or the inverse Fourier transformation. In a case of obtaining a frequency characteristic of the voltage of the power supply circuit, because of its simplicity, it is acceptable to convert it into an AC power supply waveform which shows a constant amplitude even if the frequency fluctuates, if needed.

In S24, the equivalent circuit model generation means 8, as admittance model generation processing, generates an admittance model which represents an equivalent admittance in the LSI. Although an admittance model 32 of the LSI generated here shown in FIGS. 34A and 34B can be described by a model composed of capacitance and resistance, it may be described by a model which is described by an equivalent transistor. Next, the processing is advanced to S25.

In S25, the equivalent circuit model generation means 8, as power supply dividing circuit model generation processing, generates a power supply dividing circuit model for the LSI. The power supply dividing circuit model generated here is a model which is connected to the LSI equivalent circuit model combining the operation part model 31 for the LSI with the admittance model 32 for the LSI and connected between two kinds of power supply terminals (power supply terminal and GND terminal) of the LSI. In the PCB shown in FIG. 3, it is acceptable to include not only a model for the power supply wiring in the LSI but also a model for a package. Next, the processing is advanced to S26.

Although the structure of the power supply dividing circuit model can be described by a simple model 33 using the inductance as shown in FIG. 35A, the structure can be also described by an equivalent circuit composed by combining a plurality of circuit blocks as shown in FIG. 35B, depending on the situation.

The above-mentioned power supply dividing circuit model can be generated by reading out an equivalent circuit model having been prepared in the database. Or alternatively, it is acceptable to select a method to generate it by the solver processing by means of a field solver prepared in the equivalent circuit model generation means 8 from the input information of parameters such as the structure and the material constant.

In S26, the equivalent circuit model generation means 8, as the model combination proceeding, generates an equivalent circuit model for the LSI as shown in FIGS. 35A and 35B by combining the operation part model for the LSI with the admittance model and the power supply dividing circuit model which have been generated. In this way, the equivalent circuit model for the LSI mounted on the PCB is generated. It is possible to move back and forth the order of each generation processing (S23, S24, and S25) appropriately.

By the equivalent circuit model formation processing (S7) in FIG. 5, an example of the power supply circuit model for the PCB shown in FIG. 3 is shown in FIG. 6 through such processing.

By the processing for generating the board equivalent circuit model (S13→S14) shown in FIG. 29, the substrate power supply wiring model 74, the direct-current power supply model 75, and the chip capacitor model 73, which are shown in FIG. 6, are generated.

By the generation of the LSI equivalent circuit model (S15→S16) shown in FIG. 29, the power supply dividing circuit model 79, the LSI current source 77 of a model for the LSI operation part, the LSI power supply model 71 of a model for the LSI non-operation part and of an equivalent circuit model for the LSI power supply system composed of LSI inner capacitance 78, and the package model 72, which are shown in FIG. 6, are generated.

These models are combined by the power supply system equivalent circuit model generation processing (S17) shown in FIG. 29, and a power supply system equivalent circuit model of the PCB is generated.

[Description of Effect] By the above-mentioned structure, it is possible to determine easily whether a power supply circuit is stably designed to a voltage fluctuation by analyzing it using the equivalent circuit model reproducing the characteristic of the LSI and the PCB. The power supply voltage fluctuation characteristic can be derived by absolute quantity, and it becomes possible to perform quantitative evaluation and measures.

According to the present exemplary embodiment, by the above-mentioned results, it becomes possible to evaluate by the absolute quantity how much margin is set as design value, or which frequency range has a problem. Since the generation processing for the equivalent circuit model of the power supply circuit of the PCB, the analysis processing for the power supply voltage fluctuation characteristic, and the processing for determining whether it is designed so that the LSI may operate stably, are processes for performing just constant processing to the inputted data, it is possible to automate them.

Therefore, according to the present exemplary embodiment, it is possible for those who do not have a deep knowledge about the LSI or printed board circuits to determine easily whether the power supply circuit is designed stably to the power supply voltage fluctuation.

The method and the device for generating the LSI equivalent circuit model can use existing technologies. Therefore, since it is possible to use a field solver and a circuit analysis tool for generating an equivalent circuit model for a commercial substrate, the system according to the present exemplary embodiment can be easily constructed.

In a kind of power supply system on a PCB, it is possible to determine whether the power supply circuit is designed stably, or to change it automatically into a power supply circuit structure operating stably. Therefore, by repeating the same processing for other power supply systems in series, it also becomes possible to determine whether the power supply circuits are designed stably, or to change them automatically into power supply circuit structures operating stably for all power supply systems on the PCB.

[The Tenth Exemplary Embodiment] Next, the tenth exemplary embodiment of the present invention will be described in detail with reference to drawings.

Figure 37:
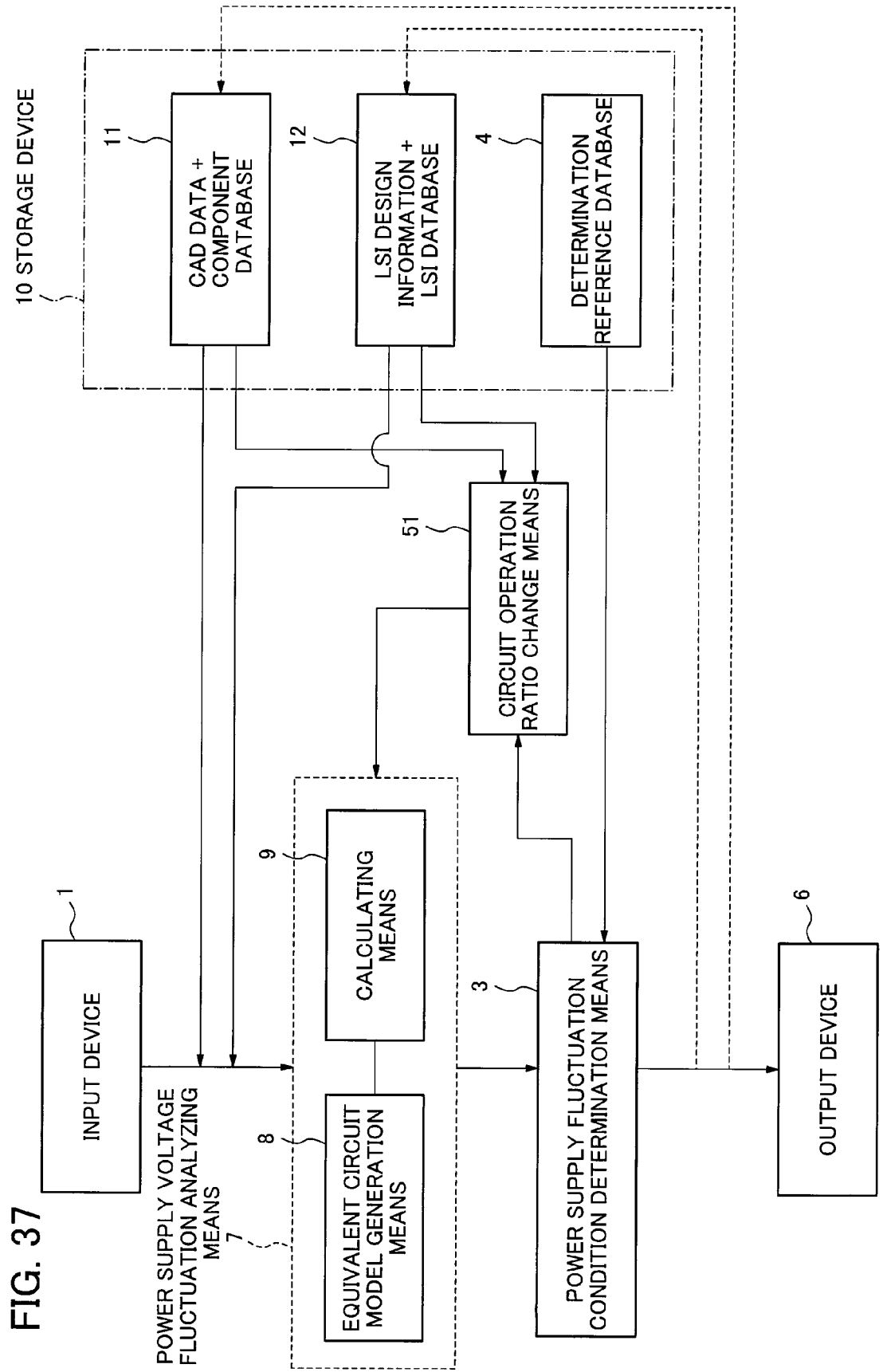
FIG. 37 is a diagram showing a system configuration of a tenth exemplary embodiment.

[Description of Configuration] As shown in FIG. 37, the present exemplary embodiment differs from the third exemplary embodiment in a point that a storage device 10 is provided which stores each piece of input information and a database. The other structures and connecting relations are the same as those of the third exemplary embodiment.

The storage device 10 includes the LSI database 12, the CAD data and component database 11, and the determination reference database 4.

The LSI database 12 includes whole circuit connection information and layout information on an LSI, design information such as operation information on the LSI, and a database for components composing the LSI.

The CAD data and component database 11 includes a CAD data of the design information on a substrate such as a layout and a sectional structure of a PCB and the information on components to be mounted, and a component database.

[Description of Action and Effect] In the present exemplary embodiment, it is possible to extract automatically from the storage device 10 the design information on the circuit necessary for changing the circuit structure and the operation of the LSI in the flowchart shown in FIG. 9. That is, instead of the input device 1 inputting the design information on the circuit, it is possible to extract required data automatically as necessary from the LSI database 12 in the storage device 10.

As S27, the circuit operation ratio change means 51 performs the LSI operation ratio change processing for changing the operation ratio of the circuit block inside the LSI according to the change indicator prepared in the determination reference database 4 in the storage device 10. In such case, the required data is inputted from the design information on a plurality of LSIs and the LSI database 12 in the storage device 10, and the operation ratio of the circuit block inside the LSI is changed automatically. Next, the processing is advanced to S28. In the above-mentioned case, it is acceptable not to use the input device 1 and to use it only for inputting the action for starting an input.

In S28, the circuit operation ratio change means 51, as LSI circuit operation change processing, changes the circuit operations by selecting automatically the change between the operative circuit block and the non-operative circuit block, and the information on a power supply dividing circuit and a package relating thereto. And the circuit operation ratio change means 51 inputs the changed design information on the LSI into the LSI database 12 again.

The processing for reading and writing the data from this LSI database 12 corresponds to S106 in FIG. 9.

By the above-mentioned configuration, it is possible for a designer side to also obtain a concrete guideline about the way that the operation ratio of the circuit block in the LSI should be changed by the information on the LSI database 12 in the storage device 10 rewritten automatically.

[The Eleventh Exemplary Embodiment] Next, the eleventh exemplary embodiment of the present invention will be described in detail with reference to drawings.

Figure 38:
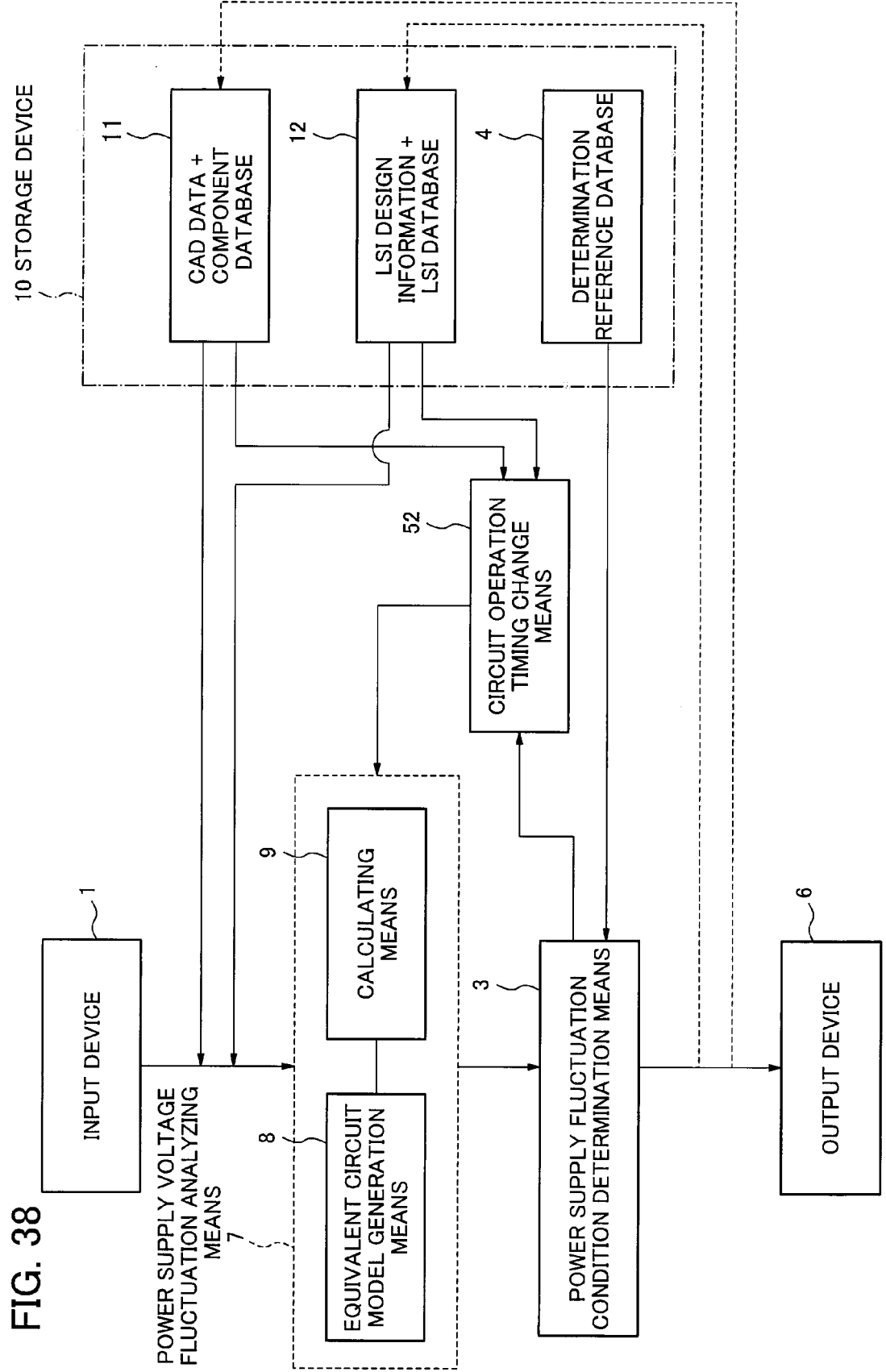
FIG. 38 is a diagram showing a system configuration of an eleventh exemplary embodiment.

[Description of Configuration] As shown in FIG. 38, the present exemplary embodiment differs from the fourth exemplary embodiment in a point that a storage device 10 is provided which stores each input information and a database. The other structures and connecting relations are the same as those of the fourth exemplary embodiment.

The storage device 10 includes the LSI database 12, the CAD data and component database 11, and the determination reference database 4.

The LSI database 12 includes whole circuit connection information and layout information on an LSI, design information such as operation information on the LSI, and a database for components composing the LSI.

The CAD data and component database 11 includes a layout and a sectional structure of a PCB, a CAD data which contains the design information on a substrate such as the information on components to be mounted, and a component database.

[Description of Action and Effect] In the present exemplary embodiment, it is possible to extract automatically from the storage device 10 the design information on a circuit to change the circuit structure and operation of the LSI in the flowchart of FIG. 13. That is, instead of the input device 1 inputting the design information on the circuit, it is possible to extract required data automatically as necessary from the LSI database 12 in the storage device 10.

As S29, the circuit operation timing change means 52 performs the LSI operation timing change processing for changing the operation timing of a plurality of circuit blocks inside the LSI according to the change indicator prepared in the determination reference database 4 in the storage device 10. In such case, the required data is inputted from the design information on a plurality of LSIs and the LSI database 12 in the storage device 10, and the operation timing of the circuit block inside the LSI is automatically changed. Next, the processing is advanced to S30. In the above-mentioned case, it is acceptable not to use the input device 1 and to use it only for inputting the action for starting an input.

In S30, the circuit operation timing change means 52, as the LSI circuit operation timing change processing, changes the circuit operations by selecting automatically the change of each circuit block and the operation timing in the LSI and the information on a power supply dividing circuit and a package relating thereto. And the circuit operation timing change means 52 inputs the changed design information on the LSI into the LSI database 12 again.

The processing for reading and writing the data from this LSI database 12 corresponds to S107 in FIG. 13.

By the above-mentioned configuration, it is possible for a designer side to also obtain a concrete guideline about the way that the operation timing of the circuit block in the LSI should be changed by the information on the LSI database 12 in the storage device 10 rewritten automatically.

[The Twelfth Exemplary Embodiment] Next, the twelfth exemplary embodiment of the present invention will be described in detail with reference to drawings.

Figure 39:
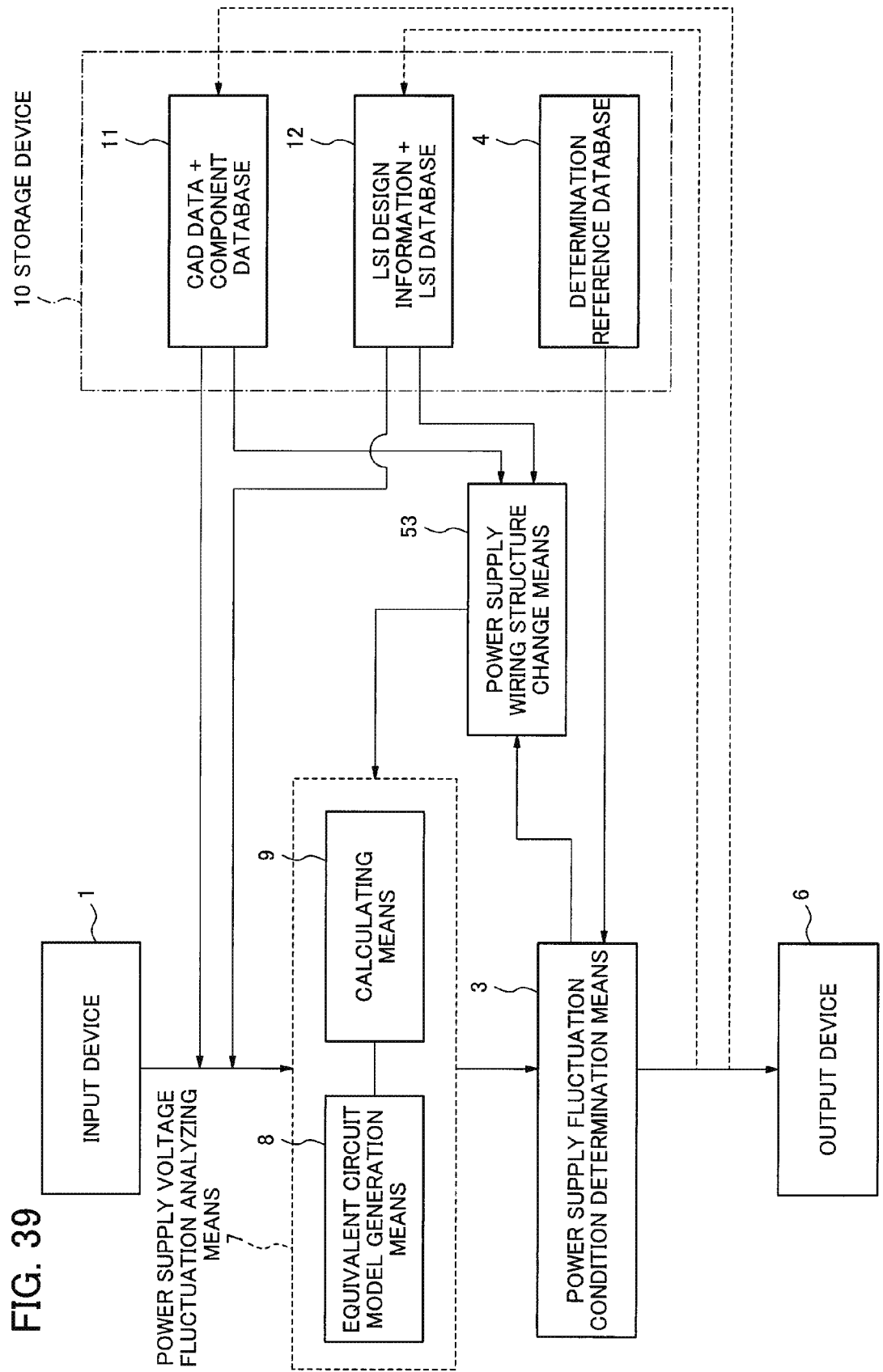
FIG. 39 is a diagram showing a system configuration of a twelfth exemplary embodiment.

[Description of Configuration] As shown in FIG. 39, the present exemplary embodiment differs from the fifth exemplary embodiment in a point that a storage device 10 is provided which stores each piece of input information and a database. The other structures and connecting relations are the same as those of the fifth exemplary embodiment.

The storage device 10 includes the LSI database 12, the CAD data and component database 11, and the determination reference database 4.

The LSI database 12 includes whole circuit connection information and layout information on an LSI, design information such as operation information on the LSI, and a database for components composing the LSI.

The CAD data and component database 11 includes a CAD data of the design information on a substrate such as a layout and a sectional structure of a PCB and the information on components to be mounted, and a component database.

[Description of Action and Effect] In the present exemplary embodiment, it is possible to extract automatically from the storage device 10 the design information on the circuit for changing the circuit structure and the operation of the LSI in the flowchart shown in FIG. 17. That is, instead of the input device 1 inputting the design information on the circuit, it is possible to extract required data automatically as necessary from the CAD data and component database 11, and the LSI database 12 in the storage device 10.

As S31, the power supply wiring structure change means 53 performs the power supply wiring structural change processing for changing the power supply wiring structure inside the LSI according to the change indicator prepared in the determination reference database 4 in the storage device 10. In such case, the required data is inputted from the CAD data and component database 11, the design information on a plurality of LSIs, and the LSI database 12, which are in the storage device 10, and the power supply wiring structure of the LSI is changed automatically. Next, the processing is advanced to S32. In the above-mentioned case, it is acceptable not to use the input device 1 and to use it only for inputting the action for starting an input.

In S32, the power supply wiring structure change means 53, as LSI circuit structure change processing, changes the power supply wiring inside the LSI. That is, it changes the circuit structure by selecting automatically the change of the structures of the circuit block in the LSI and the power supply dividing circuit related thereto, and the information on the power supply dividing circuits and packages of a whole body in the LSI relating thereto. And the input information on the changed circuit structure of the inside of the LSI and the power supply system of the package is derived. Next, the processing is advanced to S33.

In S33, the power supply wiring structure change means 53, as substrate structure change processing, changes the circuit structure by automatically changing the structure of the substrate corresponding to the change of the power supply circuit structure of the LSI. And the power supply wiring structure change means 53 inputs the design information on the changed LSI and the PCB mounting it into the LSI database 12 and the CAD data and component database 11 again.

The processing for reading and the writing the data from this LSI database 12 corresponds to S108 in FIG. 17, and the processing for reading and the writing the data from the CAD data and component database 11 corresponds to S109 in FIG. 17.

By the above-mentioned configuration, it is possible for a designer side to also obtain a concrete guideline about the way that the structure of the power supply wiring connected to the circuit block in the LSI should be changed by the information on the LSI database 12 and the CAD data and component database 11 in the storage device 10 rewritten automatically.

[The Thirteenth Exemplary Embodiment] Next, the thirteenth exemplary embodiment of the present invention will be described in detail with reference to drawings.

Figure 40:
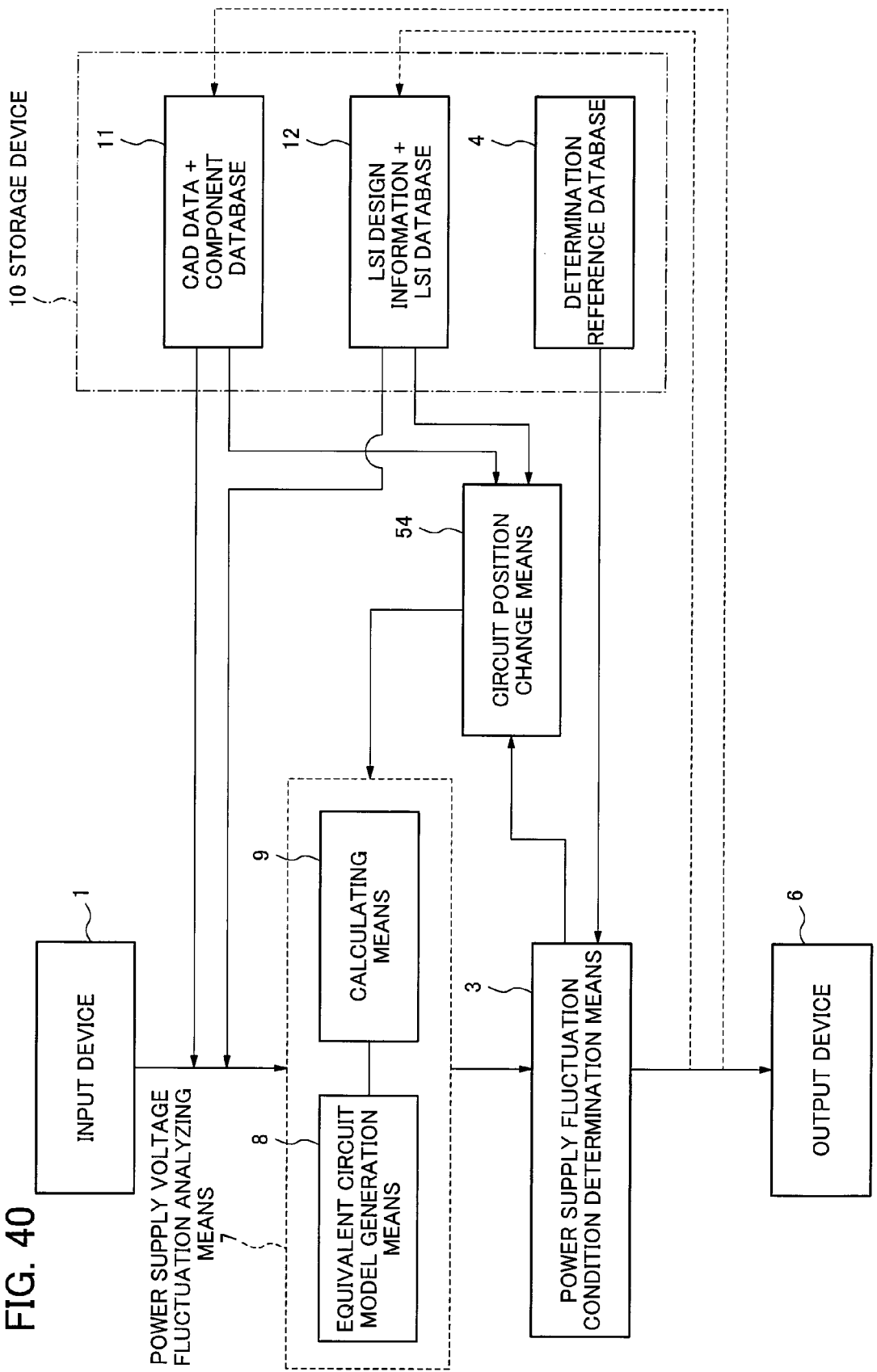
FIG. 40 is a diagram showing a system configuration of a thirteenth exemplary embodiment.

[Description of Configuration] As shown in FIG. 40, the present exemplary embodiment differs from the sixth exemplary embodiment in a point that a storage device 10 is provided which stores each piece of input information and a database were. The other structures and connecting relations are the same as those of the sixth exemplary embodiment.

The storage device 10 includes the LSI database 12, the CAD data and component database 11, and the determination reference database 4.

The LSI database 12 includes whole circuit connection information and layout information on an LSI, design information such as operation information on the LSI, and a database for components composing the LSI.

The CAD data and component database 11 includes a CAD data of the design information on a substrate such as a layout and a sectional structure of a PCB and the information on components to be mounted, and a component database.

[Description of Action and Effect] In the present exemplary embodiment, it is possible to extract automatically from the storage device 10 the design information on the circuit to change the circuit structure and the operation of the LSI in the flowchart shown in FIG. 21. That is, instead of the input device 1 inputting the design information on the circuit, it is possible to extract required data automatically as necessary from the CAD data and component database 11, and the LSI database 12 in the storage device 10.

As S43, the LSI circuit position change means 54 performs the LSI circuit repositioning processing for changing the position of a circuit block inside the LSI according to the change indicator prepared in the determination reference database 4 in the storage device 10. In such case, the required data is inputted from the CAD data and component database 11, the design information on a plurality of LSIs, and the LSI database 12 which are in the storage device 10, and the circuit structure and the power supply wiring structure in the LSI is changed automatically. Next, the processing is advanced to S44. In the above-mentioned case, it is acceptable not to use the input device 1 and to use it only for inputting the action for starting an input.

In S44, the circuit position change means 54, as LSI circuit structure change processing, changes the circuit position inside the LSI. That is, it changes the circuit structure by selecting automatically the change of the arrangement of the circuit block in the LSI, and the information on the power supply dividing circuit and the package relating thereto. And input information on the circuit structure of the inside of the LSI and the power supply system of the package which have been changed is derived. Next, the processing is advanced to S45.

In S45, the circuit position change means 54, as change processing, changes the substrate structure corresponding to the change in the power supply circuit structure of the LSI, and inputs the design information on the changed LSI and PCB mounting it into the LSI database 12, and the CAD data and component database 11 again.

The processing for reading and writing the data from this LSI database 12 corresponds to S111 in FIG. 21, and the processing for reading and the writing the data from the CAD data and component database 11 corresponds to S112 of FIG. 21.

By the above-mentioned configuration, it is possible for a designer side to also obtain a concrete guideline about the way that the arrangement of circuit block in the LSI should be changed by the information on the LSI database 12 and the CAD data and component database 11 in the storage device 10 rewritten automatically.

[The Fourteenth Exemplary Embodiment] Next, the fourteenth exemplary embodiment of the present invention will be described in detail with reference to drawings.

Figure 41:
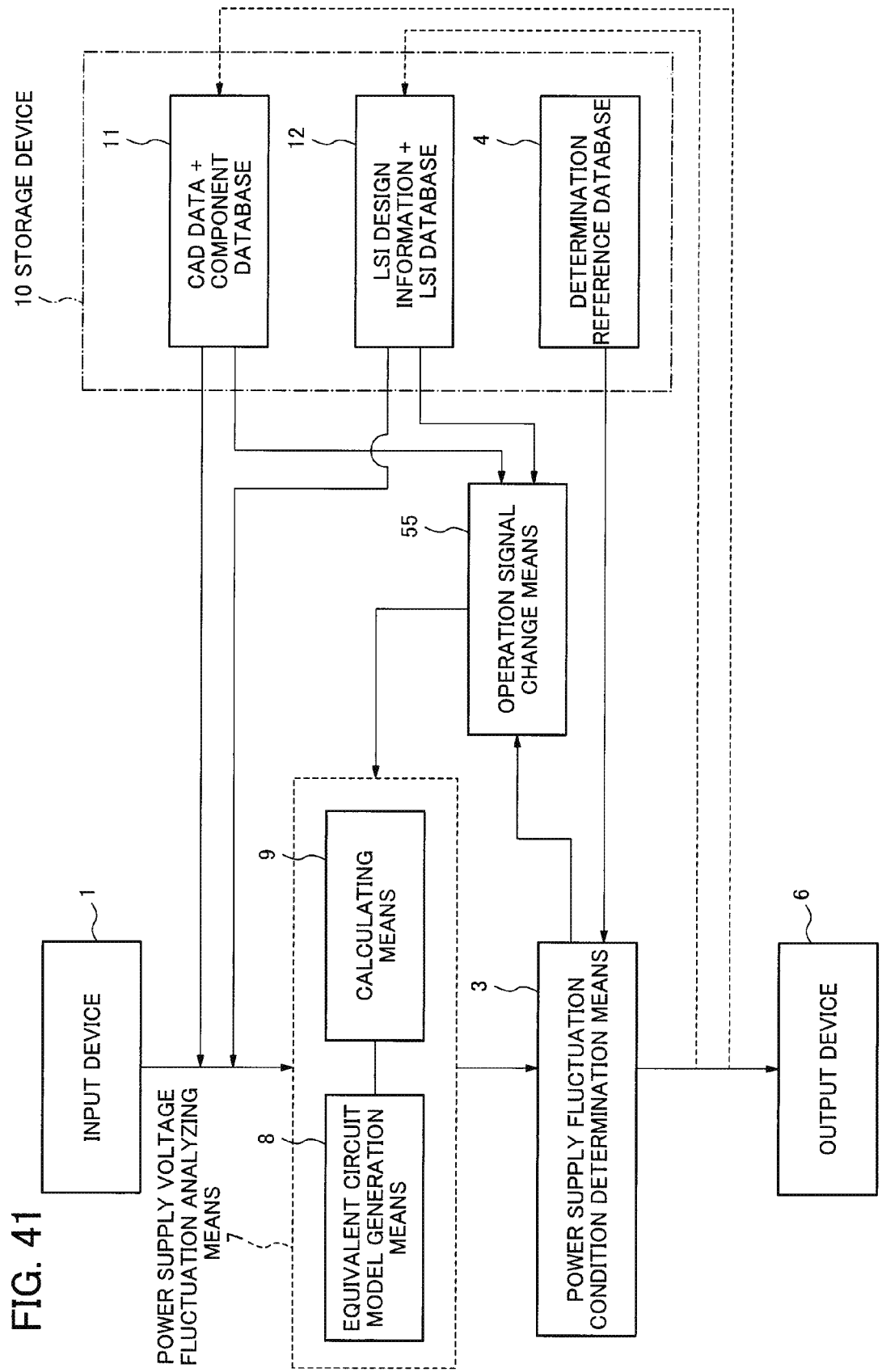
FIG. 41 is a diagram showing a system configuration of a fourteenth exemplary embodiment.

[Description of Configuration] As shown in FIG. 41, the present exemplary embodiment differs from the seventh exemplary embodiment in a point that a storage device 10 is provided which stores each piece of input information and a database. The other structures and connecting relations are the same as those of the seventh exemplary embodiment.

The storage device 10 includes the LSI database 12, the CAD data and component database 11, and the determination reference database 4.

The LSI database 12 includes whole circuit connection information and layout information on an LSI, design information such as operation information on the LSI, and a database for components composing the LSI.

The CAD data and component database 11 includes a CAD data of the design information on a substrate such as a layout and a sectional structure of a PCB and the information on components to be mounted, and a component database.

[Description of Action and Effect] In the present exemplary embodiment, it is possible to extract automatically from the storage device 10 the design information on a circuit to change the circuit structure and the operation of the LSI in the flowchart shown in FIG. 25. That is, instead of the input device 1 inputting the design information on the circuit, it is possible to extract required data automatically as necessary from the LSI database 12 in the storage device 10.

As S46, the operation signal change means 55 performs the LSI operation signal change processing for changing the operation signal waveform of an operative circuit block in the LSI according to the change indicator prepared in the determination reference database 4 in the storage device 10. In such case, the required data is inputted from the design information on a plurality of LSIs and the LSI database 12 in the storage device 10, and the operation signal waveform of the circuit block in the LSI is changed automatically. Next, the processing is advanced to S47. In the above-mentioned case, it is acceptable not to use the input device 1 and to use it only for inputting the action for starting an input.

In S47, the operation signal change means 55, as change processing for LSI circuit operation, changes the circuit operations by selecting automatically the change in the operation signal waveform of a circuit block in the LSI and the information on a circuit block in the LSI, a power supply dividing circuit and a package relating thereto. And the operation signal change means 55 inputs the changed design information on the LSI into the LSI database 12 again.

The processing for reading and writing the data from this LSI database 12 corresponds to S113 in FIG. 25.

By the above-mentioned configuration, it is possible for a designer side to also obtain a concrete guideline about the way that the operation signal waveform of the operative circuit block in the LSI should be changed by the information on the LSI database 12 in the storage device 10 rewritten automatically.

[Supplementary Note 1]

A power supply circuit design system characterized in comprising:

a power supply voltage fluctuation deriving means, on the basis of design information about a power supply circuit for connecting a semiconductor integrated circuit and other components mounted on a substrate, for deriving a power supply voltage fluctuation characteristic as a voltage fluctuation characteristic in the semiconductor integrated circuit;

a determination reference database provided with a change indicator for a power supply voltage fluctuation condition as a condition for which the power supply voltage fluctuation characteristic is allowed in the power supply circuit, and/or for the circuit structure or operation of the semiconductor integrated circuit;

a power supply voltage fluctuation determination means for comparing the power supply voltage fluctuation characteristic and the power supply voltage fluctuation condition, and determining whether the power supply voltage fluctuation characteristic satisfies the power supply voltage fluctuation condition; and a circuit structure changing means for changing the structure and/or operation of the semiconductor integrated circuit in accordance with the change indicator in the case that the power supply voltage fluctuation characteristic does not satisfy the power supply voltage fluctuation condition, and outputting design information about the changed semiconductor integrated circuit to the power supply voltage fluctuation deriving means, the change indicator not entailing a change in size of the semiconductor integrated circuit.

[Supplementary Note 2]
The power supply circuit design system according to Supplementary note 1, wherein the power supply voltage fluctuation deriving means includes:

an equivalent circuit model generation means for generating an equivalent circuit model in the power supply circuit from the design information; and a power supply voltage fluctuation analyzing means having a calculating means for analyzing the equivalent circuit model and deriving the power supply voltage fluctuation characteristic.

[Supplementary Note 3]
The power supply circuit design system according to Supplementary note 1 or Supplementary note 2 including a circuit operation ratio change means for changing an operation ratio of a plurality of circuit blocks in the semiconductor integrated circuit on a basis of the change indicator as the circuit structure change means.

[Supplementary Note 4]
The power supply circuit design system according to Supplementary note 3, wherein the circuit operation ratio change means decreases the operation ratio of the circuit blocks which operated.

[Supplementary Note 5]
The power supply circuit design system according to Supplementary note 1 or Supplementary note 2 including a circuit operation timing change means, as the circuit structure change means, for changing the respective operation timing of the plurality of circuit blocks which operate in the semiconductor integrated circuit on a basis of the change indicator, and for shifting timing between electric currents flowing in the plurality of circuit blocks.

[Supplementary Note 6]
The power supply circuit design system according to Supplementary note 5, wherein the circuit operation timing change means increases a difference in operation timing between the plurality of circuit blocks which operate.

[Supplementary Note 7]
The power supply circuit design according to Supplementary note 1 or Supplementary note 2 including a power supply wiring terminal structure change means for changing a number of a power supply terminal and a ground terminal which connect with the plurality of circuit blocks in the semiconductor integrated circuit on a basis of the change indicator as the circuit structure change means.

[Supplementary Note 8]
The power supply circuit design system according to Supplementary note 7, wherein the power supply wiring structure change means increases a ratio of the power supply terminal and the ground terminal connected to the plurality of circuit blocks in a total terminal provided in the semiconductor integrated circuit.

[Supplementary Note 9]
The power supply circuit design system according to Supplementary note 1 or Supplementary note 2 including a circuit position change means for changing positions of a circuit block which operates and a circuit block which does not operate in the semiconductor integrated circuit on a basis of the change indicator as the circuit structure change means.

[Supplementary Note 10]
The power supply circuit design system according to Supplementary note 9, wherein the circuit position change means changes the position of the circuit block which operates to a position near the power supply terminal and the ground terminal connected with the plurality of circuit blocks, and changes the position of the circuit block which does not operate to a position far from the power supply terminal and the ground terminal.

[Supplementary Note 11]
The power supply circuit design system according to Supplementary note 1 or Supplementary note 2 including an operation signal change means for changing an operation signal of the plurality of circuit blocks in the semiconductor integrated circuit on a basis of the change indicator as the circuit structure change means.

[Supplementary Note 12]
The power supply circuit design system according to Supplementary note 11, wherein the operation signal change means lengthens a rise time and a fall time of the operation signal of the plurality of circuit blocks.

[Supplementary Note 13]
The power supply circuit design system according to Supplementary note 1 or Supplementary note 2, wherein a storage device having design information on the power supply circuit is provided, and the power supply voltage fluctuation deriving means derives a power supply voltage fluctuation characteristic on a basis of the design information on the power supply circuit prepared in the storage device.

[Supplementary Note 14]
A power supply circuit design method characterized in comprising:

inputting design information on a power supply circuit which connects a semiconductor integrated circuit and other parts mounted on a substrate;

deriving a power supply voltage fluctuation characteristic which is a characteristic of a voltage fluctuation in the semiconductor integrated circuit based on the design information;

performing power supply voltage fluctuation comparison processing to compare the power supply voltage fluctuation characteristic and a power supply voltage fluctuation condition which is an allowed condition;

performing power supply voltage characteristic determination processing to determine whether the power supply circuit satisfies the condition thereof to the power supply voltage fluctuation characteristic; and changing the structure of the semiconductor integrated circuit in accordance with a change indicator prepared beforehand in the case that the condition is not satisfied in the power supply voltage characteristic determination processing, and performing the power supply voltage fluctuation characteristic deriving processing again in the design information on the changed semiconductor integrated circuit, the change indicator not entailing a change in size of the semiconductor integrated circuit.

[Supplementary Note 15]

A program for making a computer execute processing, the processing comprising:

circuit design information input processing to input design information on a power supply circuit which connects a semiconductor integrated circuit and other components mounted on a substrate;

power supply voltage fluctuation derivation processing to derive a power supply voltage fluctuation characteristic which is a characteristics of a voltage fluctuation in the semiconductor integrated circuit based on the design information;

power supply voltage fluctuation comparison processing to compare the power supply voltage fluctuation characteristic and a power supply voltage fluctuation condition which is an allowed condition thereof;

power supply voltage characteristic determination processing to determine whether the power supply circuit satisfies the condition to the power supply voltage fluctuation characteristic; and circuit structural change processing to change a structure of the semiconductor integrated circuit in accordance with a change indicator prepared before hand in the case that the condition is not satisfied in the power supply voltage characteristic determination processing, and to perform the power supply voltage fluctuation characteristic deriving processing again in the design information on the changed semiconductor integrated circuit, the change indicator not entailing a change in size of the semiconductor integrated circuit.

The present invention has been described in conformity with the above-mentioned exemplary embodiments and examples, but the present invention cannot be limited to only the above-mentioned exemplary embodiments and various transformations and modifications are also included which a person skilled in the art would be able to accomplish within the scope of the present invention.

This application is based upon and claims the benefit of priority from Japanese patent application No. 2010-231404, filed on Oct. 14, 2010, the disclosure of which is incorporated herein in its entirety by reference.

DESCRIPTION OF THE CODES 1 input device
2 power supply voltage fluctuation deriving means
3 power supply voltage fluctuation condition determination means
4 determination reference database
5 circuit structure/operation changing means
6 output device
7 power supply voltage fluctuation analyzing means
8 equivalent circuit model generation means
9 calculating means
10 storage device
11 CAD data and component database
12 LSI database
21 power supply layer
22 ground layer
23 insulating layer
24 layer structure
25 line width
31 model in operation part of LSI
32 admittance model of LSI.
33 model of inductance.
41 characteristic of power supply voltage waveform A
42 characteristic of power supply voltage waveform B
51 circuit operation ratio change means
52 circuit operation timing change means
53 power supply wiring structure change means
54 circuit position change means
55 operation signal change means
61 LSI
62 direct-current power supply
63 chip capacitor
64 power supply wiring
71 LSI power supply model
72 package model
73 chip capacitor model
74 substrate power supply wiring model
75 direct-current power supply model
76 observation point.
77 LSI current source
78 LSI inner capacitance
79 power supply dividing circuit model
82 circuit block.
83 power supply terminal
84 ground terminal
85 first circuit block
86 second circuit block
94, 95 power supply voltage waveform after change in circuit structure
92, 93, 96 power supply voltage waveform after change in circuit operation

The invention claimed is:

1. A power supply circuit design system, comprising:
a power supply voltage fluctuation deriving unit for deriving a power supply voltage fluctuation characteristic as a voltage fluctuation characteristic in a semiconductor integrated circuit on the basis of design information about a power supply circuit for connecting the semiconductor integrated circuit and other components mounted on a substrate;
a determination reference database comprising a power supply voltage fluctuation condition as a condition for which the power supply voltage fluctuation characteristic is allowed in the power supply circuit, and a change indicator for at least one of a circuit structure and operation of the semiconductor integrated circuit;
a power supply voltage fluctuation determination unit for comparing the power supply voltage fluctuation characteristic and the power supply voltage fluctuation condition, and determining whether the power supply voltage fluctuation characteristic satisfies the power supply voltage fluctuation condition; and
a circuit structure changing unit for changing at least one of the structure and the operation of the semiconductor integrated circuit in accordance with the change indicator if the power supply voltage fluctuation characteristic does not satisfy the power supply voltage fluctuation condition, and outputting design information about the changed semiconductor integrated circuit to the power supply voltage fluctuation deriving unit;
wherein the change indicator does not entail a change in size of the semiconductor integrated circuit.

2. The power supply circuit design system according to claim 1,
wherein the power supply voltage fluctuation deriving unit comprises:

an equivalent circuit model generation unit for generating an equivalent circuit model in the power supply circuit from the design information; and a power supply voltage fluctuation analyzing unit comprising a calculating unit for analyzing the equivalent circuit model and deriving the power supply voltage fluctuation characteristic.

3. The power supply circuit design system according to claim 1, further comprising:

a circuit operation ratio change unit, as the circuit structure change unit, for changing an operation ratio of a plurality of circuit blocks in the semiconductor integrated circuit on a basis of the change indicator.

4. The power supply circuit design system according to claim 1, further comprising:

a circuit operation timing change unit, as the circuit structure change unit, for changing the respective operation timing of the plurality of circuit blocks which operate in the semiconductor integrated circuit on a basis of the change indicator, and shifting timing between electric currents flowing in the plurality of circuit blocks.

5. The power supply circuit design according to claim 1, further comprising:

a power supply wiring terminal structure change unit, as the circuit structure change unit, for changing the number of a power supply terminal and a ground terminal which connect with the plurality of circuit blocks in the semiconductor integrated circuit on a basis of the change indicator.

6. The power supply circuit design system according to claim 1, further comprising:

a circuit position change unit, as the circuit structure change unit, for changing positions of an operative circuit block and a non-operative circuit block in the semiconductor integrated circuit on a basis of the change indicator.

7. The power supply circuit design system according to claim 6, wherein the circuit position change unit changes the position of the operative circuit block into a position near the power supply terminal and the ground terminal connected to the plurality of circuit blocks, and changes the position of the non-operative circuit block into a position far from the power supply terminal and the ground terminal.

8. The power supply circuit design system according to claim 1, further comprising:

an operation signal change unit, as the circuit structure change unit, for changing an operation signal of the plurality of circuit blocks in the semiconductor integrated circuit on a basis of the change indicator.

9. The power supply circuit design system according to claim 8, wherein the operation signal change unit lengthens a rise time and a fall time of the operation signal of the plurality of circuit blocks.

10. The power supply circuit design system according to claim 1, further comprising:

a storage device comprising design information on the power supply circuit;

wherein the power supply voltage fluctuation deriving unit derives a power supply voltage fluctuation characteristic on a basis of the design information on the power supply circuit prepared in the storage device.

11. A power supply circuit design system, comprising:

a power supply voltage fluctuation deriving means for deriving a power supply voltage fluctuation characteristic as a voltage fluctuation characteristic in a semiconductor integrated circuit on the basis of design information about a power supply circuit for connecting the semiconductor integrated circuit and other components mounted on a substrate;

a determination reference database comprising a power supply voltage fluctuation condition as a condition for which the power supply voltage fluctuation characteristic is allowed in the power supply circuit, and a change indicator for at least one of a circuit structure and operation of the semiconductor integrated circuit;

a power supply voltage fluctuation determination means for comparing the power supply voltage fluctuation characteristic and the power supply voltage fluctuation condition, and determining whether the power supply voltage fluctuation characteristic satisfies the power supply voltage fluctuation condition; and a circuit structure changing means for changing at least one of the structure and the operation of the semiconductor integrated circuit in accordance with the change indicator if the power supply voltage fluctuation characteristic does not satisfy the power supply voltage fluctuation condition, and outputting design information about the changed semiconductor integrated circuit to the power supply voltage fluctuation deriving means;

wherein the change indicator does not entail a change in size of the semiconductor integrated circuit.

* * * * *